United States Patent
Goyal et al.

(10) Patent No.: US 10,466,964 B2
(45) Date of Patent: *Nov. 5, 2019

(54) ENGINE ARCHITECTURE FOR PROCESSING FINITE AUTOMATA

(71) Applicant: Cavium, LLC, Santa Clara, CA (US)

(72) Inventors: Rajan Goyal, Saratoga, CA (US); Satyanarayana Lakshmipathi Billa, Sunnyvale, CA (US); Yossef Shanava, Sunnyvale, CA (US); Gregg A. Bouchard, Georgetown, TX (US); Timothy Toshio Nakada, Santa Clara, CA (US)

(73) Assignee: Cavium, LLC, Santa Clara, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/703,638

(22) Filed: Sep. 13, 2017

(65) Prior Publication Data

US 2018/0004483 A1    Jan. 4, 2018

Related U.S. Application Data

(63) Continuation of application No. 14/325,841, filed on Jul. 8, 2014, now Pat. No. 9,785,403.
(Continued)

(51) Int. Cl.
*G06F 5/14*    (2006.01)
*H04L 12/24*   (2006.01)
(Continued)

(52) U.S. Cl.
CPC .............. *G06F 5/14* (2013.01); *G06F 9/3885* (2013.01); *G06F 13/28* (2013.01);
(Continued)

(58) Field of Classification Search
CPC ....................... G06F 17/30985; H04L 63/1408
See application file for complete search history.

(56) References Cited

U.S. PATENT DOCUMENTS 5,428,554 A    6/1995   Laskoski
5,608,662 A    3/1997   Large et al.
(Continued)

FOREIGN PATENT DOCUMENTS

CN    1173676 A    2/1998
CN    1716958 A    1/2006
(Continued)

OTHER PUBLICATIONS

Becchi, M., "Data Structures, Algorithms and Architectures for Efficient Regular Expression Evaluation," Washington University in St. Louis School of Engineering & Applied Science, published May 2009.
(Continued)

*Primary Examiner* — Michael J Metzger
(74) *Attorney, Agent, or Firm* — Hamilton, Brook, Smith & Reynolds, P.C.

(57) ABSTRACT

An engine architecture for processing finite automata includes a hyper non-deterministic automata (HNA) processor specialized for non-deterministic finite automata (NFA) processing. The HNA processor includes a plurality of super-clusters and an HNA scheduler. Each super-cluster includes a plurality of clusters. Each cluster of the plurality of clusters includes a plurality of HNA processing units (HPUs). A corresponding plurality of HPUs of a corresponding plurality of clusters of at least one selected super-cluster is available as a resource pool of HPUs to the HNA scheduler for assignment of at least one HNA instruction to
(Continued)

enable acceleration of a match of at least one regular expression pattern in an input stream received from a network.

45 Claims, 29 Drawing Sheets

Related U.S. Application Data

(60) Provisional application No. 61/872,612, filed on Aug. 30, 2013, provisional application No. 61/872,622, filed on Aug. 30, 2013.

(51) Int. Cl.
  *G06F 21/56* (2013.01)
  *G06F 9/38* (2018.01)
  *G06F 16/903* (2019.01)
  *G06F 13/28* (2006.01)
  *H04L 29/06* (2006.01)

(52) U.S. Cl.
  CPC ...... *G06F 16/90344* (2019.01); *G06F 21/567* (2013.01); *H04L 41/28* (2013.01); *H04L 63/1408* (2013.01); *G06F 2205/126* (2013.01); *G06F 2213/2806* (2013.01)

(56) References Cited

U.S. PATENT DOCUMENTS

| | | | |
|---|---|---|---|
| 5,893,142 A | 4/1999 | Moyer et al. | |
| 6,314,513 B1 | 11/2001 | Ross et al. | |
| 6,954,424 B2 | 10/2005 | Barrack et al. | |
| 7,046,848 B1 | 5/2006 | Olcott | |
| 7,225,188 B1 | 5/2007 | Gai et al. | |
| 7,260,558 B1 | 8/2007 | Cheng et al. | |
| 7,308,446 B1 | 12/2007 | Panagrahy et al. | |
| 7,460,473 B1 | 12/2008 | Kodama et al. | |
| 7,594,081 B2 | 9/2009 | Bouchard et al. | |
| 7,702,629 B2 | 4/2010 | Cytron et al. | |
| 7,710,988 B1 | 5/2010 | Tripathi et al. | |
| 7,805,392 B1* | 9/2010 | Steele | G06F 17/30982 706/48 |
| 7,870,161 B2 | 1/2011 | Wang | |
| 7,944,920 B2 | 5/2011 | Pandya | |
| 7,949,683 B2 | 5/2011 | Goyal | |
| 7,962,434 B2 | 6/2011 | Estan et al. | |
| 8,024,802 B1 | 9/2011 | Preston | |
| 8,051,085 B1 | 11/2011 | Srinivasan et al. | |
| 8,180,803 B2 | 5/2012 | Goyal | |
| 8,301,788 B2 | 10/2012 | Bouchard et al. | |
| 8,392,590 B2 | 3/2013 | Bouchard et al. | |
| 8,407,794 B2 | 3/2013 | Kim et al. | |
| 8,473,523 B2 | 6/2013 | Goyal | |
| 8,516,456 B1* | 8/2013 | Starovoitov | G06F 8/427 717/141 |
| 8,554,698 B2 | 10/2013 | Bando et al. | |
| 8,566,344 B2 | 10/2013 | Bando et al. | |
| 8,683,590 B2 | 3/2014 | Namjoshi et al. | |
| 8,862,585 B2 | 10/2014 | Chao et al. | |
| 9,083,731 B2 | 7/2015 | Namjoshi et al. | |
| 9,203,805 B2 | 12/2015 | Goyal et al. | |
| 9,280,600 B2 | 3/2016 | Hay et al. | |
| 9,398,033 B2 | 7/2016 | Goyal et al. | |
| 9,419,943 B2 | 8/2016 | Goyal et al. | |
| 9,426,165 B2 | 8/2016 | Billa et al. | |
| 9,426,166 B2 | 8/2016 | Billa et al. | |
| 9,432,284 B2 | 8/2016 | Goyal et al. | |
| 9,438,561 B2 | 9/2016 | Goyal et al. | |
| 9,495,479 B2 | 11/2016 | Goyal | |
| 9,507,563 B2 | 11/2016 | Billa et al. | |
| 9,514,246 B2 | 12/2016 | Billa et al. | |
| 9,563,399 B2 | 2/2017 | Goyal et al. | |
| 9,602,532 B2 | 3/2017 | Goyal et al. | |
| 9,762,544 B2 | 9/2017 | Goyal et al. | |
| 9,785,403 B2 | 10/2017 | Goyal et al. | |
| 9,823,895 B2 | 11/2017 | Goyal et al. | |
| 9,904,630 B2 | 2/2018 | Goyal et al. | |
| 10,002,326 B2 | 6/2018 | Goyal et al. | |
| 10,110,558 B2 | 10/2018 | Goyal et al. | |
| 2001/0033552 A1 | 10/2001 | Barrack et al. | |
| 2003/0195874 A1 | 10/2003 | Akaboshi | |
| 2004/0059443 A1 | 3/2004 | Sharangpani | |
| 2004/0162826 A1 | 8/2004 | Wyschogrod et al. | |
| 2004/0172234 A1 | 9/2004 | Dapp et al. | |
| 2004/0225999 A1 | 11/2004 | Nuss | |
| 2005/0108518 A1 | 5/2005 | Pandya | |
| 2005/0278781 A1 | 12/2005 | Zhao et al. | |
| 2006/0069872 A1 | 3/2006 | Bouchard et al. | |
| 2006/0075206 A1 | 4/2006 | Bouchard et al. | |
| 2006/0085533 A1 | 4/2006 | Hussain et al. | |
| 2006/0101195 A1 | 5/2006 | Jain | |
| 2006/0136570 A1* | 6/2006 | Pandya | G06F 17/30985 709/217 |
| 2006/0224828 A1 | 10/2006 | Chen et al. | |
| 2006/0235811 A1 | 10/2006 | Fairweather | |
| 2007/0192863 A1 | 8/2007 | Kapoor et al. | |
| 2007/0282833 A1 | 12/2007 | McMillen | |
| 2008/0034427 A1 | 2/2008 | Cadambi et al. | |
| 2008/0047012 A1 | 2/2008 | Rubin et al. | |
| 2008/0059464 A1 | 3/2008 | Law et al. | |
| 2008/0071783 A1 | 3/2008 | Langmead et al. | |
| 2008/0077793 A1* | 3/2008 | Tan | G06F 21/56 713/168 |
| 2008/0082946 A1 | 4/2008 | Zilic et al. | |
| 2008/0097959 A1 | 4/2008 | Chen et al. | |
| 2008/0101371 A1 | 5/2008 | Law et al. | |
| 2008/0189784 A1 | 8/2008 | Mangione-Smith et al. | |
| 2008/0228991 A1 | 9/2008 | Ferroussat et al. | |
| 2008/0229415 A1 | 9/2008 | Kapoor et al. | |
| 2008/0262991 A1 | 10/2008 | Kapoor et al. | |
| 2008/0270833 A1 | 10/2008 | McMillen | |
| 2008/0271141 A1 | 10/2008 | Goldman et al. | |
| 2009/0106183 A1 | 4/2009 | Estan et al. | |
| 2009/0119279 A1 | 5/2009 | Goyal et al. | |
| 2009/0119399 A1 | 5/2009 | Hussain et al. | |
| 2009/0138440 A1 | 5/2009 | Goyal | |
| 2009/0138494 A1 | 5/2009 | Goyal | |
| 2010/0050177 A1* | 2/2010 | Goyal | G06F 21/552 718/102 |
| 2010/0095162 A1 | 4/2010 | Inakoshi | |
| 2010/0114973 A1 | 5/2010 | Goyal | |
| 2010/0138367 A1 | 6/2010 | Yamagaki | |
| 2010/0146623 A1 | 6/2010 | Namjoshi | |
| 2010/0153420 A1 | 6/2010 | Yang et al. | |
| 2010/0158394 A1 | 6/2010 | Chang et al. | |
| 2010/0174770 A1 | 7/2010 | Pandya | |
| 2010/0192225 A1 | 7/2010 | Ma et al. | |
| 2010/0198850 A1 | 8/2010 | Cytron et al. | |
| 2011/0016154 A1 | 1/2011 | Goyal et al. | |
| 2011/0066637 A1 | 3/2011 | Wang | |
| 2011/0072199 A1 | 3/2011 | Reiter et al. | |
| 2011/0093484 A1 | 4/2011 | Bando et al. | |
| 2011/0093496 A1 | 4/2011 | Bando et al. | |
| 2011/0113191 A1 | 5/2011 | Pandya | |
| 2011/0119440 A1 | 5/2011 | Pandya | |
| 2011/0173490 A1 | 7/2011 | Narayanaswamy et al. | |
| 2011/0185077 A1 | 7/2011 | Bremler-Barr et al. | |
| 2011/0238855 A1 | 9/2011 | Korsunsky et al. | |
| 2011/0295779 A1 | 12/2011 | Chen et al. | |
| 2011/0320393 A1 | 12/2011 | Pandya | |
| 2011/0320397 A1 | 12/2011 | Podkolzin et al. | |
| 2012/0017262 A1 | 1/2012 | Kapoor et al. | |
| 2012/0143854 A1 | 6/2012 | Goyal et al. | |
| 2012/0221494 A1 | 8/2012 | Pasetto et al. | |
| 2012/0221497 A1 | 8/2012 | Goyal et al. | |
| 2012/0275642 A1 | 11/2012 | Aller et al. | |
| 2012/0284222 A1* | 11/2012 | Atasu | H04L 63/1408 706/48 |
| 2012/0311529 A1 | 12/2012 | Beveridge et al. | |
| 2013/0074081 A1* | 3/2013 | Cassetti | G06F 9/4881 718/102 |

(56) References Cited

U.S. PATENT DOCUMENTS

| | | | |
|---|---|---|---|
| 2013/0097608 A1* | 4/2013 | Kessler | G06F 9/4881 718/104 |
| 2013/0103909 A1* | 4/2013 | Pangborn | G06F 12/08 711/138 |
| 2013/0133064 A1 | 5/2013 | Goyal et al. | |
| 2013/0191916 A1 | 7/2013 | Yao et al. | |
| 2013/0254197 A1 | 9/2013 | Hay et al. | |
| 2013/0290356 A1 | 10/2013 | Yang et al. | |
| 2014/0101176 A1 | 4/2014 | Ruehle | |
| 2014/0129775 A1 | 5/2014 | Ruehle | |
| 2014/0143874 A1 | 5/2014 | Namjoshi et al. | |
| 2014/0173254 A1 | 6/2014 | Ruehle | |
| 2014/0214749 A1 | 7/2014 | Ruehle | |
| 2015/0066927 A1 | 3/2015 | Goyal et al. | |
| 2015/0067123 A1 | 3/2015 | Goyal et al. | |
| 2015/0067200 A1 | 3/2015 | Goyal et al. | |
| 2015/0067776 A1 | 3/2015 | Goyal et al. | |
| 2015/0067836 A1 | 3/2015 | Billa et al. | |
| 2015/0067863 A1 | 3/2015 | Billa et al. | |
| 2015/0186786 A1 | 7/2015 | Goyal et al. | |
| 2015/0220454 A1 | 8/2015 | Goyal et al. | |
| 2015/0220845 A1 | 8/2015 | Goyal et al. | |
| 2015/0262009 A1 | 9/2015 | Szabo | |
| 2015/0293846 A1 | 10/2015 | Goyal et al. | |
| 2015/0295889 A1 | 10/2015 | Goyal et al. | |
| 2015/0295891 A1 | 10/2015 | Goyal et al. | |
| 2016/0021060 A1 | 1/2016 | Goyal et al. | |
| 2016/0021123 A1 | 1/2016 | Goyal et al. | |
| 2018/0004483 A1 | 1/2018 | Goyal et al. | |

FOREIGN PATENT DOCUMENTS

| | | |
|---|---|---|
| CN | 1759393 A | 4/2006 |
| CN | 1836245 A | 9/2006 |
| CN | 101013441 A | 8/2007 |
| CN | 101069170 A | 11/2007 |
| CN | 101201836 A | 6/2008 |
| CN | 101296116 A | 10/2008 |
| CN | 101351784 A | 1/2009 |
| CN | 101360088 A | 2/2009 |
| CN | 101639861 A | 2/2010 |
| CN | 101650718 A | 2/2010 |
| CN | 101853301 A | 10/2010 |
| CN | 101876986 A | 11/2010 |
| CN | 101944121 A | 1/2011 |
| CN | 102148805 A | 8/2011 |
| CN | 102184197 A | 9/2011 |
| CN | 102420750 A | 4/2012 |
| CN | 102902713 A | 1/2013 |
| CN | 103166802 A | 6/2013 |
| EP | 2276217 | 1/2011 |
| JP | 2004240766 A | 8/2004 |
| JP | 2007011998 A | 1/2007 |
| WO | WO 2004/013777 | 2/2004 |
| WO | WO 2007/109445 | 9/2007 |
| WO | WO 2008/005772 | 1/2008 |
| WO | WO 2009/017131 | 2/2009 |
| WO | WO 2013/078053 | 5/2013 |

OTHER PUBLICATIONS

Becchi, M., et al., "A Hybrid Finite Automation for Practical Deep Packet Inspection," published 2007.

Becchi, M., et al., "Extending Finite Automata to Efficiently Match Perl-compatible Regular Expressions", Proceedings of the 2008 CoNext Conference, Dec. 9-12, 2008.

Chodnicki, S., "An Introduction to Regular Expressions/Adventures with Open Source B1", available at http://type-exit.org/adventures-with-open-source-bi/2011/05/an-introduction-to-regular-expressions May 7, 2013 (29 pgs).

Hopcroft, J.E. and Ullman, J.D., "Introduction to Automata Theory, Languages, and Computation," *Addison-Wesley Publishing*, Reading, Massachusetts (1979). ISBN 0-201-02988-X. (See chapter 2.)

Rabin, M.O. and Scott, D., "Finite Automata and their Decision Problems," *IBM Journal of Research and Development*, 3(2): 114-125 (1959).

Singh, H., Regular Expressions, http://www.seeingwithe.org/topic7html.html (2002) downloaded May 7, 2013 (10 pgs).

Sipser, M., "Introduction to the Theory of Computation," *PWS*, Boston (1997). ISBN 0-534-94728-X. (See section 1.2: Nondeterminism, pp. 47-63.).

Sun, W., et al., "HFilter: Hybrid Finite Automation Based Stream Filtering for Deep and Recursive XML Data," School of Computer Science and Tech., published 2008.

Branch, J.W. et al., "Denial of Service Intrusion Detection Using Time Dependent Deterministic Finite Automata," Proc. Research Conference, Troy, NY, Oct. 2002.

Faro, S., et al., "Efficient Variants of the Backward-Oracle-Matching Algorithm," Proceedings of Prague Stringology Conference, 2008, pp. 146-160.

Navarro, G., "NR-grep: A Fast and Flexible Pattern Matching Tool," pp. 1-49, published 2000.

Navarro, G., "Pattern Matching," pp. 1-24, published 2002.

Hayes, C.L., et al., "DPICO: A High Speed Deep Packet Inspection Engine Using Compact Finite Automata," ANCS'07 pp. 195-203 (2007).

Košař, V., et al., "Towards Efficient Field Programmable Pattern Matching Array," 2015 Euromicro Conference on Digital System Design, IEEE, pp. 1-8 (2015).

Peng, K., et al., "Chain-Based DFA Deflation for Fast and Scalable Regular Expression Matching Using TCAM," ACM/IEEE Seventh Symposium on Architectures for Networking and Communications Systems Year 2011, pp. 24-35 (2011).

Lin, C-H., et al., "Optimization of Pattern Matching Circuits for Regular Expression of FPGA," IEEE Transactions on Very Large Scale Integration (VLSI) Systems, 15(12): 1303-1310 (2007).

Clark, C.R., et al., "Scalable Pattern Matching for High Speed Networks," 12th Annual IEEE Symposium on Field Programmable Custom Computing Machines, pp. 249-257 (2004).

Nitrox DPI CN17XX L7 Content Processor Family Preliminary Product Brief. Cavium Networks 2009. http://cavium.com/pdfFiles/Nitrox_DPI_PB_v1.pdf. Retrieved Apr. 6, 2017.

\* cited by examiner

DFA for the pattern: ".*a[^/n][^/n]"
Graph size of 8 nodes

Note: return arrows from each state if '/n' is seen are not shown.

| PATTERN | NUMBER OF NFA-NODES | NUMBER OF DFA-NODES |
|---|---|---|
| .*a[^\n] | 4 | 4 |
| .*a[^\n][^\n] | 5 | 8 |
| .*a[^\n][^\n][^\n] | 6 | 16 |
| .*a[^\n][^\n][^\n][^\n] | 7 | 32 |
| .*a[^\n][^\n][^\n][^\n][^\n] | 8 | 64 |
| • | • | • |
| • | • | • |
| • | • | • |
| .*a[^\n]$_1$...[^\n]$_n$ | $n+3$ | $2^n$ |

FIG. 2G

| | CURRENT NODE 530 | CURRENT OFFSET/ SEGMENT 532 | MATCH RESULT 534 | ACTION 536 |
|---|---|---|---|---|
| 540a | N0 | 0/h | POSITIVE | UPDATE OFFSET / TRANSITION |
| 540b | N1 | — | — | PUSH {N3,OFFSET1} / TRANSITION |
| 540c | N2 | 1/x | NEGATIVE | POP {N3,OFFSET1} / TRANSITION |
| 540d | N3 | 1/x | POSITIVE | UPDATE OFFSET / TRANSITION |
| 540e | N1 | — | — | PUSH {N3,OFFSET2} / TRANSITION |
| 540f | N2 | 2/a | POSITIVE | UPDATE OFFSET / TRANSITION |
| 540g | N4 | 3/b | POSITIVE | UPDATE OFFSET / TRANSITION |
| 540h | N5 | — | FINAL | DISCONTINUE / POP {N3,OFFSET2} / WRITE RESULT |

FIG. 5B

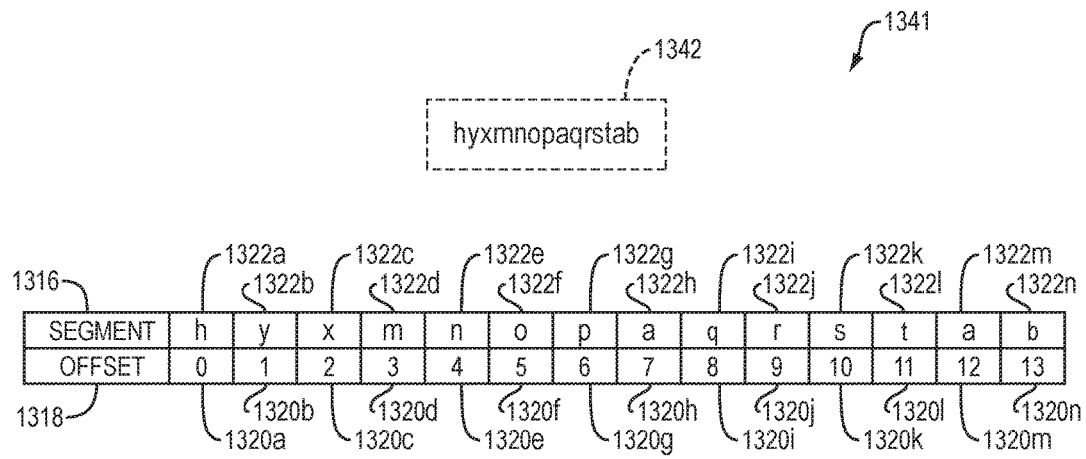

FIG. 13B

| CURRENT NODE 1330 | CURRENT OFFSET/ SEGMENT 1332 | MATCH RESULT 1334 | ACTION 1336 |
|---|---|---|---|
| N0 | 0/h | POSITIVE | UPDATE OFFSET / TRANSITION |
| N1 | - | - | PUSH {N3,OFFSET1} / TRANSITION |
| N2 | 1/y | NEGATIVE | POP {N3,OFFSET1} / TRANSITION |
| N3 | 1/y | POSITIVE | UPDATE OFFSET / TRANSITION |
| N1 | - | - | PUSH {N3,OFFSET2} / TRANSITION |
| N2 | 2/x | NEGATIVE | POP {N3,OFFSET2} / TRANSITION |
| N3 | 2/x | POSITIVE | UPDATE OFFSET / TRANSITION |
| N1 | - | - | PUSH {N3,OFFSET3} / TRANSITION |
| N2 | 3/m | NEGATIVE | POP {N3,OFFSET3} / TRANSITION |
| N3 | 3/m | POSITIVE | UPDATE OFFSET / TRANSITION |
| N1 | - | - | PUSH {N3,OFFSET4} / TRANSITION |
| N2 | 4/n | NEGATIVE | POP {N3,OFFSET4} / TRANSITION |
| N3 | 4/n | POSITIVE | UPDATE OFFSET / TRANSITION |
| N1 | - | - | PUSH {N3,OFFSET5} / TRANSITION |
| N2 | 5/o | NEGATIVE | POP {N3,OFFSET5} / TRANSITION |
| N3 | 5/o | POSITIVE | UPDATE OFFSET / TRANSITION |
| N1 | - | - | PUSH {N3,OFFSET6} / TRANSITION |

FIG. 13C

| | | | | 1338b |
|---|---|---|---|---|
| 1340r | N2 | 6/p | NEGATIVE | POP {N3,OFFSET6} / TRANSITION |
| 1340s | N3 | 6/p | POSITIVE | UPDATE OFFSET / TRANSITION |
| 1340t | N1 | - | - | PUSH {N3,OFFSET7} / TRANSITION |
| 1340u | N2 | 7/a | POSITIVE | UPDATE OFFSET / TRANSITION |
| 1340v | N4 | 8/q | NEGATIVE | POP {N3,OFFSET7} / TRANSITION |
| 1340w | N3 | 7/a | POSITIVE | UPDATE OFFSET / TRANSITION |
| 1340x | N1 | - | - | PUSH {N3,OFFSET8} / TRANSITION |
| 1340y | N2 | 8/q | NEGATIVE | POP {N3,OFFSET8} / TRANSITION |
| 1340z | N3 | 8/q | POSITIVE | UPDATE OFFSET / TRANSITION |
| 1340aa | N1 | - | - | PUSH {N3,OFFSET9} / TRANSITION |
| 1340bb | N2 | 9/r | NEGATIVE | POP {N3,OFFSET9} / TRANSITION |
| 1340cc | N3 | 9/r | POSITIVE | UPDATE OFFSET / TRANSITION |
| 1340dd | N1 | - | - | PUSH {N3,OFFSET10} / TRANSITION |
| 1340ee | N2 | 10/s | NEGATIVE | POP {N3,OFFSET10} / TRANSITION |
| 1340ff | N3 | 10/s | POSITIVE | UPDATE OFFSET / TRANSITION |
| 1340gg | N1 | - | - | PUSH {N3,OFFSET11} / TRANSITION |
| 1340hh | N2 | 11/t | NEGATIVE | POP {N3,OFFSET11} / TRANSITION |
| 1340ii | N3 | 11/t | POSITIVE | UPDATE OFFSET / TRANSITION |
| 1340jj | N1 | - | - | PUSH {N3,OFFSET12} / TRANSITION |
| 1340kk | N2 | 12/a | POSITIVE | UPDATE OFFSET / TRANSITION |
| 1340ll | N4 | 13/b | POSITIVE | UPDATE OFFSET / TRANSITION |
| 1340mm | N5 | - | FINAL | DISCONTINUE / POP {N3,OFFSET12} / WRITE RESULT |

FIG. 13D

ENGINE ARCHITECTURE FOR PROCESSING FINITE AUTOMATA

RELATED APPLICATIONS

This application is a continuation of U.S. application Ser. No. 14/325,841, filed on Jul. 8, 2014, now U.S. Pat. No. 9,785,403, which claims the benefit of U.S. Provisional Application No. 61/872,612, filed on Aug. 30, 2013 and U.S. Provisional Application No. 61/872,622, filed on Aug. 30, 2013. The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers, such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at "wire-speed" (i.e., a rate of data transfer over a physical medium of the network over which data is transmitted and received).

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor may perform such compute intensive tasks, it may not provide sufficient performance to process the data so that the data may be forwarded at wire-speed.

An Intrusion Detection System (IDS) application may inspect content of individual packets flowing through a network, and may identify suspicious patterns that may indicate an attempt to break into or compromise a system. One example of a suspicious pattern may be a particular text string in a packet followed by 100 characters later by another particular text string. Such content aware networking may require inspection of the contents of packets at wire speed. The content may be analyzed to determine whether there has been a security breach or an intrusion.

A large number of patterns and rules in the form of regular expressions (also referred to herein as regular expression patterns) may be applied to ensure that all security breaches or intrusions are detected. A regular expression is a compact method for describing a pattern in a string of characters. The simplest pattern matched by a regular expression is a single character or string of characters, for example, /c/ or /cat/. The regular expression may also include operators and meta-characters that have a special meaning. Through the use of meta-characters, the regular expression may be used for more complicated searches such as, "abc.*xyz." That is, find the string "abc" followed by the string "xyz," with an unlimited number of characters in-between "abc" and "xyz." Another example is the regular expression "abc..abc.*xyz;" that is, find the string "abc," followed two characters later by the string "abc," and an unlimited number of characters later by the string "xyz."

Content searching is typically performed using a search method such as, Deterministic Finite Automata (DFA) or Non-Deterministic Finite Automata (NFA), to process the regular expression.

SUMMARY

Embodiments disclosed herein provide a method, apparatus, and corresponding system for engine architecture for processing of finite automata.

According to one embodiment, a security appliance may be operatively coupled to a network. The security appliance may comprise at least one Central Processing Unit (CPU) core and at least one hyper non-deterministic automata (HNA) processor operatively coupled to the at least one CPU core. The at least one HNA processor may be specialized for non-deterministic finite automata (NFA) processing. The at least one HNA processor may include a plurality of super-clusters. Each super-cluster may include a plurality of clusters. Each cluster of the plurality of clusters may include a plurality of HNA processing units (HPUs). The at least one CPU core may be configured to select at least one super-cluster of the plurality of super-clusters. The at least one HNA processor may include an HNA on-chip instruction queue configured to store at least one HNA instruction. The at least one HNA processor may include an HNA scheduler. The HNA scheduler may be configured to select a given HPU of the plurality of HPUs of the plurality of clusters of the at least one super-cluster selected and assign the at least one HNA instruction to the given HPU selected in order to initiate matching at least one regular expression pattern in an input stream received from the network.

Each super-cluster may further include a super-cluster graph memory that is exclusive to a corresponding super-cluster. The super-cluster graph memory may be accessible to a corresponding plurality of HPUs of a corresponding plurality of clusters of the corresponding super-cluster. The super-cluster graph memory may be configured to store a subset of nodes of at least one per-pattern NFA statically. The subset of nodes may be determined by a compiler of the at least one per-pattern NFA.

Each super-cluster may further include at least one super-cluster character class memory that is exclusive to the corresponding super-cluster. Each at least one super-cluster character class memory may be configured to store regular expression pattern character class definitions statically.

The super-cluster graph memory and the at least one super-cluster character class memory may be unified.

The at least one super-cluster character class memory may be shared by the corresponding plurality of HPUs of the corresponding plurality of clusters of the corresponding super-cluster.

Each super-cluster may further include at least one super-cluster character class memory. Each at least one super-cluster character class memory may be exclusive to a given cluster of a corresponding plurality of clusters of a corresponding super-cluster and shared by a corresponding plurality of HPUs of the given cluster. Each at least one super-cluster character class memory may be configured to store regular expression pattern character class definitions statically.

The at least one CPU core may be further configured to select the at least one super-cluster of the plurality of super-clusters by restricting super-cluster selection based on a graph identifier associated with the at least one HNA instruction.

The graph identifier may be associated with a given per-pattern NFA of a plurality of per-pattern NFAs and restricting the super-cluster selection may include a determination that at least one node of the given per-pattern NFA is be stored in a super-cluster graph memory exclusive to the at least one super-cluster selected.

The HNA scheduler may be configured to select the given HPU from a restricted set of HPUs that may include each corresponding plurality of HPUs of each corresponding plurality of clusters of the at least one super-cluster selected. The at least one CPU core may be further configured to select the at least one super-cluster of the plurality of super-clusters based on a determination that at least one node of the given per-pattern NFA associated with the graph identifier is stored in a super-cluster graph memory that is exclusive to the at least one super-cluster selected.

The HNA scheduler may be further configured to select the given HPU from the restricted set of HPUs based on a round robin schedule for HPUs in the restricted set of HPUs.

The HNA scheduler may be further configured to select the given HPU from the restricted set of HPUs based on instantaneous loading of each HPU in the restricted set of HPUs.

Each super-cluster may further include a super-cluster graph memory that is exclusive to the corresponding super-cluster. Each super-cluster graph memory may be configured to store at least one node of at least one per-pattern NFA of a plurality of per-pattern NFAs to replicate the at least one node in each super-cluster graph memory of each super-cluster of the at least one HNA processor.

The at least one CPU core may be further configured to provide the HNA scheduler with an option to select the at least one super-cluster based on a determination that a given per-pattern NFA of the at least one per-pattern NFA associated with the at least one HNA instruction is replicated. The HNA scheduler may be further configured to select the at least one super-cluster based on the option provided and (i) a first round robin schedule for the plurality of super-clusters, (ii) a first instantaneous loading of the plurality of super-clusters or (ii) a combination of (i) and (ii). The HNA scheduler may be further configured to select the given HPU from the plurality of HPUs of the plurality of clusters of the at least one super-cluster selected based on a second round robin schedule for the plurality of HPUs of the plurality of clusters of the at least one super-cluster selected, a second instantaneous loading of the plurality of HPUs of the plurality of clusters of the at least one super-cluster selected, or a combination thereof.

The at least one HNA processor may further include an HNA on-chip graph memory accessible to the plurality of HPUs of the plurality of clusters of the plurality of super-clusters. The HNA on-chip graph memory may be configured to store a subset of nodes of at least one per-pattern NFA statically. The subset of nodes may be determined by a compiler of the at least one per-pattern NFA.

The at least one HNA instruction may be a first at least one HNA instruction and the security appliance may further comprise at least one system memory operatively coupled to the at least one CPU core and the at least one HNA processor. The at least one system memory may be configured to include an HNA off-chip instruction queue for storing a second at least one HNA instruction. The second at least one HNA instruction may be pending transfer to the HNA on-chip instruction queue of the HNA processor. The at least one system memory may further include an HNA off-chip graph memory configured to store a subset of nodes of at least one per-pattern NFA statically. The subset of nodes may be determined by a compiler of the at least one per-pattern NFA.

The security appliance may further comprise at least one Local Memory Controller (LMC). The at least one LMC may be operatively coupled to the at least one HNA processor and the at least one system memory. A given LMC of the at least one LMC may be configured to enable non-coherent access of the at least one system memory for access of the HNA off-chip graph memory by the at least one HNA processor.

The at least one system memory may be further configured to include an HNA packet data memory configured to store multiple payloads contiguously, each of the multiple payloads may have a fixed maximum length. Each of the multiple payloads may be associated with a given HNA instruction of the first at least one HNA instruction stored in the HNA on-chip instruction queue or the second at least one HNA instruction that is pending transfer to the HNA on-chip instruction queue.

The at least one system memory may be further configured to include an HNA input stack partition configured to store at least one HNA input stack. Each at least one HNA input stack may be configured to store at least one HNA input job for at least one HPU of the plurality of HPUs of the plurality of clusters of the plurality of super-clusters. The at least one system memory may be further configured to include an HNA off-chip run stack partition configured to store at least one off-chip run stack to extend storage of at least one on-chip run stack. Each at least one on-chip run stack may be configured to store at least one run-time HNA job for the at least one HPU. The at least one system memory may be further configured to include an HNA off-chip save buffer partition configured to extend storage of at least one on-chip save buffer. Each on-chip save buffer may be configured to store the at least one run-time HNA job for the at least one HPU based on detecting a payload boundary. The at least one system memory may be further configured to include an HNA off-chip result buffer partition configured to store at least one final match result entry of the at least one regular expression pattern determined by the at least one HPU to match in the input stream. Each at least one HNA instruction stored may identify a given HNA input stack of the HNA input stack partition, a given HNA off-chip run stack of the HNA off-chip run stack partition, a given HNA off-chip save buffer of the HNA off-chip save buffer partition, and a given HNA off-chip result buffer of the HNA off-chip result buffer partition.

A given LMC of the at least one LMC may be configured to enable the at least one HNA processor to access the HNA packet data memory, HNA input stack partition, HNA off-chip instruction queue, HNA off-chip run stack partition, HNA off-chip save buffer partition, and the HNA off-chip result buffer partition via a coherent path, and to enable the at least one HNA processor to access the HNA off-chip graph memory via a non-coherent path.

Each HPU of the plurality of HPUs of the plurality of clusters of the plurality of super-clusters may include a node cache configured to cache one or more nodes from a super-cluster graph memory, an HNA on-chip graph memory, or an HNA off-chip graph memory. Each HPU of the plurality of HPUs of the plurality of clusters of the plurality of super-clusters may further include a character class cache configured to cache one or more regular expression pattern character class definitions from a super-cluster character class memory and a payload buffer configured to store a given payload from an HNA packet data memory. The at least one HNA instruction may include an identifier for a location of the given payload in the HNA packet data memory. Each HPU of the plurality of HPUs of the plurality of clusters of the plurality of super-clusters may further include a top of stack register configured to store a single HNA job, a run stack configured to store multiple HNA jobs, and a unified memory configured to store first content of a save stack and second content of a match result buffer. The first content may include one or more HNA jobs stored in the run stack and the second content may include one or more final match results. Each HPU of the plurality of HPUs of the plurality of clusters of the plurality of super-clusters may further include an HNA processing core operatively coupled to the node cache, character class cache, payload buffer, top of stack register, run stack, and the unified memory. The HNA processing core may be configured to walk at least one per-pattern NFA with payload segments stored in the payload buffer to determine a match of the at least one regular expression pattern.

Each super-cluster may further include a super-cluster graph memory exclusive to a corresponding super-cluster. The at least one HNA processor may further include an HNA on-chip graph memory shared by the plurality of super-clusters. The security appliance may further comprise at least one system memory configured to include an HNA off-chip graph memory shared by the plurality of super-clusters. The given HPU selected may be configured to walk nodes of a given per-pattern NFA of at least one per-pattern NFA with segments of a payload of the input stream based on the at least one HNA instruction assigned. The nodes walked may be stored in a node cache exclusive to the given HPU selected, the super-cluster graph memory, the HNA on-chip graph memory, the HNA off-chip graph memory, or a combination thereof.

The plurality of HPUs of the plurality of clusters of the at least one super-cluster selected may form a resource pool of HPUs available to the HNA scheduler for selection to enable acceleration of the matching.

Another example embodiment disclosed herein includes a hyper non-deterministic finite automata (HNA) processor specialized for non-deterministic finite automata (NFA) processing. The HNA processor may comprise a plurality of super-clusters. Each super-cluster may include a plurality of clusters. Each cluster of the plurality of clusters may include a plurality of HNA processing units (HPUs). The HNA processor may further comprise an HNA on-chip instruction queue that may be configured to store at least one HNA instruction. The plurality of HPUs of the plurality of clusters of at least one selected super-cluster of the plurality of super-clusters may form a resource pool of HPUs available for assignment of the at least one HNA instruction. The HNA processor may further comprise an HNA scheduler configured to select a given HPU of the resource pool formed and assign the at least one HNA instruction to the given HPU selected in order to initiate matching at least one regular expression pattern in an input stream received from a network.

Another example embodiment disclosed herein includes a method corresponding to operations consistent with the embodiments disclosed herein.

Further, yet another example embodiment may include a non-transitory computer-readable medium having stored thereon a sequence of instructions which, when loaded and executed by a processor, causes a processor to perform methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-G are example embodiments of NFA and DFA graphs and an example embodiment of a table illustrating the concept of graph explosion.

FIG. 5B is a table of an example embodiment of processing cycles for walking the per-pattern NFA graph of FIG. 5A with a payload.

FIG. 13B is a block diagram of an example embodiment of a payload and segments with respective offsets in the payload.

FIG. 13C is a table of an example embodiment of processing cycles for walking the per-pattern NFA graph of FIG. 5A with the payload of FIG. 13B by selecting the lazy path at the split node.

FIG. 13D is a table that is a continuation of the table of FIG. 13C.

DETAILED DESCRIPTION

According to embodiments disclosed herein, an engine architecture for finite automata processing may include a Hyper Non-Deterministic Automata (HNA) processor that offers hardware-acceleration for Non-Deterministic Finite Automata (NFA) processing. The HNA processor may be a co-processor that is complimentary to a Hyper Finite Automata (HFA) co-processor. The HFA co-processor may offer hardware-acceleration for Deterministic Finite Automata (DFA) processing. The HNA and HFA may be regular expression processors that may be employed for deep packet inspection applications such as intrusion detection/prevention (IDP), packet classification, server load balancing, web-switching, Storage Array Networks (SANs), firewall load balancing, virus scanning, or any other suitable deep packet inspection application. The HNA and HFA may offload general purpose Central Processing Unit (CPU) cores from the heavy burden of performing compute and memory intensive pattern matching processes.

Figure 1A:
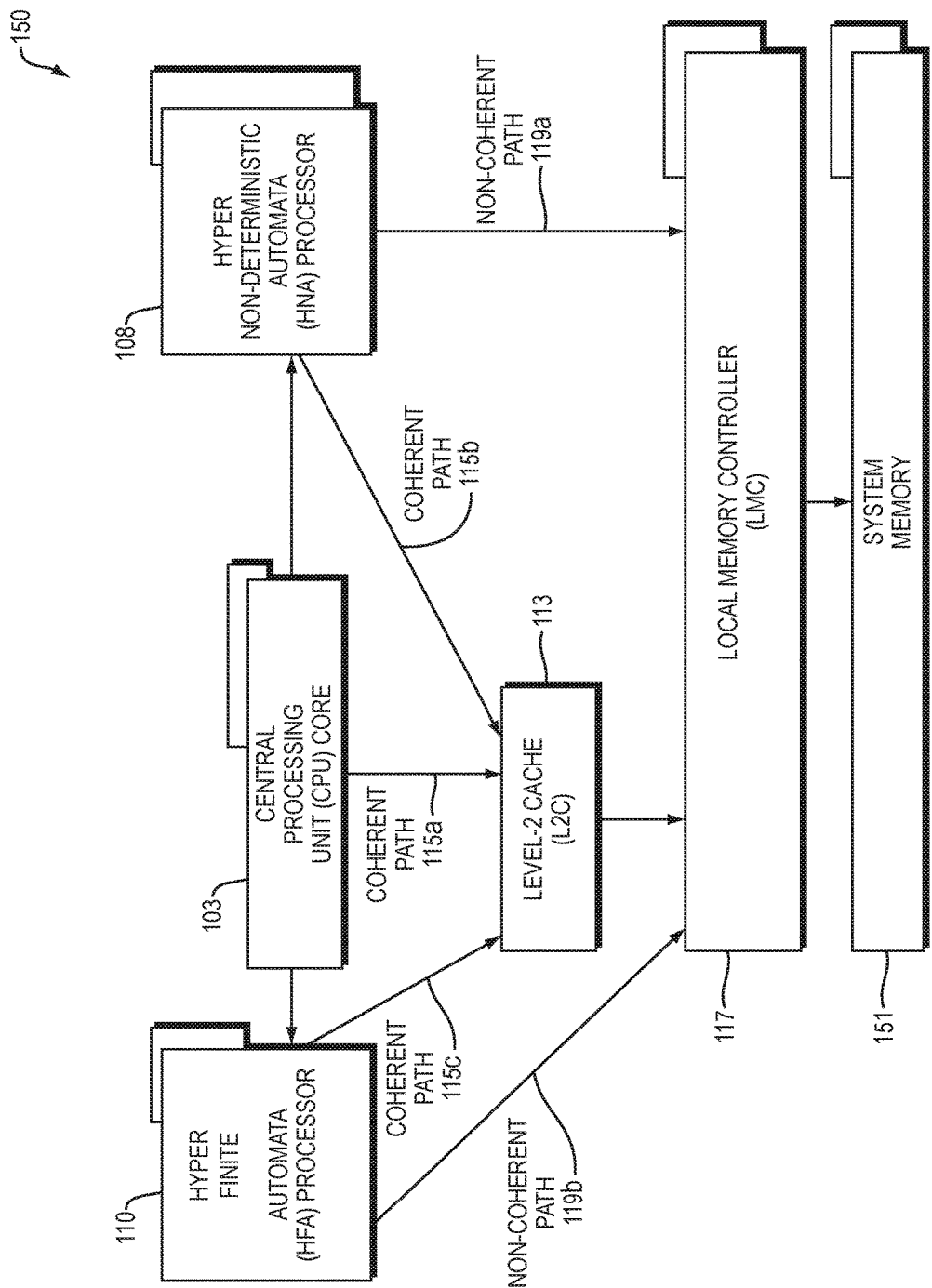
FIG. 1A is a block diagram of an example embodiment of an engine architecture for finite automata processing.

FIG. 1A is a block diagram 150 of an example embodiment of an engine architecture for finite automata processing. According to the example embodiment, at least one CPU core 103 may be operatively coupled to at least one HFA processor 110 and at least one HNA processor 108. Operative coupling may include coupling via a bus, interrupt, mailbox, one or more circuit elements, a communications path, communicatively coupling, or coupling in any other suitable manner. The at least one HFA processor 110 may be specialized for DFA processing and the at least one HNA processor 108 may be specialized for NFA processing. The at least one CPU core 103, the at least one HFA processor 110, and the at least one HNA processor 108 may be configured to share a Level-2 cache (L2C) 113.

The at least one CPU core 103, the at least one HNA processor 108, and the at least one HFA processor 110 may each be operatively coupled to the L2C 113 via coherent paths 115a, 115b, and 115c, respectively, that may be separate coherent memory buses, a single shared coherent memory bus, separate coherent communication channels, a shared coherent communication channel or any other suitable coherent path. An L2C memory controller (not shown) may employ the L2C 113 to maintain memory reference coherence for memory accesses via the coherent paths 115a, 115b, and 115c. For example, memory reference coherence may be maintained by invalidating a data copy of content read by the at least one CPU core 103 from a given memory location if the at least one HNA processor 108 accesses the given memory location via the coherent path 115b. Invalidating the data copy may enable the at least one CPU core 103 or the at least one HFA processor 110 to obtain a most recently updated value for the given memory location by the at least one HNA processor 108, and vice versus.

The example embodiment may further include at least one local memory controller (LMC) 117 that may be operatively coupled to the L2C 113 and configured to manage accesses, such as read, write, load, store or any other suitable access to or from at least one system memory 151. As such, an access of a location in the at least one system memory 151 by the at least one CPU core 103, the at least one HNA processor 108, or the at least one HFA processor 110 via the coherent paths 115a, 115b or 115c enables the at least one CPU core 103, the at least one HFA processor 110, and the at least one HNA processor 108 to maintain a common value for the location accessed.

Further, as disclosed below in reference to FIG. 1B and FIG. 4A, the at least one HNA processor 108 may include multiple HNA processing units (HPUs) each including at least one HNA processing core. As such, accesses via the coherent paths 115a or 115b may enable each at least one CPU core of the at least one CPU core 103 as well as each at least one HNA processing core of each of the HPUs of the at least one HNA processor 108 to maintain memory reference coherence. The HPUs may be concurrent HPUs enabling an aggregate performance of the at least one HNA processor 108 of at least 20 Gbps.

Turning back to FIG. 1A, the at least one HFA processor 110 and the at least one HNA processor 108 may be operatively coupled to the LMC 117 via non-coherent paths 119a and 119b, respectively, enabling the at least one HFA processor 110 and the at least one HNA processor 108 to bypass the L2C 113 to reduce memory access latency to improve match performance. According to embodiments disclosed herein, the non-coherent path 119a may enable the HNA processor 108 to access the at least one system memory 151 directly via the LMC 117, bypassing the LC2 113 based on a particular partition or location of the at least one system memory 151 that is accessed by the HNA processor 108.

For example, if the particular partition or location of the at least one system memory 151 includes read-only content from a perspective of the HNA processor 108, the non-coherent path 119a may be employed since maintaining coherence based on the access would be a non-issue. Such read-only content may include graph memory content, such as one or more nodes of at least one NFA graph (not shown) that may be used by the HNA processor 108 for matching regular expressions in an input stream. Bypassing the L2C 113 by accessing the at least one system memory 151 via the non-coherent path 119a may improve match performance of the at least one HNA processor 108 by avoiding latency that would otherwise be incurred in order to maintain coherence for the access. Further, as the read-only content may advantageously include one or more nodes of the at least one NFA graph that may have no temporal or spatial locality, as disclosed below with reference to FIG. 13D, accessing the one or more nodes via the non-coherent path 119a may achieve another advantage because such accesses would not pollute existing content of the L2C 113.

Figure 1B:
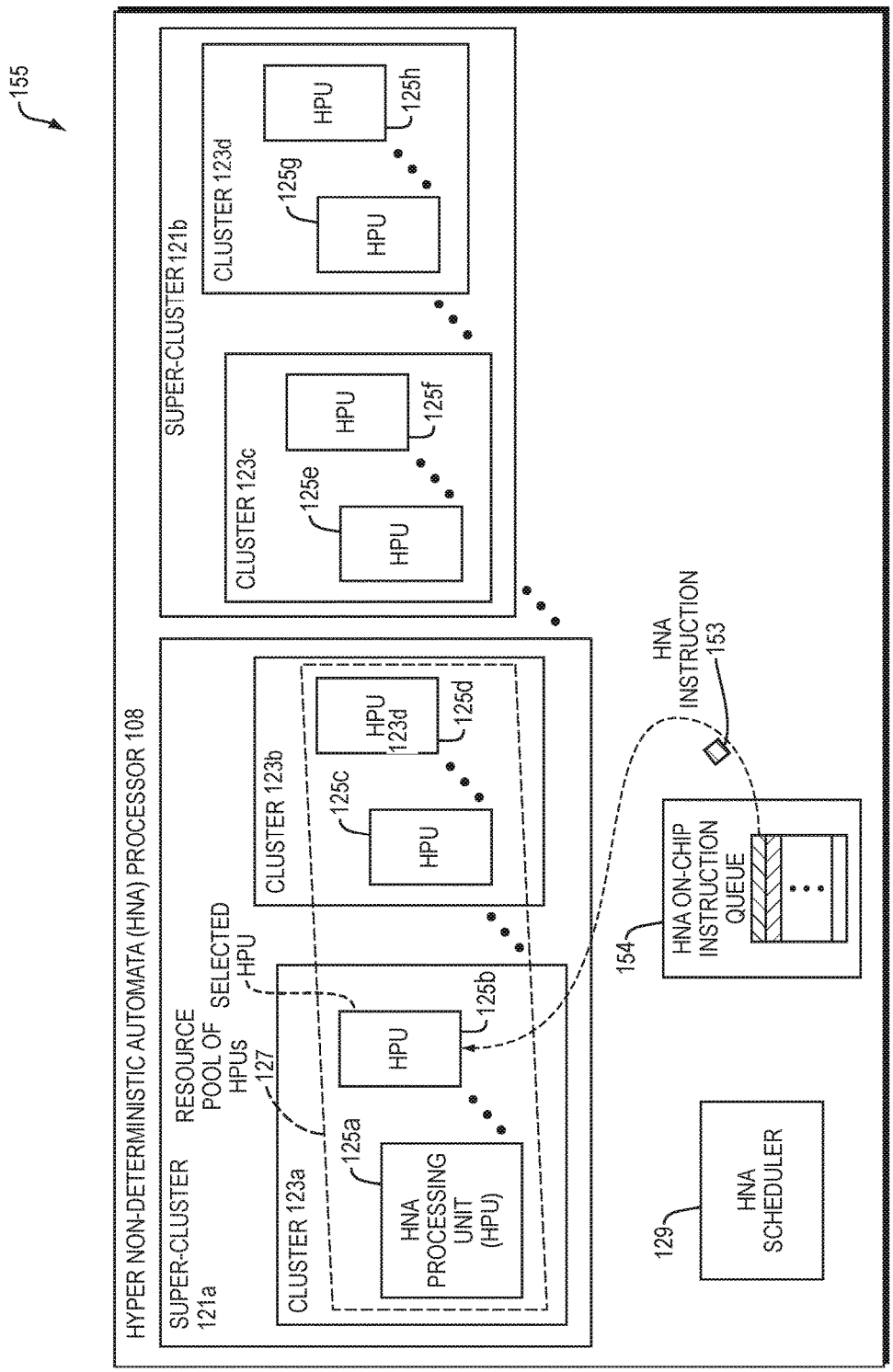
FIG. 1B is a block diagram of an example embodiment of a Hyper Non-Deterministic Automata (HNA) processor.

FIG. 1B is a block diagram 155 of an example embodiment of the HNA processor 108. As disclosed above in reference to FIG. 1A, the HNA processor 108 may be specialized for NFA processing. The HNA processor 108 may comprise a plurality of super-clusters, such as the super-clusters 121a and 121b. Each super-cluster may include a plurality of clusters, such as the clusters 123a and 123b of super-cluster 121a and the clusters 123c and 123d of super-cluster 121b. Each cluster of the plurality of clusters 123a-d may include a plurality of HNA processing units (HPUs), such as the HPUs 125a and 125b of the cluster 123a, the HPUs 125c and 125d of the cluster 123b, the HPUs 125e and 125f of the cluster 123c, and the HPUs 125g and 125h of the cluster 123d. Each of the HPUs 125a-f may have an architecture as disclosed below in reference to FIG. 4A. The HNA processor 108 may further comprise an HNA on-chip instruction queue 154 that may be configured to store at least one HNA instruction 153 that may be assigned to a given HPU of the HPUs 125a-f.

Assigning the at least one HNA instruction 153 may include writing a specific doorbell register that is configured to trigger a given HPU of the plurality of HPUs to start a graph walk using information associated with an HNA instruction as disclosed below with reference to FIG. 4A. Assigning may including triggering an interrupt associated with the given HPU, or assigning in any other suitable manner.

The HNA on-chip instruction queue 154 may be maintained as a linked list of HNA instruction chunks or maintained in any other suitable manner. Each HNA instruction chunk may include a programmable number of fixed length HNA instructions. Software may allocate the instruction chunks that may be freed by the HPUs. HNA instruction chunks may be immediately followed by a 64-bit word that may include a next chunk pointer link. A given HPU may be configured to read the next chunk pointer as soon as a doorbell count associated with the given HPU indicates that the last HNA instruction in an instruction chunk contains a valid HNA instruction. The given HPU may reads words from the instruction queue, for example, starting with a head pointer, and based on processing a last instruction of an instruction chunk, the given HPU may traverse to a next instruction chunk using the next chunk pointer link. In this way, as the last HNA instruction of a chunk is retired, the given HPU may automatically free the retired memory chunk back to a managed pool. The next chunk pointer may be the next 64-bit word after the last HNA instruction within an instruction chunk. The next chunk pointer may specify the next chunk pointer (forward link), to enable the given HPU to locate the next instruction chunk that may be stored in the at least one system memory 151.

To insert an HNA instruction into HNA on-chip instruction queue 154, software may write the HNA instruction to a tail pointer maintained by software, followed by a write to a given HNA doorbell count register along with a total number of HNA instructions to be added to the HNA on-chip instruction queue 154. Writes to the given HNA doorbell register may be cumulative and may reflect a total number of pending HNA instructions. As the given HPU retires instructions, a corresponding HNA doorbell count register may be auto-decremented. The given HPU may be configured to continue to process HNA instructions until all pending requests have been serviced, for example, until the associated accumulated doorbell count register is zero.

According to embodiments disclosed herein, the plurality of HPUs 125a-d of the plurality of clusters 123a and 123b of at least one selected super-cluster 121a of the plurality of super-clusters 121a and 121b may form a resource pool of HPUs 127 available for assignment of the at least one HNA instruction 153. The HNA processor 108 may further comprise an HNA scheduler 129 that may be configured to select a given HPU, such as the HPU 125b, from the resource pool of HPUs 127 that was formed and the HNA scheduler 129 may assign the at least one HNA instruction 153 to the given HPU 125b selected in order to initiate matching at least one regular expression pattern (not shown) in an input stream (not shown) received from a network (not shown). The plurality of HPUs 125a-d that form the resource pool of HPUs 127 that may be available to the HNA scheduler 129 for selection may enable acceleration of the matching.

It should be understood that HNA components referred to herein as "on-chip" refer to components that may be integrated on a single chip substrate of the HNA processor 108 and that a total number shown for super-clusters, clusters, or HPUs is for illustrative purposes and that any suitable total number may be employed. For example, a first total number of the plurality of super-clusters may be at least two, a second total number of the plurality of clusters may be at least two, and a third total number of the plurality of HPUs may be at least ten.

Figure 1C:
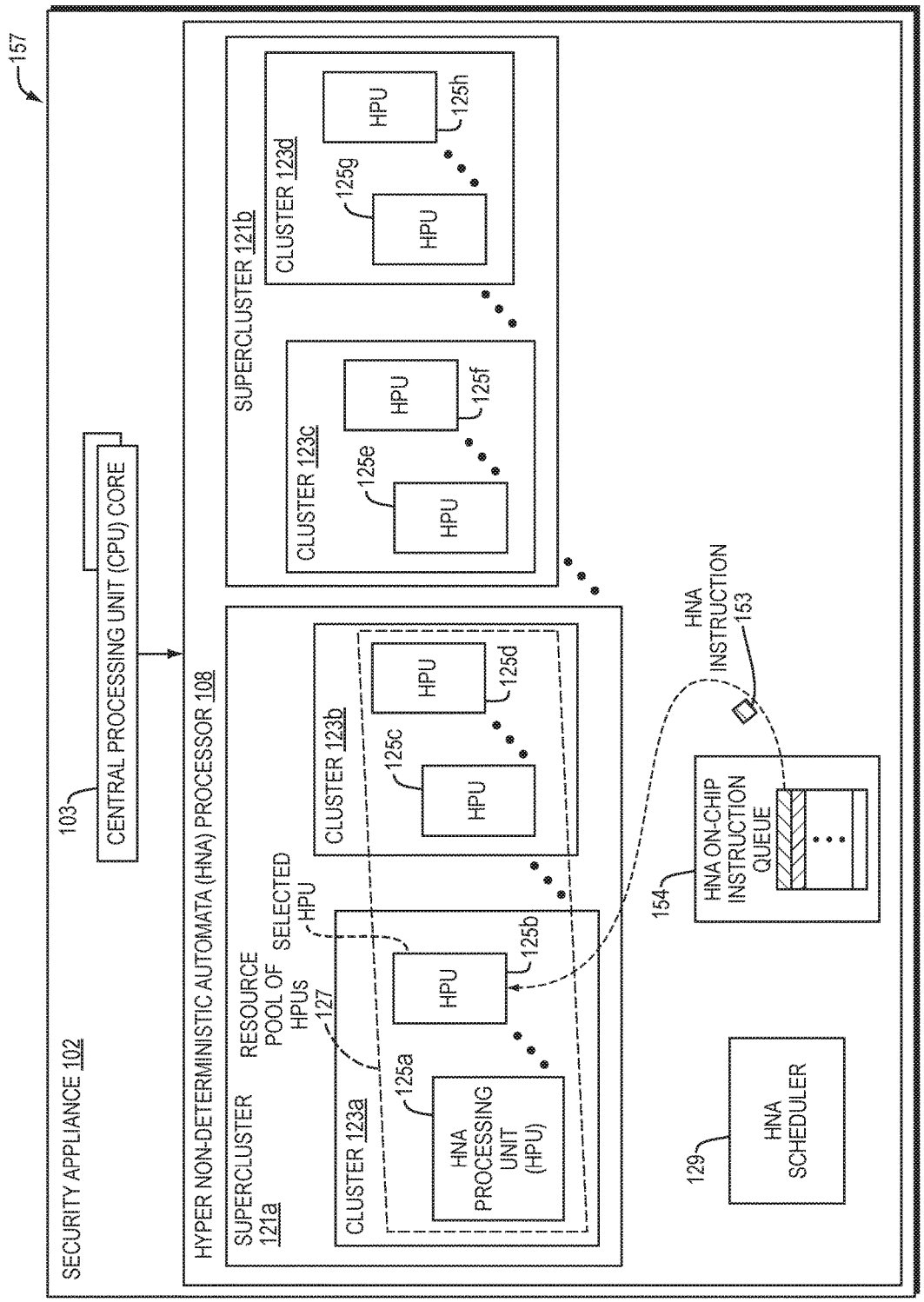
FIG. 1C is a block diagram of an example embodiment of a security appliance that includes an example embodiment of the HNA processor.

FIG. 1C is a block diagram 157 of an embodiment of a security appliance 102 that includes an example embodiment of the HNA processor 108. The security appliance 102 may be operatively coupled to a network (not shown). The network may be a Wide Area Network (WAN), Local Area Network (LAN), wireless network, or any other suitable network. The security appliance 102 may comprise the at least one CPU core 103 and the at least one HNA processor 108 that may be operatively coupled to the at least one CPU core 103 as disclosed above in reference to FIG. 1A. The at least one HNA processor 108 may be specialized for non-deterministic finite automata (NFA) processing.

According to embodiments disclosed herein, the at least one HNA processor 108 may include a plurality of super-clusters, such as the super-clusters 121a and 121b disclosed above. Each super-cluster may include a plurality of clusters, such as the clusters 123a and 123b of super-cluster 121a and the clusters 123c and 123d of super-cluster 121b. Each cluster of the plurality of clusters 123a-d may include a plurality of HNA processing units (HPUs), such as the HPUs 125a and 125b of the cluster 123a, the HPUs 125c and 125d of the cluster 123b, the HPUs 125e and 125f of the cluster 123c, and the HPUs 125g and 125h of the cluster 123d. The at least one CPU core 103 may be configured to select at least one super-cluster, such as the super-cluster 121a, of the plurality of super-clusters 121a and 121b while submitting instructions to the HNA processor 108.

The at least one HNA processor 108 may include an HNA on-chip instruction queue 154 that may be configured to store the at least one HNA instruction 153. The at least one HNA processor 108 may include the HNA scheduler 129. The HNA scheduler 129 may be configured to select the given HPU 125b of the plurality of HPUs 125a-d of the plurality of clusters 123a and 123b of the at least one super-cluster selected 121a and assign the at least one HNA instruction 153 to the given HPU 125b selected in order to initiate matching at least one regular expression pattern (not shown) in an input stream (not shown) received from the network (not shown).

Figure 1D:
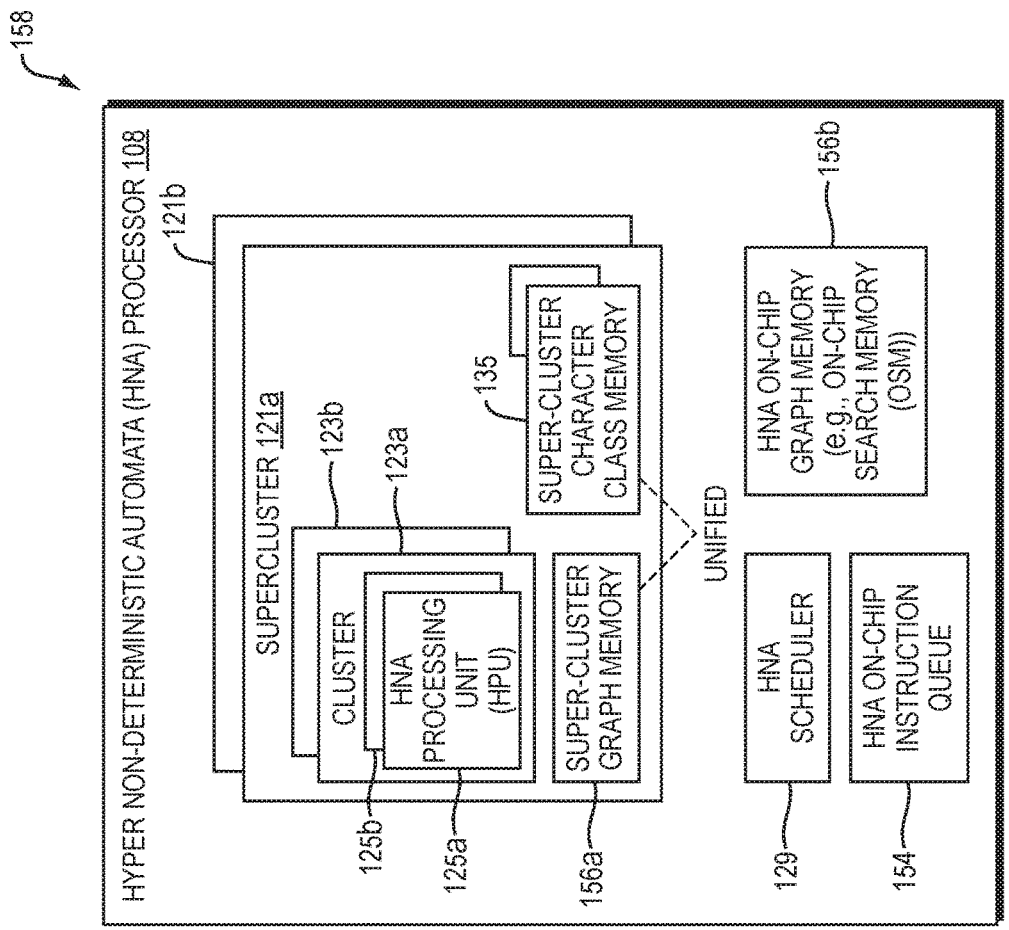
FIG. 1D is a block diagram of another example embodiment of the HNA processor.

FIG. 1D is a block diagram 158 of another example embodiment of the HNA processor 108. According to the example embodiment, each super-cluster may further include a super-cluster graph memory 156a that is exclusive to a corresponding super-cluster. For example, the super-cluster graph memory 156a may be exclusive to the corresponding super-cluster 121a. The super-cluster graph memory 156a may be accessible to a corresponding plurality of HPUs of a corresponding plurality of clusters of the corresponding super-cluster, such as the plurality of HPUs 125a-d of the clusters 123a and 123b and may be configured to store a subset of nodes (not shown) of at least one per-pattern NFA (not shown) statically, such as the per-pattern NFA 314 disclosed below in reference to FIG. 3A. The subset of nodes may be determined by a compiler (not shown), such as the compiler 306 disclosed below in reference to FIG. 3A, of the at least one per-pattern NFA, that may determine node distributions, such as node distributions disclosed below with reference to FIG. 7A and FIG. 8. The super-cluster graph memory 156a may be configured to store NFA nodes of multiple types. NFA nodes of different node types may be configured with a given size, enabling multiple nodes of multiple nodes types to be of a same node size.

According to embodiments disclosed herein, each super-cluster may further include at least one super-cluster character class memory 135 that may be exclusive to a corresponding super-cluster. For example, the at least one super-cluster character class memory 135 may be exclusive to the corresponding super-cluster 121a. Each at least one super-cluster character class memory may be configured to store regular expression pattern character class definitions (not shown) statically. The regular expression pattern character class definitions stored may be employed for matching the at least one regular expression pattern in the input stream. The at least one super-cluster character class memory 135 may be shared by the corresponding plurality of HPUs 125a-d of the corresponding plurality of clusters 123a and 123b of the corresponding super-cluster 121a. According to another embodiment, the super-cluster graph memory 156a and the at least one super-cluster character class memory 135 may be unified.

According to embodiments disclosed herein, each at least one HNA instruction 153 may specify a graph identifier to specify which per-pattern NFA to use for matching the at least one regular expression. According to one embodiment, a compiler, such as the compiler 306 of FIG. 3A, may distribute nodes of each per-pattern NFA such that a given per-pattern NFA is exclusive to a given super-cluster by storing nodes of the given per-pattern NFA to memory exclusive to the given super-cluster.

As such, the at least one HNA instruction 153 may be assigned based on the unique graph identifier associated with a given per-pattern NFA specified by the at least one HNA instruction 153 for traversing (i.e., walking) segments of payload in order to match the at least one regular expression pattern. As such, HPU selection may be restricted to HPUs of a given super-cluster. Within the given super-cluster, since clusters of the given super-cluster access a shared unified super-cluster graph memory, a given HPU of a cluster of the given super-cluster may be selected based on a round robin schedule, instantaneous loading of each of the HPUs of the given cluster, a combination thereof, or in any other suitable manner.

Figure 3A:
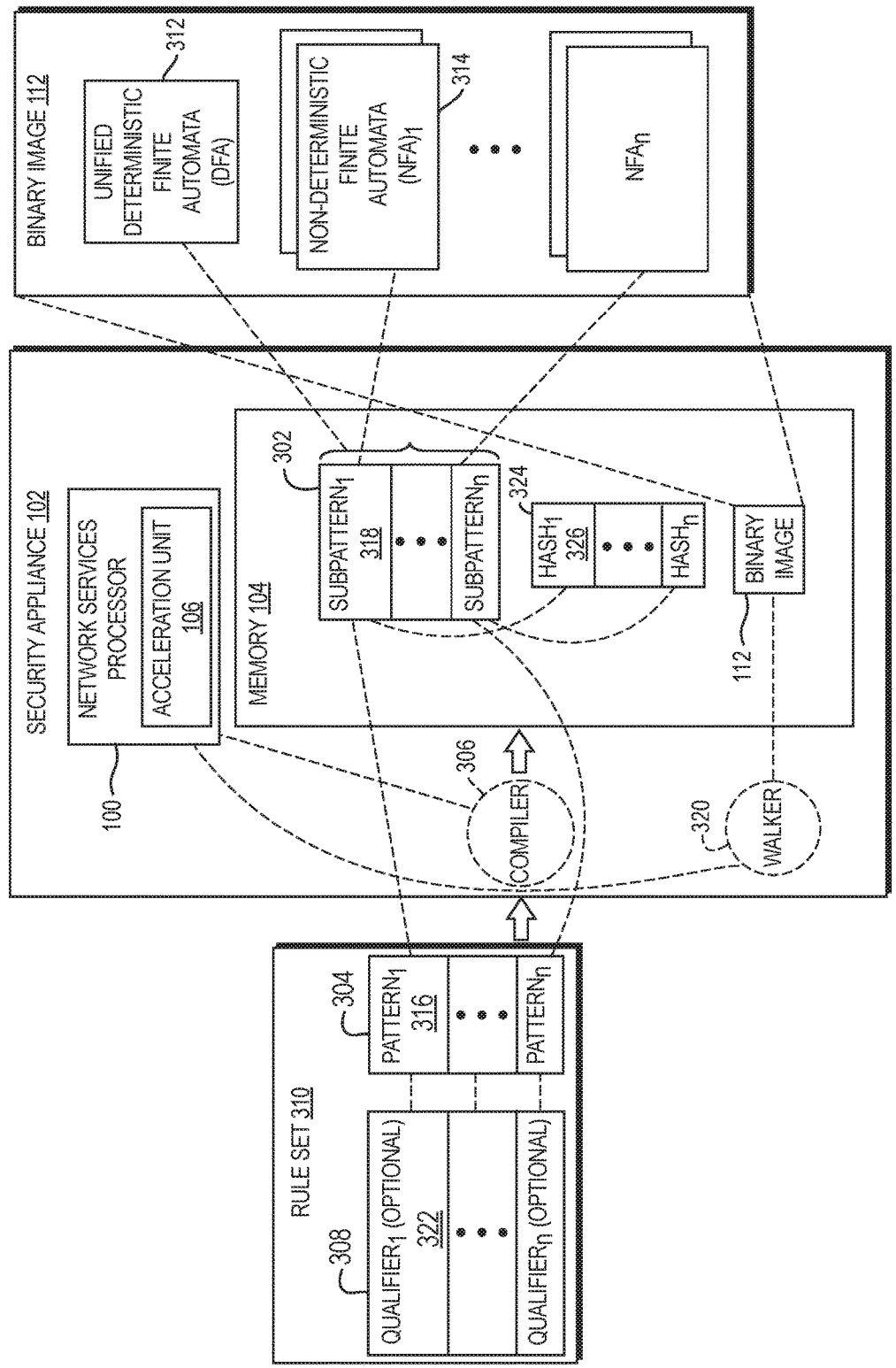
FIG. 3A is another block diagram of an embodiment of a security appliance in which embodiments disclosed herein may be implemented.

For example, the graph identifier may be associated with a given per-pattern NFA of a plurality of per-pattern NFAs, such as the NFA 314 of FIG. 3A. As such, a given set of patterns may share the same graph identifier. For example, all of the patterns in the rule set 310 of FIG. 3A may share the same graph identifier. In some cases, there may be multiple rule sets like the rule set 310 in a system. In that case, each separate "rule set" may have a unique graph identifier. The graph identifier may be associated with at least one node (not shown) of the given per-pattern NFA and may be stored in the super-cluster graph memory 156a that may be exclusive to a given super-cluster 121a of the plurality of super-clusters 121a and 121b, such as the super-cluster graph memory 156a that is exclusive to the super-cluster 121a. The graph identifier may be associated with a set of patterns. The at least one CPU core 103 may select the given super-cluster 121a of the plurality of super-clusters 121a and 121b based on a determination that at least one node of the given per-pattern NFA 314 associated with the graph identifier is stored in the super-cluster graph memory 156a that is exclusive to the given super-cluster 121a.

As such, the at least one CPU core 103 may be further configured to select the at least one super-cluster, such as the super-cluster 121a of the plurality of super-clusters 121a and 121b by restricting super-cluster selection based on a graph identifier (not shown) associated with the at least one HNA instruction 153. For example, the graph identifier may be associated with a given per-pattern NFA of a plurality of per-pattern NFAs and restricting the super-cluster selection may include a determination that at least one node of the given per-pattern NFA may be stored in the super-cluster graph memory 156a that is exclusive to the at least one super-cluster 121a. The at least one CPU core 103 may be configured to select the at least one super-cluster 121a of the plurality of super-clusters 121a and 121b based on a determination that at least one node of the given per-pattern NFA associated with the graph identifier is stored in the super-cluster graph memory 156a that is exclusive to the super-cluster 121a.

According to embodiments disclosed herein, the HNA scheduler 129 may be configured to select a given HPU, such the HPU 125b of FIG. 1C, from a restricted set of HPUs that may include each corresponding plurality of HPUs of each corresponding plurality of clusters of the at least one super-cluster selected, such as the corresponding plurality of HPUs 125a-d of the corresponding plurality of clusters 123a and 123b of the corresponding super-cluster 121a selected. The HNA scheduler 129 may be configured to select the given HPU 125b from the restricted set of HPUs that may include the HPUs 125a-d based on a round robin schedule for HPUs 125a-d in the restricted set of HPUs, instantaneous loading of each HPU of the HPUs 125a-d in the restricted set of HPUs, a combination thereof, or based on any other suitable scheduling policy.

According to another embodiment disclosed herein, a compiler, such as the compiler 306 of FIG. 3A disclosed below, may replicate one or more nodes of a given per-pattern NFA of the at least one per-pattern NFA in multiple super-cluster graph memories that are each exclusive to a corresponding super-cluster. As such, the at least one HNA instruction 153 may be assigned or scheduled to any HPU of any cluster of any super-cluster of the HNA processor 108. The HPU may be selected based on instantaneous loading at a particular super-cluster (or a cluster within a super-cluster) or based on a round-robin schedule for the plurality of HPUs of the plurality of clusters of the plurality of super-clusters of the HNA processor 108. Such may be the case if maximum throughput for each per-pattern NFA is desired. However, such a configuration may limit a total number of supported per-pattern NFAs by a total number of super-clusters of the HNA processor 108, as each super-cluster graph memory of the plurality of super-clusters of the HNA processor 108 contains replicated per-pattern NFA nodes according to the alternative example embodiment.

For example, according to the alternative example embodiment, the compiler 306 may configure each super-cluster graph memory to store at least one node of at least one per-pattern NFA of a plurality of per-pattern NFAs to replicate the at least one node in each super-cluster graph memory of each super-cluster of the at least one HNA processor. As such, the at least one CPU core 103 may provide the HNA scheduler 129 with an option to select the at least one super-cluster based on a determination that a given per-pattern NFA of the at least one per-pattern NFA associated with the at least one HNA instruction is replicated.

As such, alternative to the at least one CPU core 103 selecting the at least one super-cluster, the HNA scheduler 129 may instead select the at least one super-cluster, such as the super-cluster 121*a* of FIG. 1C, based on the option provided. For example, if the option provided indicates that the HNA scheduler 129 is to select the at least one super-cluster, then the HNA scheduler 129 may select the at least one super-cluster based on the option provided and (i) a first round robin schedule for the plurality of super-clusters, (ii) a first instantaneous loading of the plurality of super-clusters or (ii) a combination of (i) and (ii). The HNA scheduler 129 may then select the given HPU 125*b* from the plurality of HPUs 125*a-d* of the plurality of clusters 123*a* and 123*b* of the at least one super-cluster selected 121*a* based on a second round robin schedule for the plurality of HPUs 125*a-d* of the plurality of clusters 123*a* and 123*b* of the at least one super-cluster 121*a* that was selected by the HNA scheduler 129, a second instantaneous loading of the plurality of HPUs 125*a-d* of the plurality of clusters 123*a* and 123*b* of the at least one super-cluster 121*a* that was selected by the HNA scheduler 129, or a combination thereof.

Turning back to FIG. 1D, the at least one HNA processor 108 may further include an HNA on-chip graph memory 156*b* that may be accessible to the plurality of HPUs of the plurality of clusters of the plurality of super-clusters, such as the plurality of HPUs 125*a-h* of the plurality of clusters 123*a-d* of the plurality of super-clusters 121*a* and 121*b* of FIG. 1C. The HNA on-chip graph memory 156*b* may be configured to store a subset of nodes (not shown) of at least one per-pattern NFA (not shown) statically. The subset of nodes may be determined by a compiler, such as the compiler 306 of FIG. 3A, of the at least one per-pattern NFA 314 that may determine node distributions, such as node distributions disclosed below with reference to FIG. 7A and FIG. 8. The HNA on-chip graph memory 156*b* may be configured to store NFA nodes of multiple types. NFA nodes of different node types may be configured with a given size, enabling multiple nodes of multiple nodes types to be of a same node size.

Turning back to FIG. 1C, the at least one HNA instruction 153 may be a first at least one HNA instruction and the security appliance 102 may further comprise at least one system memory, such as the at least one system memory 151 of FIG. 1A that may be operatively coupled to the at least one CPU core 103 and the at least one HNA processor 108.

Figure 1E:
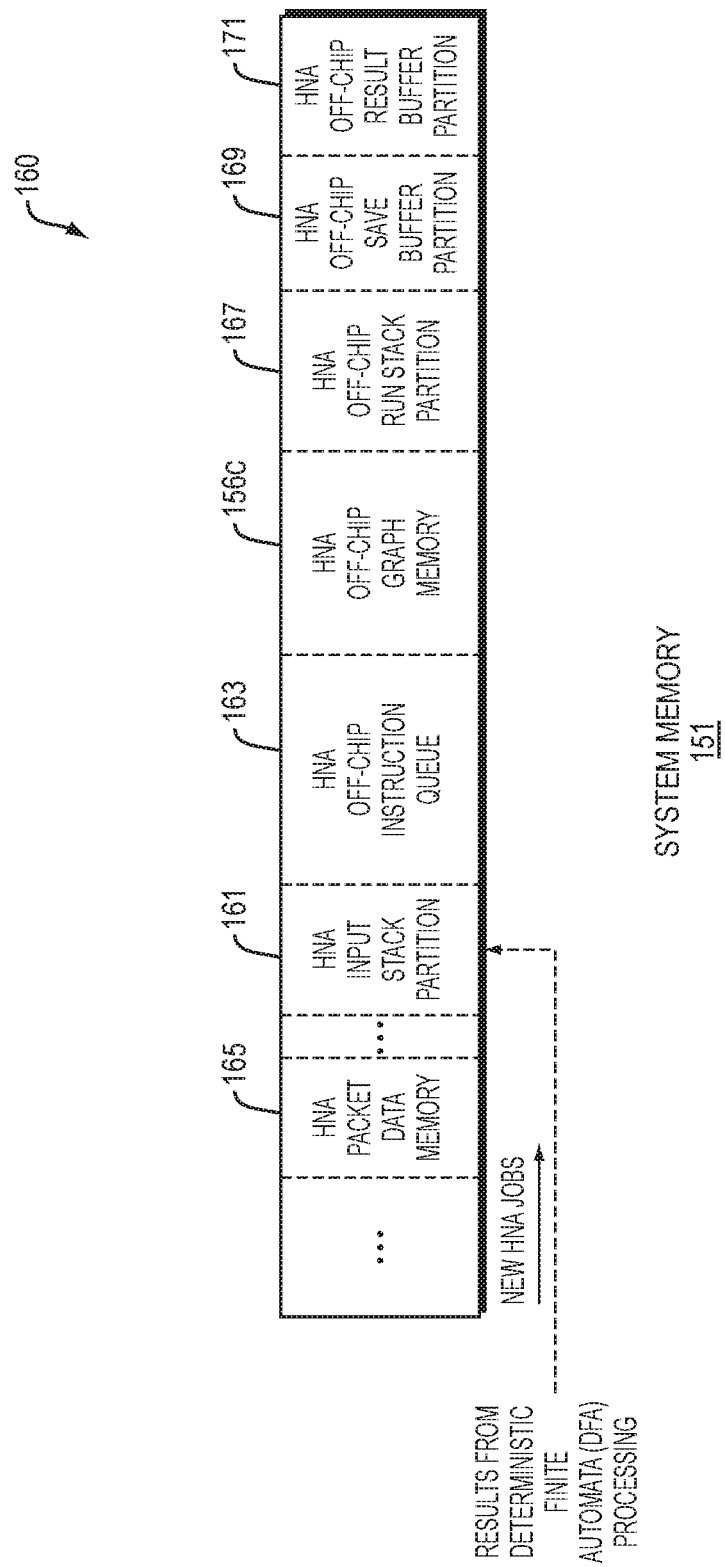
FIG. 1E is a block diagram of an example embodiment of at least one system memory.

FIG. 1E is a block diagram 160 of an example embodiment of at least one system memory 151. According to embodiments disclosed herein, the at least one system memory, such as the at least one system memory 151 disclosed above in reference to FIG. 1A, may be configured to include an HNA off-chip instruction queue 163 for storing a second at least one HNA instruction (not shown). The second at least one HNA instruction may be pending transfer to the HNA on-chip instruction queue 154 of the HNA processor 108. The at least one system memory 151 may further include an HNA off-chip graph memory 156*c* configured to store a subset of nodes (not shown) of at least one per-pattern NFA (not shown) statically. The subset of nodes may be determined by a compiler of the at least one per-pattern NFA, such as the compiler 306 of FIG. 3A, of the at least one per-pattern NFA 314 that may determine node distributions, such as node distributions disclosed below with reference to FIG. 7A and FIG. 8. The HNA off-chip graph memory 156*c* may be configured to store NFA nodes of multiple types. NFA nodes of different node types may be configured with a given size, enabling multiple nodes of multiple nodes types to be of a same node size.

According to embodiments disclosed herein, the security appliance 102 of FIG. 1C may further comprise the L2C 113, the least one LMC 117, and the at least one system memory 151 of FIG. 1A. The at least one LMC 117 may be operatively coupled to the at least one HNA processor 108 and the at least one system memory 151. A given LMC of the at least one LMC may be configured to enable non-coherent access of the at least one system memory 151 for access of the HNA off-chip graph memory 156*c* by the at least one HNA processor 108. Bypassing the L2C 113 via the non-coherent path 119*a* may improve match performance of the at least one HNA processor 108 by avoiding latency otherwise incurred by the maintaining of coherence for an access of the HNA off-chip graph memory 156*c* via the coherent path 115*b*. As nodes stored in the HNA off-chip graph memory 156*c* may have no temporal or spatial locality and since accesses of such stored nodes may be read-only from the perspective of the at least one HNA processor 108, access of the HNA off-chip graph memory 156*c* via the non-coherent path 119*a* may achieve yet another advantage as such accesses would not pollute existing content of the L2C 113.

Turning back to FIG. 1E, the at least one system memory 151 may be further configured to include an HNA packet data memory 165 that may be configured to store multiple payloads contiguously. Each of the multiple payloads may have a fixed maximum length, such as 1536 bytes or any other suitable fixed maximum length. Each of the multiple payloads may be associated with a given HNA instruction of the first at least one HNA instruction stored in the HNA on-chip instruction queue 154 or the second at least one HNA instruction that may be stored in the HNA off-chip instruction queue 163 and pending transfer to the HNA on-chip instruction queue 154.

According to embodiments disclosed herein, the at least one system memory 151 may be further configured to include an HNA input stack partition 161 that may be configured to store at least one HNA input stack. Each at least one HNA input stack may be configured to store at least one HNA input job for at least one HPU of the plurality of HPUs of the plurality of clusters of the plurality of super-clusters, such as the plurality of HPUs 125*a-h* of the plurality of clusters 123*a-d* of the plurality of super-clusters 121*a* and 121*b* of the HNA processor 108 as disclosed above.

The at least one system memory 151 may further include an HNA off-chip run stack partition 167 that may be configured to store at least one off-chip run stack to extend storage of at least one on-chip run stack, such as a run stack 460 disclosed below in reference to FIG. 4A. Each at least one on-chip run stack may be configured to store at least one run-time HNA job for a corresponding HPU, such as the HPU 425, as disclosed below in reference to FIG. 4A.

The at least one system memory 151 may further include an HNA off-chip save buffer partition 169 that may be configured to extend storage of at least one on-chip save buffer, such as a save buffer 464 disclosed below in reference to FIG. 4A. The on-chip save buffer may be configured to store the at least one run-time HNA job for a corresponding HPU, such as the HPU 425, as disclosed below in reference to FIG. 4, based on detecting a payload boundary.

The at least one system memory 151 may further include an HNA off-chip result buffer partition 171 that may be configured to store at least one final match result entry of a match result buffer, such as the match result buffer 466 disclosed below in reference to FIG. 4A. The at least one final match result may be a final match of the at least one regular expression pattern determined by the at least one HPU to match in the input stream. Each at least one HNA instruction that may be stored in the HNA on-chip instruction queue 154 or the HNA off-chip instruction queue 163 may identify a given HNA input stack of the HNA input stack partition 161, a given HNA off-chip run stack of the HNA off-chip run stack partition 167, a given HNA off-chip save buffer of the HNA off-chip save buffer partition 169, and a given HNA off-chip result buffer of the HNA off-chip result buffer partition 171.

Turning back to FIG. 1A, a given LMC of the at least one LMC 117 may be configured to enable the at least one HNA processor 108 to access the HNA packet data memory 165, HNA input stack partition 161, HNA off-chip instruction queue 163, HNA off-chip run stack partition 167, HNA off-chip save buffer partition 169, and the HNA off-chip result buffer partition 171 via the coherent path 115b, and may be configured to enable the at least one HNA processor 108 to access the HNA off-chip graph memory 156c via the non-coherent path 119a.

Turning back to FIG. 1E, the HNA input stack partition 161 may include HNA jobs that may be new HNA jobs resulting from DFA processing. As disclosed above, the at least one HNA processor 108 may be complimentary to an HFA processor 110 that offers hardware-acceleration for Deterministic Finite Automata (DFA) processing, as disclosed below in reference to FIG. 1G.

Figure 1F:
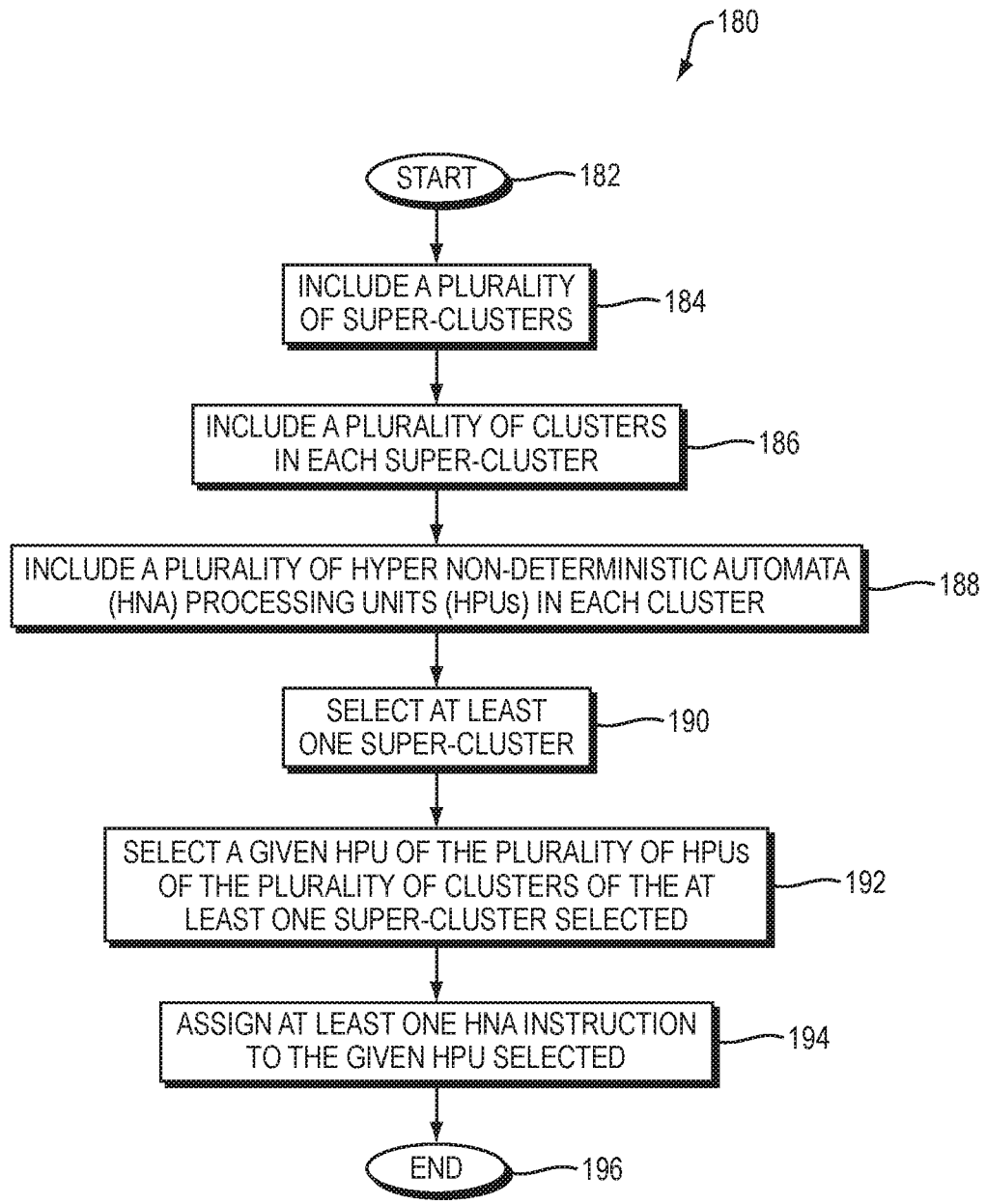
FIG. 1F is a flow diagram of an example embodiment of a method.

FIG. 1F is a flow diagram (180) of an example embodiment of a method. The method may begin (182) and include a plurality of super-clusters in at least one HNA processor operatively coupled to at least one CPU core and specialized for non-deterministic finite automata (NFA) processing (184). The method may include a plurality of clusters in each super-cluster (186). The method may include a plurality of HNA processing units (HPUs) in each cluster of the plurality of clusters (188). The method may select at least one super-cluster of the plurality of super-clusters (190). The method may select a given HPU of the plurality of HPUs of the plurality of clusters of the at least one super-cluster selected (192). The method may assign at least one HNA instruction to the given HPU selected in order to initiate matching at least one regular expression pattern in an input stream received from a network (194) and the method thereafter ends in the example embodiment.

Figure 1G:
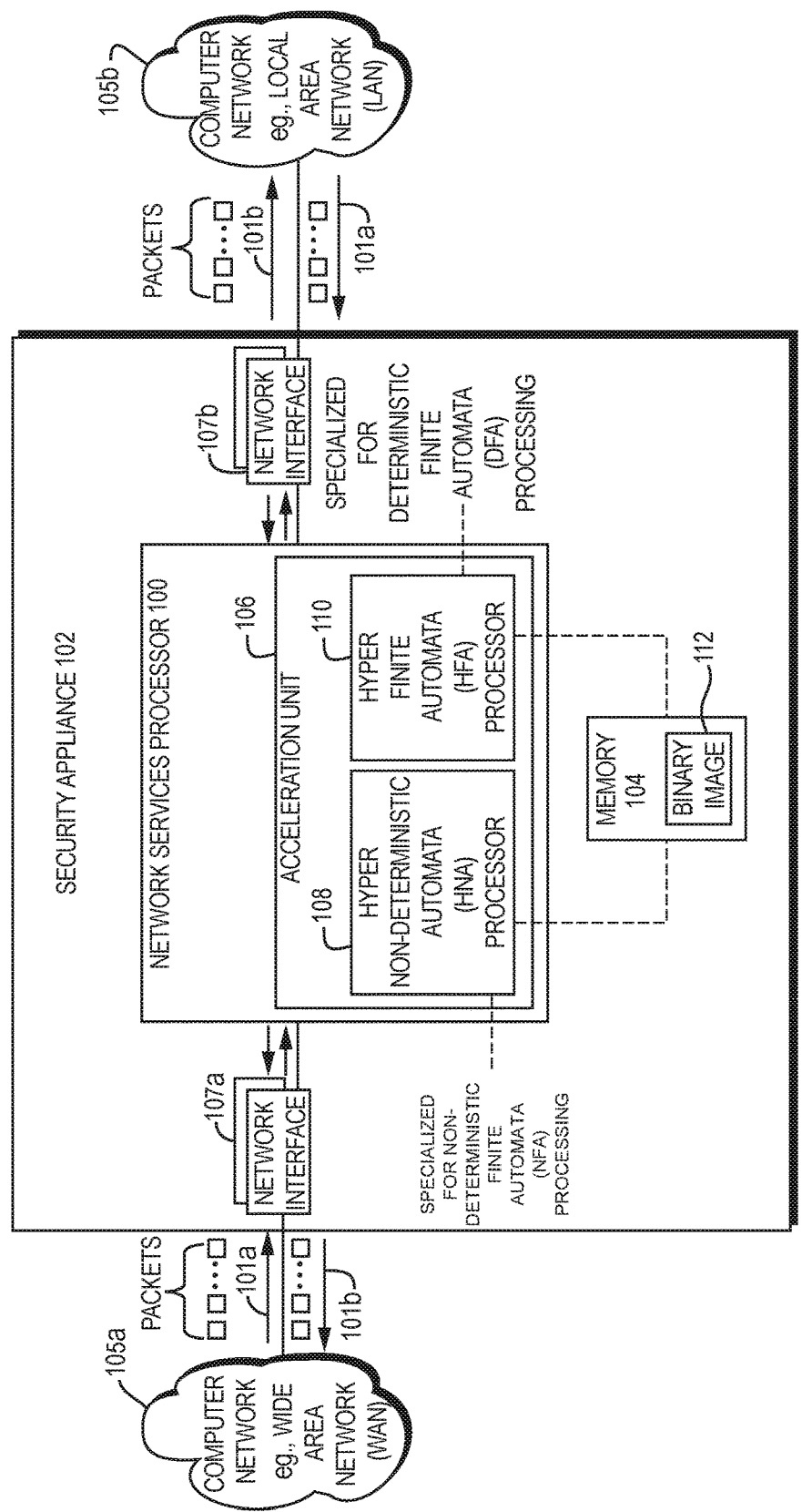
FIG. 1G is a block diagram of an example embodiment of a security appliance in which embodiments disclosed herein may be implemented.

FIG. 1G is a block diagram of another embodiment of the security appliance 102 disclosed above in which embodiments disclosed herein may be implemented. The security appliance 102 may include a network services processor 100. The security appliance 102 may be a standalone system that may switch packets received at one network interface 107a to another network interface 107b and may perform a plurality of security functions on received packets prior to forwarding the packets. For example, the security appliance 102 may be used to perform security processing on packets 101a that may be received on a Wide Area Network (WAN) 105a, or any other suitable network, prior to forwarding the processed packets 101b to a Local Area Network (LAN) 105b, or any other suitable network.

The network services processor 100 may be configured to process Open System Interconnection (OSI) network L2-L7 layer protocols encapsulated in received packets. As is well-known to those skilled in the art, the OSI reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communications between users, for example, file transfer and electronic mail.

The network services processor 100 may schedule and queue work (e.g., packet processing operations) for upper level network protocols, for example L4-L7, and enable processing of upper level network protocols in received packets to be performed to forward packets at wire-speed. By processing the protocols to forward the packets at wire-speed, the network services processor 100 does not slow down the network data transfer rate. The network services processor 100 may receive packets from the network interfaces 107a or 107b that may be physical hardware interfaces, and may perform L2-L7 network protocol processing on the received packets. The network services processor 100 may subsequently forward processed packets 101b through the network interfaces 107a or 107b to another hop in the network, a final destination, or through another bus (not shown) for further processing by a host processor (not shown). The network protocol processing may include processing of network security protocols such as Firewall, Application Firewall, Virtual Private Network (VPN) including IP Security (IPSec) and/or Secure Sockets Layer (SSL), Intrusion Detection System (IDS), Anti-virus (AV), or any other suitable network protocol.

The network services processor 100 may deliver high application performance using a plurality of processors (i.e., cores), such as the at least one CPU core 103 disclosed above. Each of the cores (not shown) may be dedicated to performing data plane, control plane operations, or a combination thereof. A data plane operation may include packet operations for forwarding packets. A control plane operation may include processing of portions of complex higher level protocols such as Internet Protocol Security (IPSec), Transmission Control Protocol (TCP), Secure Sockets Layer (SSL), or any other suitable higher level protocol. The data plane operation may include processing of other portions of these complex higher level protocols.

The network services processor 100 may also include application specific co-processors that may offload the cores so that the network services processor 100 achieves high-throughput. For example, the network services processor 100 may include an acceleration unit 106 that may include the HNA processor 108 for hardware acceleration of NFA processing and an HFA processor 110 for hardware acceleration of DFA processing. The HNA processor 108 and the HFA processor 110 may be co-processors configured to offload the network services processor 100 general purpose cores, such as the at least one CPU core 103 disclosed above, from the heavy burden of performing compute and memory intensive pattern matching methods.

The network services processor 100 may perform pattern searching, regular expression processing, content validation, transformation, and security accelerate packet processing. The regular expression processing and the pattern searching may be used to perform string matching for AV and IDS applications and other applications that may require string matching. A memory controller (not shown) in the network services processor 100 may control access to a memory 104 that is operatively coupled to the network services processor 100. The memory 104 may be internal (i.e., on-chip) or external (i.e., off chip), or a combination thereof, and may be configured to store data packets received, such as packets 101a for processing by the network services processor 100. The memory 104 may be configured to store compiled rules data utilized for lookup and pattern matching in DFA and NFA graph expression searches. The compiled rules data may be stored as a binary image 112 that may include compiled rules data for both DFA and NFA, or multiple binary images separating DFA compiled rules data from NFA compiled rules data.

As disclosed above, typical content aware application processing may use either a DFA or an NFA to recognize patterns in content of received packets. DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z and 0-9, and meta-characters, such as, *, ^ and |. The atomic elements of a regular expression are the symbols (single characters) to be matched. Atomic elements may be combined with meta-characters that allow concatenation, alternation (|), and Kleene-star (*). The meta-character for concatenation may be used to create multiple character matching patterns from a single character (or sub-strings) while the meta-character for alternation (|) may be used to create a regular expression that can match any of two or more sub-strings. The meta-character Kleene-star (*) allows a pattern to match any number of times, including no occurrences of the preceding character or string of characters.

Combining different operators and single characters allows complex subpatterns of expressions to be constructed. For example, a subpattern such as (th(is|at)*) may match multiple character strings, such as: th, this, that, thisis, thisat, thatis, or thatat. Another example of a complex subpattern of an expression may be one that incorporates a character class construct [ . . . ] that allows listing of a list of characters for which to search. For example, gr[ea]y looks for both grey and gray. Other complex subpattern examples are those that may use a dash to indicate a range of characters, for example, [A-Z], or a meta-character "." that matches any one character. An element of the pattern may be an atomic element or a combination of one or more atomic elements in combination with one or more meta-characters.

The input to the DFA or NFA state machine typically includes segments, such as a string of (8-bit) bytes, that is, the alphabet may be a single byte (one character or symbol), from an input stream (i.e., received packets). Each segment (e.g., byte) in the input stream may result in a transition from one state to another state. The states and the transition functions of the DFA or NFA state machine may be represented by a graph of nodes. Each node in the graph may represent a state and arcs (also referred to herein as transitions or transition arcs) in the graph may represent state transitions. A current state of the state machine may be represented by a node identifier that selects a particular node in the graph.

Using DFA to process a regular expression and to find a pattern or patterns described by a regular expression in an input stream of characters may be characterized as having deterministic run time performance. A next state of a DFA may be determined from an input character (or symbol), and a current state of the DFA, because there is only one state transition per DFA state. As such, run time performance of the DFA is said to be deterministic and the behavior can be completely predicted from the input. However, a tradeoff for determinism is a graph in which the number of nodes (or graph size) may grow exponentially with the size of a pattern.

In contrast, the number of nodes (or graph size) of an NFA graph may be characterized as growing linearly with the size of the pattern. However, using NFA to process the regular expression, and to find a pattern or patterns described by the regular expression in the input stream of characters, may be characterized as having non-deterministic run time performance. For example, given an input character (or symbol) and a current state of the NFA, it is possible that there is more than one next state of the NFA to which to transition. As such, a next state of the NFA cannot be uniquely determined from the input and the current state of the NFA. Thus, run time performance of the NFA is said to be non-deterministic as the behavior cannot be completely predicted from the input.

Figure 2A:
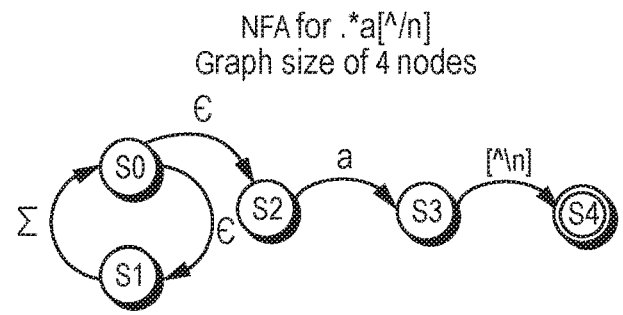
Figure 2B:
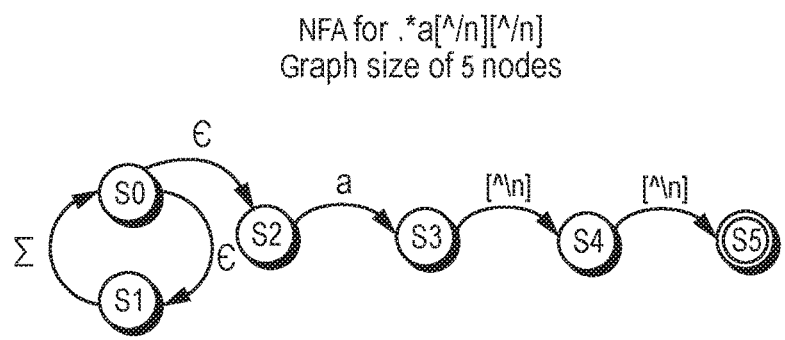
Figure 2C:
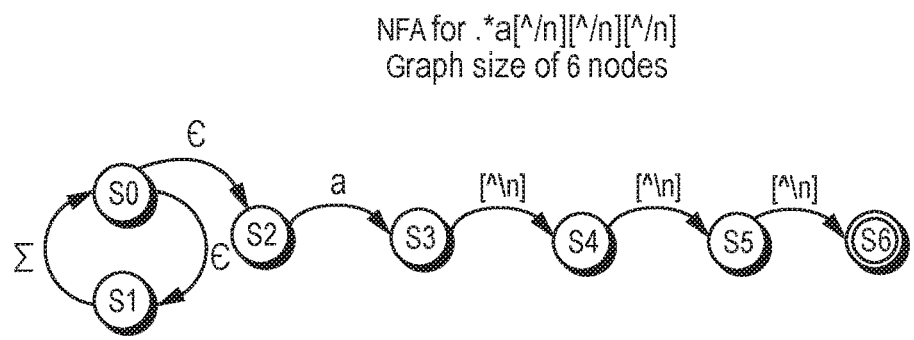
Figure 2D:
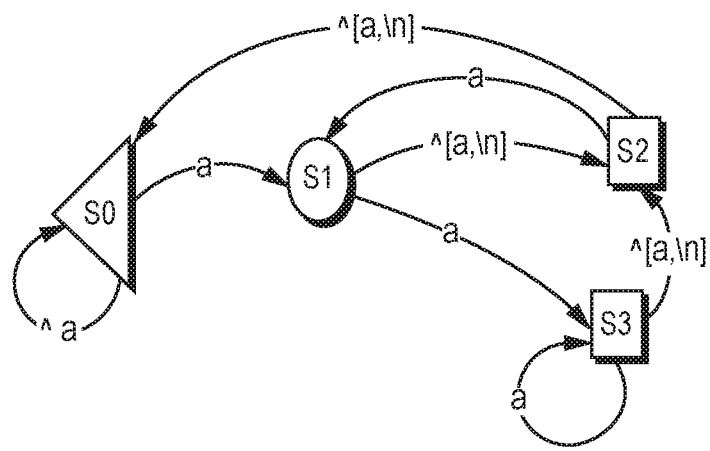
Figure 2E:
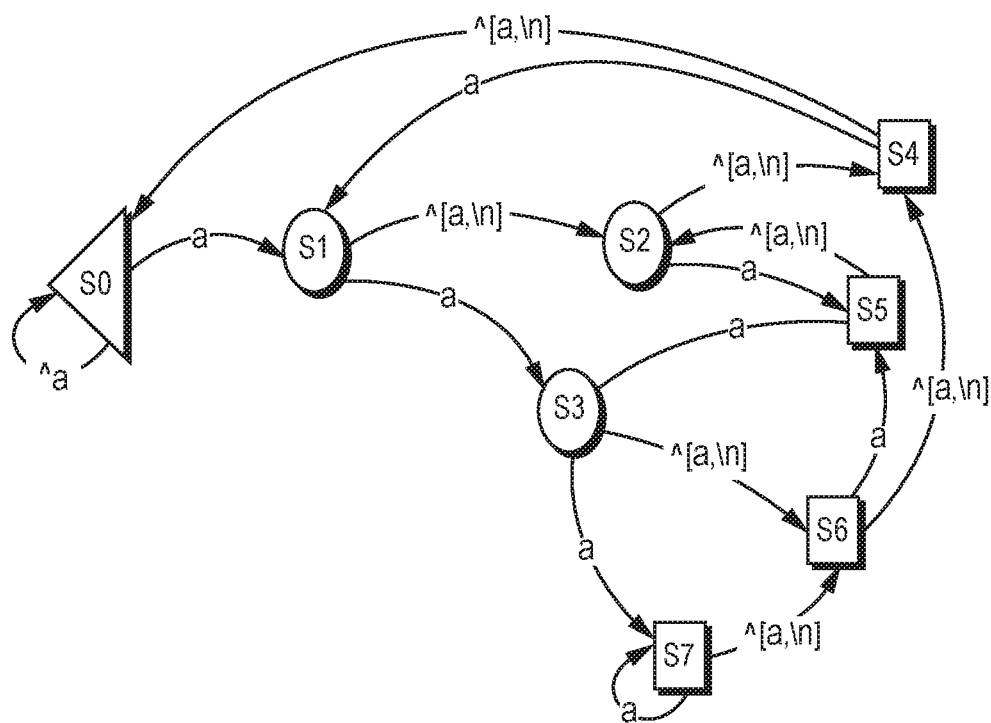
Figure 2F:
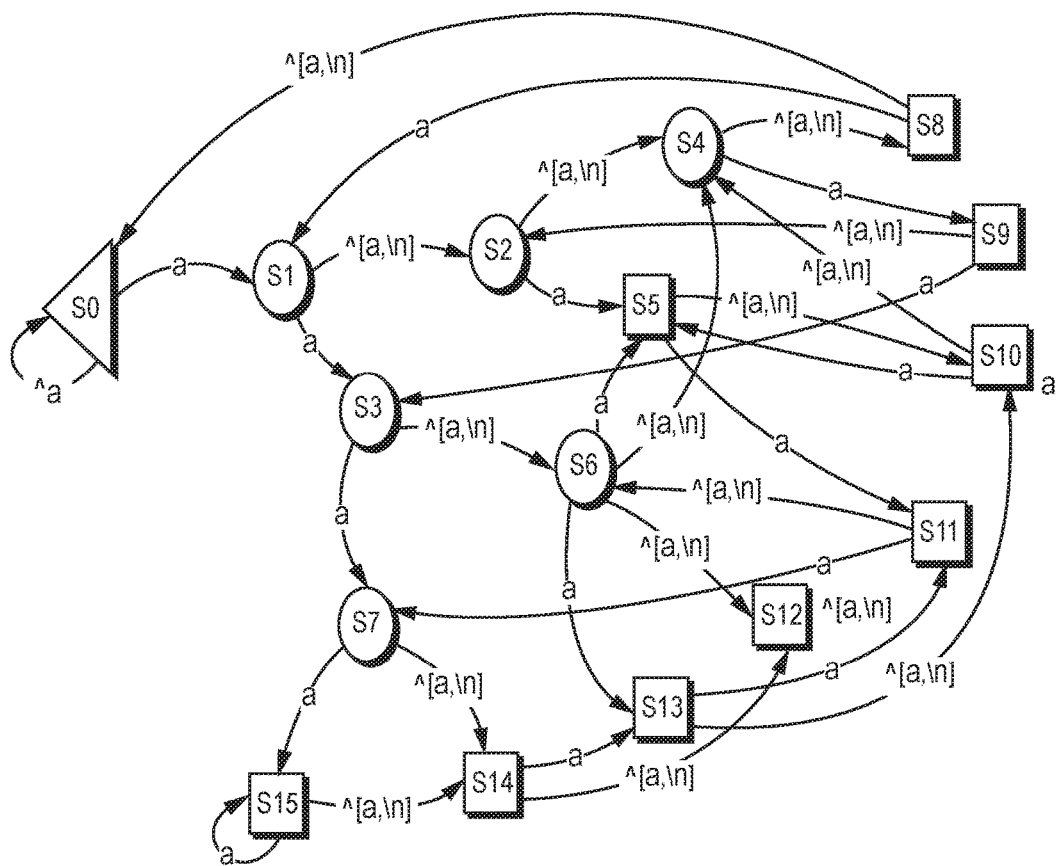

FIGS. 2A-G show the concept of DFA "graph explosion." FIGS. 2A, 2B, and 2C show NFA graphs for patterns ".*a[^\n]," ".*a[^\n] [^\n]," ".*a[^\n] [^\n] [^\n]," respectively, and FIGS. 2D, 2E, and 2F show DFA graphs for the same patterns, respectively. As shown in FIGS. 2A-2F, and summarized by the table of FIG. 2G, NFA may grow linearly for some patterns while DFA for the same patterns may grow exponentially resulting in a graph explosion. As shown, for a given pattern or patterns, a number of DFA states may be larger than a number of NFA states, typically on the order of several hundred more or a thousand more states. This is an example of "graph explosion," which is a hallmark characteristic of DFA.

According to embodiments disclosed herein, content searching may be performed using DFA, NFA, or a combination thereof. According to one embodiment, a run time processor, co-processor, or a combination thereof, may be implemented in hardware and may be configured to implement a compiler and a walker.

The compiler may compile a pattern or an input list of patterns (also known as signatures or rules) into the DFA, NFA, or combination thereof. The DFA and NFA may be binary data structures, such as DFA and NFA graphs and tables.

The walker may perform run time processing, i.e. actions for identifying an existence of a pattern in an input stream, or matching the pattern to content in the input stream. Content may be a payload portion of an Internet Protocol (IP) datagram, or any other suitable payload in an input stream. Run time processing of DFA or NFA graphs may be referred to as walking the DFA or NFA graphs, with the payload, to determine a pattern match. A processor configured to generate DFA, NFA, or a combination thereof, may be referred to herein as a compiler. A processor configured to implement run time processing of a payload using the generated DFA, NFA, or combination thereof, may be referred to herein as a walker. According to embodiments disclosed herein, the network services processor 100 may be configured to implement a compiler and a walker in the security appliance 102.

FIG. 3A is another block diagram of another embodiment of the security appliance 102 in which embodiments disclosed herein may be implemented. As disclosed in reference to FIG. 1G, the security appliance 102 may be operatively coupled to one or more networks and may comprise the memory 104 and the network services processor 100 that may include the acceleration unit 106. In reference to FIG. 3A, the network services processor 100 may be configured to implement a compiler 306 that generates the binary image 112 and a walker 320 that uses the binary image 112. For example, the compiler 306 may generate the binary image 112 that includes compiled rules data used by the walker 320 for performing pattern matching methods on received packets 101a (shown in FIG. 1G). According to embodiments disclosed herein, the compiler 306 may generate the binary image 112 by determining compiled rules data for DFA, NFA, or a combination thereof, based on at least one heuristic as described further below. The compiler 306 may determine rules data advantageously suited for DFA and NFA.

According to embodiments disclosed herein, the compiler 306 may generate the binary image 112 by processing a rule set 310 that may include a set of one or more regular expression patterns 304 and optional qualifiers 308. From the rule set 310, the compiler 306 may generate a unified DFA 312 using subpatterns selected from all of the one or more regular expression patterns and at least one NFA 314 for at least one pattern in the set of one or more regular expression patterns 304 for use by the walker 320 during run time processing, and metadata (not shown) including mapping information for transitioning the walker 320 between states (not shown) of the unified DFA 312 and states of the at least one NFA 314.

The unified DFA 312 and the at least one NFA 314 may be represented data structure-wise as graphs, or in any other suitable form, and the mapping in the metadata may be represented data structure-wise as one or more tables, or in any other suitable form. According to embodiments disclosed herein, if a subpattern selected from a pattern is the pattern, no NFA is generated for the pattern. According to embodiments disclosed herein, each NFA that is generated may be for a particular pattern in the set, whereas a unified DFA may be generated based on all subpatterns from all patterns in the set.

The walker 320 walks the unified DFA 312 and the at least one NFA 314 with a payload by transitioning states of the unified DFA 312 and the at least one NFA based on consuming (i.e., processing) segments, such as bytes from the payload in the received packets 101a. As such, the walker 320 walks the payload through the unified DFA 312 and the at least one NFA 314 that may be a per-pattern NFA generated for a single regular expression pattern.

The rule set 310 may include a set of one or more regular expression patterns 304 and may be in a form of a Perl Compatible Regular Expression (PCRE) or any other suitable form. PCRE has become a de facto standard for regular expression syntax in security and networking applications. As more applications requiring deep packet inspections have emerged or more threats have become prevalent in the Internet, corresponding signatures/patterns to identify virus/attacks or applications have also become more complex. For example, signature databases have evolved from having simple string patterns to regular expression (regex) patterns with wild card characters, ranges, character classes, and advanced PCRE signatures.

As shown in FIG. 3A, the optional qualifiers 308 may each be associated with a pattern in the set of regular expression patterns 304. For example, optional qualifiers 322 may be associated with pattern 316. The optional qualifiers 308 may each be one or more qualifiers designating desired custom, advanced PCRE signature options, or other suitable options for processing the pattern associated with the qualifiers. For example, the qualifiers 322 may indicate whether or not a start offset (i.e., a position in a payload of a first matching character of a pattern that matches in the payload) option of the advanced PCRE signature options for the pattern 316 is desired.

According to embodiments disclosed herein, the compiler 306 may generate a unified DFA 312 using subpatterns 302 selected from all patterns in the set of one or more regular expression patterns 304. The compiler 306 may select subpatterns 302 from each pattern in the set of one or more regular expression patterns 304 based on at least one heuristic, as described further below. The compiler 306 may also generate at least one NFA 314 for at least one pattern 316 in the set, a portion (not shown) of the at least one pattern 316 used for generating the at least one NFA 314, and at least one walk direction for run time processing (i.e., walking) of the at least one NFA 314, may be determined based on whether a length of the subpattern selected 318 is fixed or variable and a location of the subpattern selected 318 within the at least one pattern 316. The compiler 306 may store the unified DFA 312 and the at least one NFA 314 in the at least one memory 104.

The compiler may determine whether length of the potential subpatterns selected is fixed or variable. For example, length of a subpattern such as "cdef" may be determined to have a fixed length of 4 as "cdef" is a string, whereas complex subpatterns including operators may be determined as having a variable length. For example, a complex subpattern such as "a.*cd[^\n]{0,10}.*y" may have "cd[^\n]{0, 10}" as the subpattern selected, that may have a variable length of 2 to 12.

According to embodiments disclosed herein, subpattern selection may be based on at least one heuristic. A subpattern is a set of one or more consecutive elements from a pattern, wherein each element from the pattern may be represented by a node in a DFA or NFA graph, for purposes of matching bytes or characters from the payload. An element, as described above, may be a single text character represented by a node or a character class represented by a node. The compiler 306 may determine which subpatterns in the pattern are better suited for NFA based on whether or not a subpattern is likely to cause excessive DFA graph explosion, as described above in reference to FIGS. 2A-G. For example, generating a DFA from a subpattern including consecutive text characters would not result in DFA graph explosion, whereas complex subpatterns, as described above, may include operators as well as characters and, thus, may cause DFA graph explosion. For example, a subpattern including a wild card character or a larger character class repeated multiple times (e.g., [^\n]* or [^\n]{16}) may cause excessive states in a DFA and, thus, may be more advantageously suited for NFA. As such, the compiler 306 may be referred to herein as a "smart compiler."

As disclosed above, selecting a subpattern from each pattern in the set of one or more regular expression patterns 304 may be based on at least one heuristic. According to one embodiment, the at least one heuristic may include maximizing a number of unique subpatterns selected and length of each subpattern selected. For example, a pattern such as "ab.*cdef.*mn" may have multiple potential subpatterns, such as "ab.*," "cdef," and ".*mn". The compiler may select "cdef" as the subpattern for the pattern because it is a largest subpattern in the pattern "ab.*cdef.*mn" that is unlikely to cause DFA graph explosion. However, the compiler may select an alternate subpattern for the pattern "ab.*cdef.*mn" if the subpattern "cdef" has already been selected for another pattern. Alternatively, the compiler may replace the subpattern "cdef" with another subpattern for the other pattern, enabling the subpattern "cdef" to be selected for the pattern "ab.*cdef.*mn."

As such, the compiler 306 may select subpatterns for the regular expression patterns 304 based on a context of possible subpatterns for each of the regular expression patterns 304, enabling maximization of the number of unique subpatterns selected and length of each subpattern selected. As such, the compiler 306 may generate a unified DFA 312 from the subpatterns selected 302 that minimizes a number of false positives (i.e., no match or partial match) in pattern matching of the at least one NFA 314 by increasing the probability of a pattern match in the at least one NFA 314.

By maximizing subpattern length, false positives in NFA processing may be avoided. False positives in NFA processing may result in non-deterministic run time processing and, thus, may reduce run time performance. Further, by maximizing a number of unique subpatterns selected, the compiler 306 enables a 1:1 transition between the unified DFA to the at least one NFA 314 generated from a pattern in the set given a match of a subpattern (from the pattern) in the unified DFA.

For example, if the subpattern selected was shared by multiple patterns, then a walker of the unified DFA would need to transition to multiple at least one NFAs because each at least one NFA is a per-pattern NFA, and the subpattern match from the unified DFA signifies a partial match for each of the multiple patterns. As such, maximizing the number of unique subpatterns reduces a number of DFA: NFA 1:N walker 320 transitions, reducing run time processing by the walker 320.

To enable maximizing the number of unique subpatterns, the compiler 306 may compute a hash value 326 of the subpattern selected 318 and store the hash value computed 326 in association with an identifier (not shown) of a pattern 316 from which the subpattern 318 was selected. For example, the compiler 306 may, for each pattern in the set 304, compute a hash value of the subpattern selected. The hash values computed 324 may be stored in the at least one memory 104 as a table, or in any suitable manner. The hash method used may be any suitable hash method. The compiler may compare the hash value computed to a list of hash values of subpatterns selected for other patterns in the set, in order to determine whether or not the subpattern selected is unique.

If the hash value computed is found in the list, the compiler may determine whether to replace (i) the subpattern selected with another subpattern from the pattern or (ii) the subpattern selected for another pattern in the set with an alternate subpattern selected from the other pattern in the set. The other pattern in the set may be identified based on an association with the hash value computed in the list. The determination for whether to replace (i) or (ii) may be based on comparing lengths of subpatterns being considered for the replacement in order to maximize lengths of the unique subpatterns being selected, as described above. Replacing a subpattern selected may include selecting a next longest subpattern identified for a given pattern, or a next highest prioritized subpattern. For example, potential subpatterns may be prioritized based on likely of resulting in DFA explosion or a magnitude of the DFA explosion expected.

According to embodiments disclosed herein, the at least one heuristic may include identifying subpatterns of each pattern and disregarding a given subpattern of the subpatterns identified of each pattern, if the given subpattern has a length less than a minimum threshold. For example, to reduce false positives in the at least one NFA, the compiler may disregard subpatterns with lengths less than the minimum threshold because such subpatterns may result in higher probability of a false positive in the at least one NFA.

The at least one heuristic may include accessing a knowledge base (not shown) of subpatterns associated with historical frequency of use indicators and disregarding a given subpattern of the subpatterns identified of each pattern, if a historical frequency of use indicator for the given subpattern in the knowledge base accessed is greater than or equal to a frequency use threshold. For example, application or protocol specific subpatterns may have a high frequency of use, such as for HyperText Transfer Protocol (HTTP) payloads, "carriage return line feed", or clear traffic such as multiple consecutive 0s from binary files, or any other frequently used subpattern.

The at least one heuristic may include identifying subpatterns of each pattern and for each pattern, maximizing a number of consecutive text characters in the subpattern selected by selecting a given subpattern of the subpatterns identified based on the given subpattern having a largest number of consecutive text characters of the subpatterns identified and based on the given subpattern being unique among all subpatterns selected for the set of one or more regular expressions. As disclosed above, maximizing length of the subpattern selected may enable higher probability of a match in the at least one NFA.

The at least one heuristic may include prioritizing given subpatterns of each pattern based on a subpattern type of each of the given subpatterns and lengths of the given subpatterns. The subpattern type may be text only, alternation, single character repetition, or multi-character repetition, and a priority order from highest to lowest for the subpattern type may be text only, alternation, single character repetition, and multi-character repetition. As such, subpatterns that are text strings having a length of at least a minimum length threshold may be prioritized higher than complex subpatterns of variable length.

The compiler 306 may prioritize a longer length subpattern over another subpattern of lesser length. The compiler 306 may select a unique subpattern as the subpattern selected, based on the prioritizing. As described above, the unique subpattern selected may have a length of at least a minimum length threshold.

The compiler 306 may select a non-unique subpattern as the subpattern selected, based on the prioritizing, if none of the given subpatterns are unique and have a length of at least the minimum length threshold. As such, the compiler 306 may select a subpattern from a pattern that is a duplicate of a subpattern selected from another pattern rather than select a subpattern having a length less than the minimum threshold. To facilitate finalizing of subpatterns, the compiler 306 may perform multiple passes over the patterns and sort possible subpatterns by length. As such, compiler subpattern selection for a given pattern in the set of one or more regular expression patterns 304 may be performed within a context of subpattern selection for other patterns in the set of one or more regular expression patterns 304.

As described above, the qualifiers 322 may indicate that reporting of a start offset is desired. However, the start offset may not be easily discernible. For example, finding a start offset in a payload matching patterns such as "a.*b" or "a.*d" may be difficult given a payload such as "axycamb" because two patterns may be matching, "axycamb" and "amb." As such, offsets for both instances of "a" in the payload may need to be tracked as potential start offsets. According to embodiments disclosed herein, potential start offsets need not be tracked, as the start offset is not determined until a match of the entire pattern is determined to have been found in a payload. Determining the match of the entire pattern may be found utilizing match results from the unified DFA, the at least one NFA, or a combination thereof.

According to embodiments disclosed herein, if a payload in the received packets 101 includes content that matches a subpattern selected 318 from a pattern 316, the walker may transition to walk at least one NFA for the subpattern selected 318. The walker 320 may report a match of the subpattern selected 318 and an offset that identifies a location in the received packets of the last character of the matching subpattern as an end offset for the subpattern in the payload. A subpattern match may be a partial match for the pattern if the subpattern is a subset of the pattern. As such, the walker 320 may continue the search for the remainder of the pattern in the payload by walking at least one NFA for the pattern, in order to determine a final match for the pattern. It should be understood that the pattern may traverse one or more payloads in the received packets 101a.

Figure 3B:
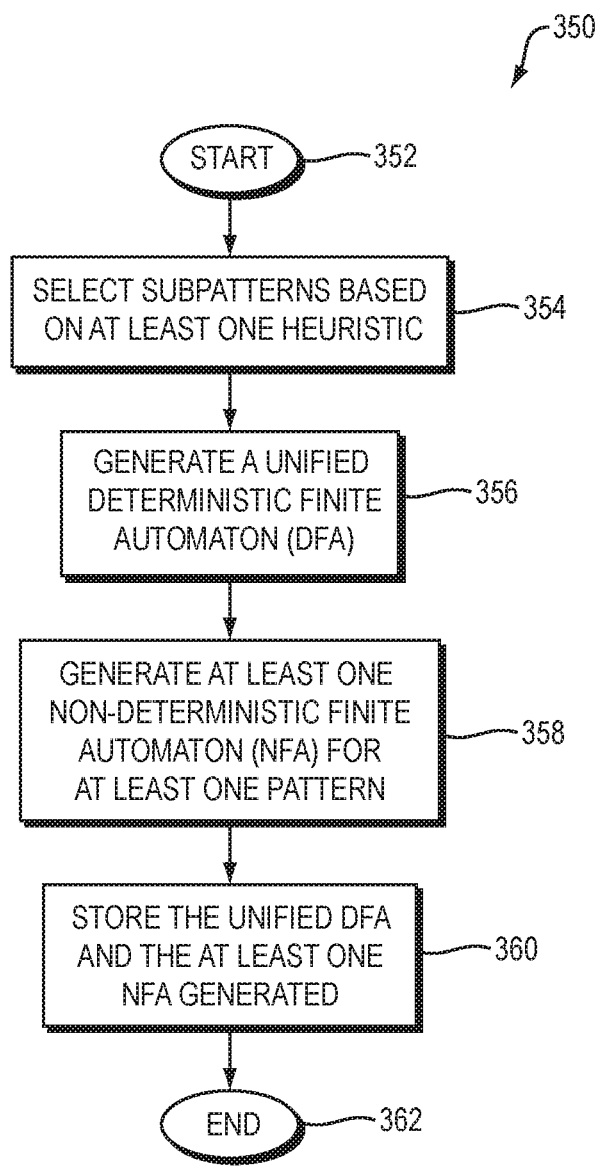
FIG. 3B is a flow diagram of an example embodiment of a method that may be implemented in at least one processor operatively coupled to at least one memory in a security appliance operatively coupled to a network.

FIG. 3B is a flow diagram (350) of an example embodiment of a method that may be implemented in at least one processor operatively coupled to at least one memory in a security appliance operatively coupled to a network. The method may begin (352) and select a subpattern from each pattern in a set of one or more regular expression patterns based on at least one heuristic (354). The method may generate a unified deterministic finite automaton (DFA) using the subpatterns selected from all patterns in the set (356). The method may generate at least one non-deterministic finite automaton (NFA) for at least one pattern in the set, a portion of the at least one pattern used for generating the at least one NFA, and at least one walk direction for run time processing of the at least one NFA, being determined based on whether a length of the subpattern selected is fixed or variable and a location of the subpattern selected within the at least one pattern (358). The method may store the unified DFA and the at least one NFA generated in the at least one memory (360). The method thereafter ends (362) in the example embodiment.

As disclosed above, the compiler 306 may generate the unified DFA 312 and the at least one NFA 314 to enable the walker 320 to search for matches of one or more regular expression patterns 304 in received packets 101a. The compiler 306 may select a subpattern from each pattern in the set of one or more regular expression patterns 304 based on at least one heuristic. The unified DFA 312 may be generated using the subpatterns selected 302 from all patterns in the set 304. The compiler 306 may generate at least one NFA 314 for at least one pattern 316 in the set 304. As such, the compiler 306 may be configured to compile the rule set 310 into the binary image 112 identifying portions from the rule set 310 that may be best suited for DFA or NFA processing. Thus, the binary image 112 may include at least two sections with a first section for DFA processing and a second section for NFA processing, such as the unified DFA 312 and the at least one NFA 314.

As disclosed above, the binary image 112 may include compiled rules data for both DFA and NFA, or may be multiple binary images separating DFA compiled rules data from NFA compiled rules data. For example NFA compiled rules may be separated from DFA compiled rules and stored in a graph memory operatively coupled to the at least one HNA processor 108. The memory 104 may be a graph memory that may be multiple memories, such as the super-cluster graph memory 156a, HNA on-chip graph memory 156b, and the HNA off-chip graph memory 156c as disclosed above with reference to FIGS. 1D and 1E.

As disclosed above, the at least one HNA processor 108 and the HFA processor 110 may be co-processors configured to offload the network services processor 100 general purpose cores, such as the at least one CPU core 103 disclosed above, from the heavy burden of performing compute and memory intensive pattern matching methods. As such, the HFA processor 110 may be configured to implement functionality of the walker 320 with reference to DFA processing and the at least one HNA processor 108 may be configured to implement functionality of the walker 320 with reference to NFA processing. As disclosed above, the at least one HNA processor 108 may include a plurality of super-clusters. Each super-cluster may include a plurality of clusters. Each cluster of the plurality of clusters may include a plurality of HNA processing units (HPUs).

Figure 4A:
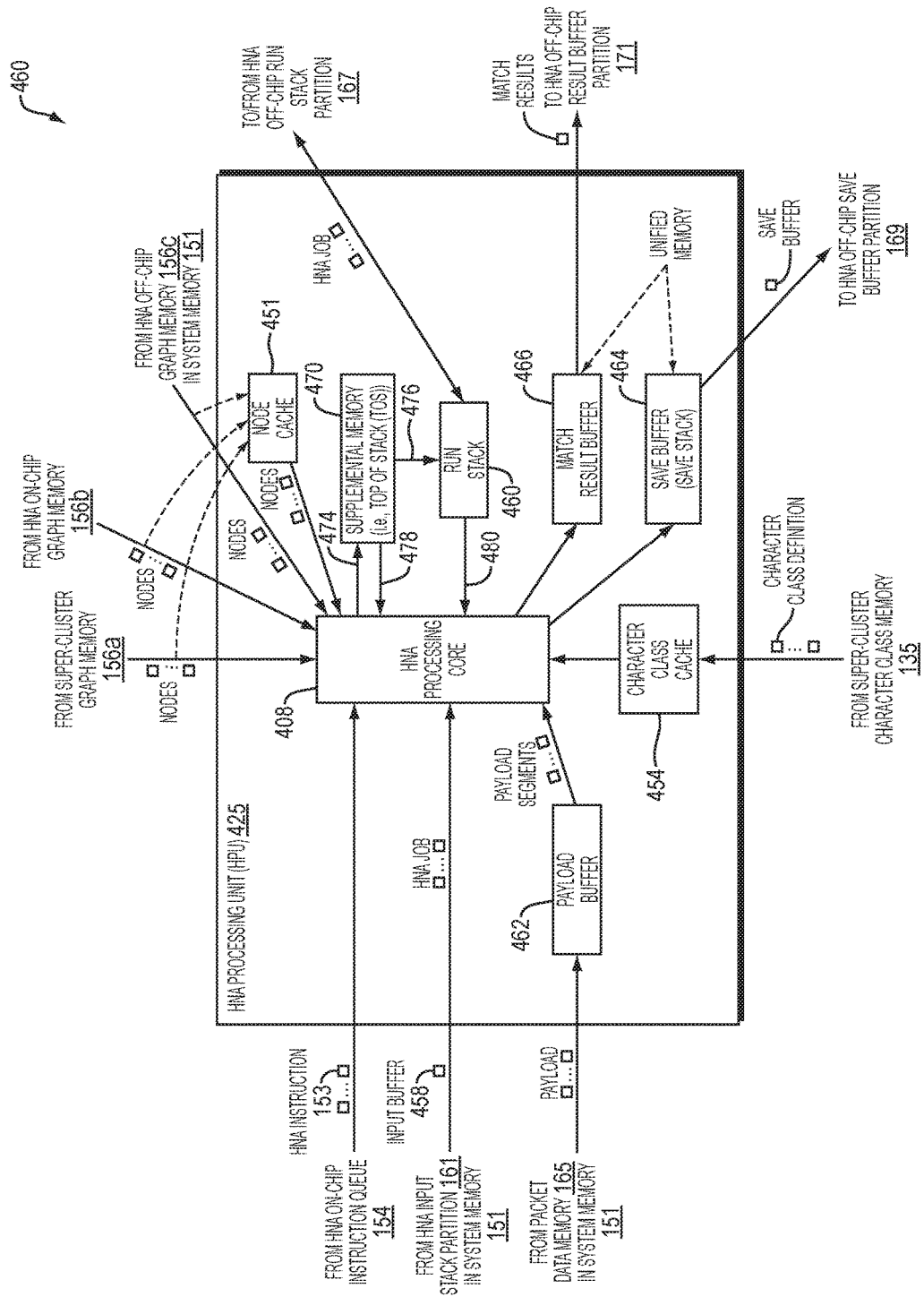
FIG. 4A is a block diagram of an example embodiment of an HNA Processing Unit (HPU).

FIG. 4A is a block diagram of an example embodiment of an HNA Processing Unit (HPU) 425. According to embodiments disclosed herein, the HPU 425 may be assigned the at least one HNA instruction 153 from the HNA on-chip instruction queue 154. The at least one HNA instruction 153 may include at least one HNA job (not shown) that may be determined based on partial match results identified by the HFA processor 110 of FIG. 1G for a given subpattern of the subpatterns 302 of FIG. 3A that is matching in the input stream.

According to the example embodiment, the HPU 425 may include an HNA processing core 408. The HNA processing core 408 may be operatively coupled to a node cache 451 further disclosed below with reference to FIG. 7B, FIG. 12, and FIGS. 13A-D. The HNA processing core 408 may be operatively coupled to a character class cache 454, payload buffer 462, top of stack register 470, and the run stack 460, as well as a match result buffer 466 and save buffer 464 that may be configured as a unified memory. The HNA processing core 408 may be configured to walk at least one per-pattern NFA with payload segments stored in the payload buffer 462 to determine a match of the at least one regular expression pattern. As such, each HPU of the plurality of HPUs 125a-f of the plurality of clusters 123a-d of the plurality of super-clusters 121a and 121b may further include an HNA processing core 408 that is operatively coupled to the node cache 451, character class cache 454, payload buffer 462, top of stack register 470, and the run stack 460, as well as a match result buffer 466 and save buffer 464 that may be configured as a unified memory. The run stack 460, save buffer 464 and the match result buffer 466 may include ECC protection (single error correct/double error detect).

Each HPU of the plurality of HPUs 125a-f of the plurality of clusters 123a-d of the plurality of super-clusters 121a and 121b may include the node cache 451 that may be configured to cache one or more nodes from the super-cluster graph memory 156a, the HNA on-chip graph memory 156b, or the HNA off-chip graph memory 156c as disclosed below with reference to FIG. 7B. Each HPU of the plurality of HPUs 125a-f of the plurality of clusters 123a-d of the plurality of super-clusters 121a and 121b may further include the character class cache 454 that may be configured to cache one or more regular expression pattern character class definitions from the super-cluster character class memory 135. Each HPU of the plurality of HPUs 125a-f of the plurality of clusters 123a-d of the plurality of super-clusters 121a and 121b may further include the payload buffer 462 that may be configured to store a given payload from the HNA packet data memory 165. The at least one HNA instruction 153 from the HNA on-chip instruction queue 154 may include an identifier for a location of the given payload in the HNA packet data memory 165. Each HPU of the plurality of HPUs 125a-f of the plurality of clusters 123a-d of the plurality of super-clusters 121a and 121b may further include the top of stack register 470 that may be configured to store a single HNA job.

The run stack 460 may be configured to store multiple HNA jobs, and the unified memory may be configured to store first content of the save stack 464 and second content of the match result buffer 466. The first content may include one or more HNA jobs stored in the run stack 460 and the second content may include one or more final match results. An HNA job may also be referred to interchangeably herein as context or unexplored context.

A given HNA job of the at least one HNA job may indicate a given NFA of the at least one NFA 314, at least one given node of the given NFA, at least one given offset in a given payload, as well as at least one walk direction, each at least one walk direction corresponding to one node of the at least one given node. Each at least one HNA job may include results of processing by the HFA processor 110, enabling the at least one HNA processor 108 to advance a match in the given NFA for a given pattern of the at least one regular expressions pattern 304 that corresponds to the given sub-pattern. As such, each HNA job represents partial match results determined by the HFA processor 110 in order to advance the match of the given pattern by the at least one HNA processor 108 via the assigned HPU 425. The assigned HPU may include an HNA processing core 408.

The HNA processing core 408 may process the at least one HNA instruction 153 by reading at least one pointer (not shown), or other suitable instruction information, stored therein. The at least one pointer may include an input buffer pointer (not shown) to an input buffer 458 in the input stack partition 161 of the at least one system memory 151. The at least one HNA instruction 153 may also include a payload pointer (not shown) to a payload (not shown) stored in the HNA packet data memory 165 of the at least one system memory 151 and the payload may be fetched to a payload buffer 462 of the HPU 425. The at least one HNA instruction 153 may further include a result buffer pointer (not shown) to a given result buffer in the HNA off-chip result buffer partition 171 to enable the HNA processing core 408 of the HPU 425 to transfer at least one match result entry stored in a match result buffer 466 of the HPU 425. The at least one HNA instruction 153 may further include a save buffer pointer (not shown) to a given save buffer in the HNA off-chip save buffer partition 169 of the at least one system memory 151 to enable the HNA processing core 408 to transfer at least one save buffer entry from a save buffer 464 of the HPU 425. The at least one HNA instruction 153 may further include a run stack pointer (not shown) to a given run stack of the HNA off-chip run stack partition 167 of the at least one system memory 151 to enable the HNA processing core 408 to transfer at least one run stack entry to or from a run stack 460 of the HPU 425.

The input buffer 458, run stack 460, and the save buffer 464 may be referred to herein as an input stack, run stack, and save stack, respectively, although the input buffer 458, run stack 460, and save buffer 464 may or may not exhibit the Last In First Out (LIFO) properties of a stack. The input buffer 458, run stack 460, and save buffer 464 may be located within a same or different physical buffer. If located within the same physical buffer, entries of the input buffer 458, run stack 460, and save stack 464 may be differentiated based on a field setting of the entries, or differentiated in any other suitable manner. The input buffer 458 and the run stack 460 may be located in the same physical buffer that may be on-chip and the save buffer 464 may be located in another physical buffer that may be off-chip.

The at least one HNA job of the at least one HNA instruction 153, may be stored in the input buffer 458 for processing by the HNA processing core 408. The at least one HNA job of the at least one HNA instruction may each belong to a same given payload, such as the payload transferred to the payload buffer 462, that was processed by the HFA processor 110.

The HNA processing core 408 may be configured to load (i.e., fetch or retrieve) at least one HNA job from the input buffer 458 based on the input buffer pointer. The HNA processing core 408 may push (i.e., store) the at least one HNA job to the run stack 460. The HNA processing core 408 may pop (i.e., read, fetch, load, etc.) a given HNA job from the run stack 460 and process the given HNA job. Each at least one HNA job may include a payload offset (not shown) to a segment (not shown) of the payload stored in the payload buffer 462, and a pointer to a graph (not shown), that may be a given finite automaton of at least one finite automaton, such as the at least one NFA 314 of FIG. 3A.

The HNA processing core 408 may load (i.e., fetch) the graph that may have nodes distributed amongst any one or more of the super-cluster memory 156a, the HNA on-chip graph memory 156b, or the HNA off-chip graph memory 156c, and may begin traversing the fetched nodes using payload segments corresponding with respective payload offsets of the payload in the payload buffer 462. A partially matching path of the graph may include at least two nodes of the graph that match consecutive segments of the payload to a given pattern used to generate the graph. The partially matching path may be referred to herein as a thread or an active thread.

As the HNA processing core 408 may process the graph using payload segments from the payload buffer 462, pushing and popping entries to/from the run stack 460 to save and resume its place in the graph. For example, the HNA processing core 408 may need to save its place in the graph if a walked node presents multiple options for a next node to walk. For example, the HNA processing core 408 may walk a node that presents multiple processing path options, such as a fork represented in the graph. According to embodiments disclosed herein, nodes of a DFA or NFA may be associated with a node type. Nodes associated with a split type may present multiple processing path options. The split node type is further disclosed below in reference to FIG. 5A.

According to embodiments disclosed herein, the HNA processing core 408 may be configured to select a given path, of the multiple processing paths, and push an entry to the run stack 460 that may enable the HNA processing core 408 to return and proceed along the unselected path, of the multiple processing paths, based on determining a mismatch (i.e., negative) result at walked node along the selected path. As such, pushing the entry on the run stack 460 may save a place in the graph that represents unexplored context. The unexplored context may indicate a given node of the graph and a corresponding payload offset to enable the HNA processing core 408 to return to the given node and walk the given node with the given segment of the payload from the payload buffer 462, as the given segment may be located at the corresponding payload offset in the payload. As such, the run stack 460 may be used to enable the HNA processing core 408 to remember and later walk an unexplored path of the graph. Pushing or storing an entry that indicates a given node and a corresponding offset in a given payload may be referred to herein as storing unexplored context, thread or inactive thread. Popping, fetching, or loading an entry that indicates the given node and the corresponding offset in the given payload in order to walk the given node with a segment located at the corresponding offset in the given payload may be referred to herein as activating a thread. Discarding an entry that indicates the given node and the corresponding offset in the given payload may be referred to herein as flushing an entry or retiring a thread.

The save buffer 464 may enable the HNA processing core 408 to save its place in the graph in an event that a boundary of the payload in the payload buffer 462 is reached while walking segments of the payload with the graph. For example, the HNA processing core 408 may determine that the payload or a portion of the payload in the payload buffer 462 is partially matching a given pattern and that a current payload offset of the payload is an end offset of the payload. As such, the HNA processing core 408 may determine that only a partial match of the given pattern was found and that the entire payload was processed. As such, the HNA processing core 408 may save the run stack 460 content to the save buffer 464 to continue a walk with a next payload corresponding to a same flow as the payload that was processed. The save buffer 464 may be configured to store at least one run stack entry of the run stack 460, mirroring a running state of the run stack 460 in an event the entire payload is processed.

Based on finding a final (i.e., entire or complete) match of the pattern, the HNA may pop and discard entries in the run stack 460 that are associated with the current HNA job, for example the HNA job loaded from the input buffer and save match results (not shown) to the match results buffer 466. Alternatively, the HNA processing core 408 may continue processing entries of the run stack 460 that are associated with the current HNA job as all possible matching paths may be of interest.

The match results may include a node address associated with a node at which the final match of the pattern was determined. The node at which the final match of the pattern was determined may be referred to herein as a marked node. The node address, or other identifier of a final match location in the graph, identifier of the matching pattern, length of the matching pattern, or any other suitable match results or a combination thereof, may be included in the match results.

Based on processing all of the run stack entries associated with the current HNA job, the HNA processing core 408 may load a next HNA job from the run stack 460 that was been previously loaded from the input buffer 458, as the HNA processing core 408 may be configured to process HNA jobs of the at least one HNA instruction 153 sequentially. As such, the HNA processing core 408 may fetch a next graph (not shown) from the super-cluster graph memory 156a, the HNA on-chip graph memory 156b, or the HNA off-chip graph memory 156c and walk the next graph with one or more payload segments from a next payload identified by the next HNA job, and continue to process additional HNA jobs until the run stack 460 is empty.

Based on finding a mismatch of the payload while walking the graph with the payload, the HNA processing core 408 may pop an entry from the run stack 460 that is associated with the current HNA job and walk a next node with a next segment of the next payload based on content of the entry popped. If the run stack 460 does not include an entry associated with the HNA current job, the HNA processing core 408 may be done with the current HNA job and may load a next HNA job from the run stack 460 that has been previously loaded from the input buffer 458. As such, the HNA processing core 408 may be configured to walk another next graph based on the next HNA job loaded, and continue to process additional jobs until the run stack 460 is empty.

Embodiments disclosed herein may employ the top of stack register 470 to improve match performance. The top of stack register 470 may be referred to interchangeably herein as a supplemental memory 470, TOS register 470 or the TOS 470. The top of stack register 470 may be a first memory operatively coupled to a second memory, such as the run stack 460. The HNA processing core 408 of the HPU 425 may be operatively coupled to the top of stack register 470 and the run stack 460. The top of stack register 470 may be configured to store an HNA job (i.e., a context), such as a stack entry (also referred to interchangeably herein as context or unexplored context), that may be pushed by the HNA processing core 408 for walking a given node, of a plurality of nodes of a given finite automaton of at least one finite automaton. For example, context may be pushed or popped for walking the given node. The context may identify the given node and an offset, of a segment in a payload of an input stream received from the network. The context may enable the HNA processing core 408 to walk the given node identified via the context with the segment identified via the offset.

The top of stack register 470 may be associated with context state information that may include a validity state (also referred to interchangeably herein as a validity indicator). The validity state may indicate a valid or invalid state for the top of stack register 470. The valid state may indicate that the top of stack register 470 has a pending context stored. The pending context may be stored context that has not yet been processed by the HNA processing core 408.

The invalid state may indicate that the top of stack register 470 has no pending context stored, for example, an entry stored to the top of stack register 470 has already been popped by the HNA processing core 408 to walk a given node with a segment or otherwise discarded by the HNA processing core 408. As such, the context state information may be used by the HNA processing core 408 to discern whether the top of stack register 470 has a pending context.

According to embodiments disclosed herein, the validity state may be implemented as a bit of the top of stack register 470, as a multi-bit field of the top of stack register 470, as an indicator stored separate from the top of stack register 470, or implemented in any other suitable manner that conveys status regarding whether the top of stack register 470 register has pending context stored.

The HNA processing core 408 may employ the run stack 460 to save context such as states of nodes of an NFA graph during a walk of the nodes of the NFA graph. The TOS register 470 may have faster access (i.e., read/write) times than the run stack 460. In contrast to an ECC protect memory for which a push or pop operation may take three, four, or more clock periods, the push or pop operation may take one clock period if performed on the TOS register 470. The TOS register 470 may maintain a most recently pushed stack entry separate from earlier pushed entries that may be pushed to the run stack 460 via the TOS register 470. Maintaining the most recently pushed entry in the TOS register 470 may improve walk performance as the most recently pushed entry may be a most frequently accessed entry, that is, the most recently pushed entry is likely to be popped before another entry is pushed.

Storing context, such as by pushing a first context, may include a store determination, based on the context state information associated with the TOS register 470, to access the TOS register 470 and not the run stack 460 or to access the TOS register 470 and the run stack 460. The store determination to access the TOS register 470 and not the run stack 460 may be based on the context state information indicating the invalid state of the TOS register 470. The store determination to access the TOS register 470 and the run stack 460 may be based on the context state information indicating the valid state of the TOS register 470.

The TOS register 470 may be configured with a single entry for storing a single context (i.e., HNA job) and the run stack 460 may be configured with multiple entries for storing multiple contexts. In an event the HNA processing core 408 pops context (i.e., a stack entry), for example, to retrieve a stored context, a check may be made as to whether the context state information indicates the valid or invalid state of the TOS register 470. If the context state information indicates the valid state, a most recently pushed context may be popped 478 from the TOS register 470 and the context state information may be updated to indicate the now invalid state of the TOS register 470 as TOS register 470 no longer stores a pending context.

If however, the check determines that the context state information indicates the invalid state, the pending context may instead be popped 480 (i.e., retrieved) from the run stack 460. As such, pending context may be retrieved from the run stack 460 based on an invalid state of the context state information that is associated with the TOS register 470, and pending context stored by the run stack 460 is not written to the TOS register 470.

Figure 4B:
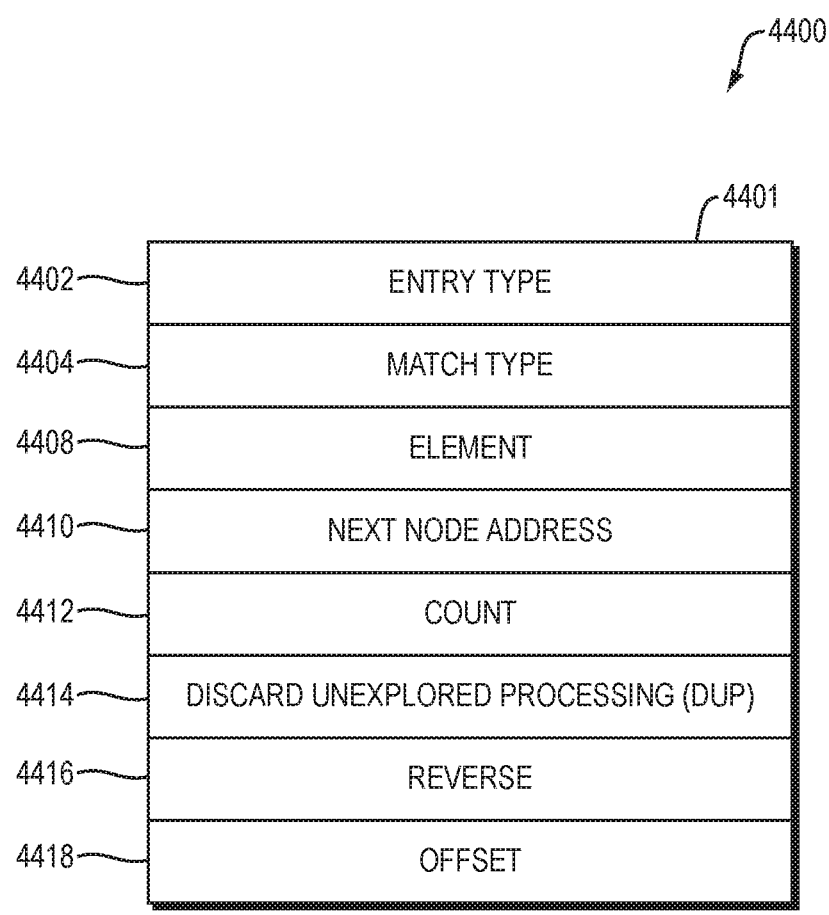
FIG. 4B is a block diagram of an example embodiment of context that may be stored or retrieved according to embodiments disclosed herein.

FIG. 4B is a block diagram 4400 of an example embodiment of context 4401 (i.e., an HNA job) that may be stored or retrieved according to embodiments disclosed herein, such as by pushing or popping a stack entry. The context 4401 may include a plurality of fields 4402-4418. The plurality of fields may include a context entry type field 4402 that may be based on a node type of a plurality of node types. The context entry type field 4402 may signify which fields, of the plurality of fields 4402-4418 may be relevant for the node type.

The context 4401 may further include a match type field 4404 that that may be relevant based on the context entry type field 4402. The match type field 4404 may be based on the node type and may be used to determine whether a given node is configured to match a single instance or multiple consecutive instances of a given element in an input stream received from the network.

The context 4401 may further include an element field 4408 that may be relevant regardless of the context entry type field 4402 and may identify the given element for matching at the given node.

The context 4401 may further include a next node address field 4410 that may be relevant regardless of the context entry type field and may identify a next node associated with the given node. For example, based on a positive match at the given node, the next node for walking a next segment may be identified via the next node address field 4410.

The context 4401 may further include a count field 4412 that may be relevant based on the context entry type field 4402. The count field 4412 may identify a count value for a number of consecutive instances remaining for positively matching the given element identified by the element field 4408 at the given node.

The context 4401 may further include a discard unexplored context (DUP) field 4414 that may be relevant regardless of the context entry type field 4402 and may identify whether to discard the context 4401 or walk the next node identified by the next node address field 4410, in an event a complete match of at least one regular expression is detected in the input stream.

The context 4401 may further include a reverse walk direction field 4416 that may be relevant regardless of the context entry type field 4402 and may identify a reverse or forward direction of walking.

The context 4401 may further include an offset field 4418 that may be relevant regardless of the context entry type field 4402 and may identify an offset of a segment of a payload in the input stream for matching to a particular element. The particular element may be identified based on the context entry type field 4402.

Pushing context may include configuring a stack entry that includes the context 4401 and the stack entry may be stored on a stack such as the run stack 460 of FIG. 4A disclosed above. A first subset of the fields of the context 4401 may be configured based on given metadata associated with the given node, obtained based on having previously fetched the given node, such as the match type field 4404, the element field 4408, and the next node address field 4410 field. A second subset of the fields of the context 4401 may be configured by the HNA processing core 408 based on run time information for the walk, such as a current walk direction or count value being maintained for the given node. For example, the second subset may include the reverse walk direction field 4416, the count field 4412, and the discard unexplored context (DUP) field 4414.

The context 4401 may be interpreted by the HNA processing core 408 based on a context status setting (not shown) included in the context entry type field 4402. The context status setting may indicate whether or not the context 4401 is complete or incomplete. Based on the context status setting of the context entry type field 4402 of the context 4401 of a popped stack entry indicating that the context 4401 is incomplete, the HNA processing core 408 may be configured to fetch the next node identified via the next node address field 4410 and proceed with the walk based on metadata stored by the next node and current run time configuration, such as a direction of the walk, rather than proceeding with the walk based on field configuration of the context 4401 of the popped stack entry.

Figure 5A:
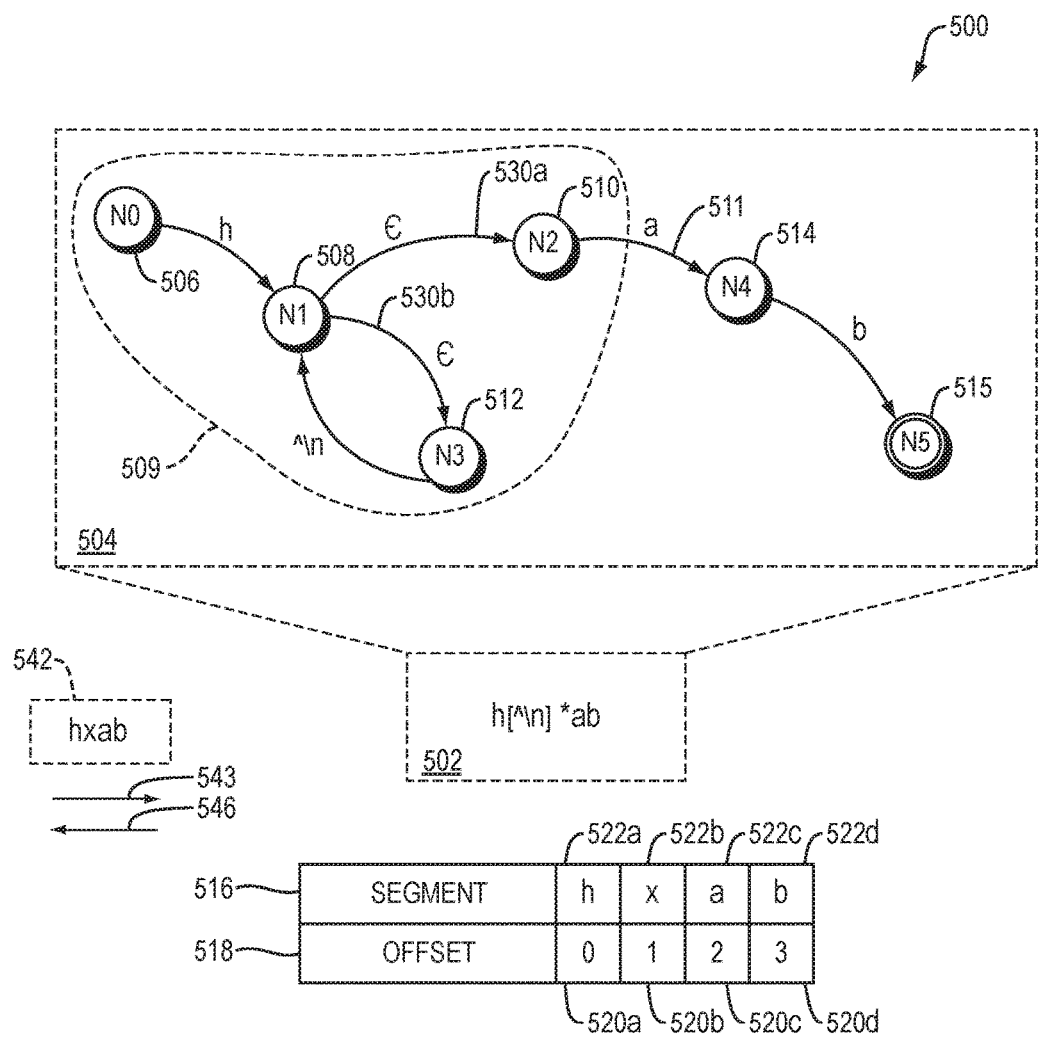
FIG. 5A is a block diagram of an example embodiment of a per-pattern non-deterministic finite automaton (NFA) graph that may be used by a walker to match a regular expression pattern in an input stream.

FIG. 5A is a block diagram 500 of an example embodiment of a per-pattern NFA graph 504 that may be used by the walker 320 to match a regular expression pattern 502 in an input stream (not shown). As disclosed above, the at least one HNA processor 108 may be configured to implement functionality of the walker 320 with respect to NFA processing and the at least one HNA processor 108 may include a plurality of super-clusters. Each super-cluster may include a plurality of clusters. Each cluster of the plurality of clusters may include a plurality of HNA processing units (HPUs) that may each include an HNA processing core 408 as disclosed above with reference to FIG. 4A. As such, functionality of the walker 320 with respect to NFA processing may be implemented by at least one HNA processing core 408 of at least one HPU 425 based on scheduling of HNA instructions by the HNA scheduler 129.

In the example embodiment of the per-pattern NFA graph 504 that may be used by the walker 320, the input stream may include a packet (not shown) with a payload 542. The regular expression pattern 502 is a pattern "h[^\n]*ab" that specifies the character "h" followed by an unlimited number of consecutive characters not matching a newline character (i.e., [^\n]*). The unlimited number may be zero or more. The regular expression pattern 502 further includes the characters "a" and "b" consecutively following the unlimited number of characters not matching the newline character. In the example embodiment, the payload 542 includes segments 522*a-d* (i.e., h, x, a, and, b), with respective offsets 520*a-d* (i.e., 0, 1, 2, and 3) in the payload 542.

It should be understood that the regular expression pattern 502, NFA graph 504, payload 542, segments 522*a-d*, and offsets 520*a-d* represent examples used for illustrative purposes and that the system, methods, and corresponding apparatus disclosed herein may apply to any suitable regular expression pattern, NFA graph, payload, segments, and offsets. Further, it should be understood that the NFA graph 504 may be a sub-section of a larger NFA graph (not shown). In addition, the payload 542 may a portion of a larger payload (not shown) and the portion may be at the beginning, end, or any location of the larger payload, resulting in offsets different from those in the example embodiment.

In the example embodiment, the NFA graph 504 is a per-pattern NFA graph configured to match the regular expression pattern 502 to the input stream. For example, the NFA graph 504 may be a graph including a plurality of nodes generated by the compiler 306, such as nodes N0 506, N1 508, N2 510, N3 512, N4 514, and N5 515. The node N0 506 may represent a starting node for the regular expression pattern 502, and the node N5 515 may represent a marked node for the regular expression pattern 502. The marked node N5 515 may be associated with an indicator (not shown) that reflects a final (i.e., entire or complete) match of the regular expression pattern 502 matched to the input stream. As such, the walker 302 may determine that the regular expression pattern 502 is matching in the input stream based on traversing the marked node N5 515 and detecting the indicator. The indicator may be a flag or field setting of metadata (not shown) associated with the marked node or any other suitable indicator.

According to embodiments disclosed herein, the walker 320 may walk the segments 522*a-d* of the payload 542 one segment at a time through the NFA graph 504 to match the regular expression pattern 502 to the input stream. A given segment of the segments 516 for walking a given node may be determined based on its respective offset of the offsets 518 being a current offset within the payload 542. According to embodiments disclosed herein, the walker 320 may update the current offset by incrementing or decrement the current offset. For example, the walker 320 may walk the NFA graph 504 in a forward or reverse direction, and, thus, may walk segments from the payload 542 in a forward 543 or a reverse 546 direction, by respectively incrementing or decrementing the current offset.

The nodes N0 506, N2 510, N3 512, and N4 514, may be configured to match a respective element to a given segment of the payload 542, whereas nodes N1 508 and N5 515 may be nodes of a node type indicating no matching functionality, and, thus, would not process from the payload 542. In the example embodiment, node N1 508 is split node presenting multiple transition path options to the walker 320. For example, walking the split node N1 508 presents epsilon paths 530*a* and 530*b*. According to embodiments disclosed herein, the walker 320 may select a given path of the multiple paths 530*a* and 530*b* based on an implicit setting that is in mutual agreement with the walker 320. For example, the compiler 306 may generate the NFA graph 504 based on an implicit understanding that the walker 320 follows a deterministic path, for example, with the implicit understand that the walker 320 selects an upper epsilon path 530*a* based on walking the split node 508. According to embodiments disclosed herein, the upper epsilon path 530*a* may be selected as the upper epsilon path 530*a* represents a lazy path. The lazy path may be the path representing the shortest possible match of elements.

According to embodiments disclosed herein, the split node N1 508 may be associated with split node metadata (not shown) to present the multiple path options. For example, the split node metadata may indicate, either directly or indirectly, multiple next nodes, such as the nodes N2 510 and N3 512, in the example embodiment. If the multiple next nodes are indicated directly, the metadata may include absolute addresses or pointers to the next nodes N2 510 and N3 512. If the multiple next nodes are indicated indirectly, the metadata may include indices or offsets that may be used to resolve absolute addresses of the next nodes N2 510 and N3 512 or pointers to the next nodes N2 510 and N3 512. Alternatively, other suitable forms for directly or indirectly indicating next node addresses of the multiple next nodes may be used.

The implicit understanding may include configuring the walker 320 to select a given next node of multiple next nodes based on node metadata included in a particular entry location within the split node metadata. The compiler 306 may be configured to generate the split node metadata including an indication of the given next node at the designated entry location. As such, the implicit understanding that a given path, such as the upper epsilon path 530*a*, will be selected by the walker 320 at the split node N1 508 may be used by the compiler 306 generating the NFA graph 504.

FIG. 5B is a table 538 of an example embodiment of processing cycles for walking the per-pattern NFA graph of FIG. 5A with a payload 542. It should be understood that a processing cycle may include one or more clock cycles.

As shown in the table 538, the processing cycles 540*a-h* may include walking a current node 530 with a segment from the payload 542 at a current offset 532 to determine a match result 534 and walker action 536 based on the match result 534. In the example embodiment, the node N0 506 may have a character node type. For example, the node N0 506 may be a character node that is configured to match the character "h" in the input stream. In the example embodiment, the walker 320 may walk the starting node N0 506 with the segment 522*a* (i.e., "h") at the current offset 520*a* in the processing cycle 540*a*.

The walker 320 may determine that the match result 534 is a positive match result as the segment 522*a* matches character "h" at the node N0 506. As specified by the compiler 306 via metadata (not shown) associated with the starting node N0 506, the walker 320 may walk in a forward direction and fetch the next node indicated by the metadata associated with the node N0 506 and may increment the current offset from 520*a* (i.e., "0") to 520*b* (i.e., "1"). The next node indicated by the node N0 506 is the split node N1 508 in the example embodiment. As such, the walker 320 takes the action 536 for the processing cycle 540*a* that includes updating the current offset to "1" in the payload 542 and transitioning to the split node N1 508. Transitioning may include fetching (also referred to herein as loading) the split node N1 508.

As the split node N1 508 presents multiple transition path options, such as the epsilon paths 530a and 530b, the action 536 for the processing cycle 540b may include selecting the upper epsilon path 530a and fetching the node N2 510 independent of the payload 542 and without consuming (i.e., processing) from the payload 542. Since no matching function is performed by the split node N1 508, the current offset/segment 532 are unchanged, and, thus, payload is not consumed (i.e., processed) for the processing cycle 540b.

Since the split node N1 508 presents multiple path options, the action 536 may include storing unexplored context, such as by storing an indirect or direct identifier of the node N3 512 and the current offset 520b (i.e., "1"). The selected transition path may be referred to herein as the current or active thread and each untraversed transition path that is stored may be referred to herein as a stored thread. Each thread may be identified by a corresponding node identifier and offset in a payload. As such, the unexplored context may identify an unexplored thread (i.e., path).

Storing the unexplored context may enable the walker 320 to remember to return to the node N3 512 to walk the node N3 512 with the segment "1" at the offset 520b in the payload 542 in an event a negative match result occurs along the selected partially matching path, for example, if the negative match result is determined at the node N2 510 or nodes along a path extending from the node N2 510. According to embodiments disclosed herein, the unexplored context may be marked with a Discard Unexplored Processing (DUP) indicator that indicates to the walker 320 whether to discard or process the unexplored context in an event a final match for the regular expression pattern 502 is identified along the selected transition path.

For example, based on reaching the marked node N5 515 that indicates the final (i.e., complete or entire) match for the regular expression pattern 502 in the input stream, the walker 320 may utilize the DUP indicator to determine whether to process the unexplored context by walking the node N3 512 with the segment "x" at the offset 520b in an effort to determine another path of the NFA graph 504 that matches the regular expression pattern 502, or whether to discard the unexplored context. Marking the unexplored context with the DUP indicator may include marking the unexplored context in any suitable manner, such as by setting a bit or field associated with the unexplored context to true, to signify desired processing of the stack entry, or false to signify a desired discard of the stack entry.

Whether or not a stored thread is traversed may be determined by the compiler 306. For example, the compiler 306 may control whether or not the DUP indicator is set by configuring a setting in corresponding metadata for each node. Alternatively, the compiler 306 may configure a global setting included in global metadata associated with the finite automata, specifying that all stored threads are to be traversed, enabling all possible matches to be identified.

In the example embodiment, the selection of the epsilon transition path 530a may result in detecting a match failure at the node N2 510 or at a subsequent node, such as N4 514, of the current thread. As such, if a match failure is detected, the stored thread for the epsilon transition path 530b may then be traversed. Alternatively, if specified by the compiler 306, the epsilon transition path 530b may be traversed regardless of whether or not traversing the epsilon transition path 530b results detection of a match failure.

Storing the untraversed transition path may include pushing an entry on a stack, such as the run stack 460 of FIG. 4A, by storing an identifier of the next node N3 513 in association with an indication of the current offset 522b in the entry. The identifier of the next node N3 513 may be a value, pointer, or any other suitable indicator of the next node. The value of the offset may be a numeric value, pointer, or any other suitable value identifying locations of segments 516 within the payload 542.

According to the example embodiment, based on selecting the upper path (i.e., the epsilon transition path 530a) the walker 320 may fetch the node N2 510 and try to match the segment 522b (i.e., "x") at the current offset 520b (i.e., "1") to the element "a" of the node N2 510 in the processing cycle 540c. Since "x" does not match element "a" at the node N2 510, the action 536 for the processing cycle 540c may include popping an entry from the run stack 460. The entry popped 544b may be a most recently pushed entry, such as a stored entry 544a indicating the node N3 512 and offset 520b (i.e., "1") in the example embodiment.

The walker 320 may transition and walk the node N3 512 and with the segment "x" located at the offset 520b in the payload 542. As such, the processing cycle 540d shows the match result 534 is positive for processing cycle 540d. The action 536 for the processing cycle 540d may include updating the current offset to the offset 520c and transitioning back to the split node N1 508 that may be a next node indicated by the node N3 512.

Since all arcs transitioning from the split node N1 508 are epsilon transitions, the walker 320 may again select a path of the multiple path options and does not consume (i.e., process) a segment from the payload 542 as the current offset is not updated for the processing cycle 540e. In the example embodiment, the walker 320 again selects the epsilon transition path 530a. As such, the walker 320 again stores a thread by pushing node N3 512 and the current offset, now 520c (i.e., "2"), on the run stack 460. As shown for processing cycle 540f, the walker 320 fetches node N2 510 and matches the segment 522c (i.e., "a") at offset 520c (i.e., "2") to the element "a" of the node N2 510. Since "a" matches at the node N2 510, the walker 320 updates the current offset to 520d (i.e., "3") and transitions to the node N4 514 that is specified by the node N2 510 metadata (not shown) as configured by the compiler 306. For example, node N2 510 metadata may specifying a transition 511 from a given node such as the node N2 510 to a next node such as the node N4 514 via a next node address (not shown) associated with the given node N2 510. According to embodiments disclosed herein, the next node address may be configured to identify the next node and a given memory of the plurality of memories, such as the super-cluster graph memory 156a, HNA on-chip graph memory 156b, or the HNA off-chip graph memory 156c, to which the compiler 306 distributes the next node for storing.

As such, for the processing cycle 540g, the walker 320 may fetch the next node N4 514 and the next segment 522d (i.e., "b") at the offset 520d. Since "b" matches at the node N4 514, the walker 320 may transition to the next node N5 515. The node N5 515 is a marked node associated with an indicator signifying a final (i.e., complete or entire) match of the regular expression pattern 502 in the input stream. Thus, for the processing cycle 540h the walker 320 may discontinue the walk along the current path and report the final match by storing an entry in the match result buffer 466. The walker 320 may then check the run stack 460 for stored threads and either discard the stored threads or activate them as indicated by the corresponding DUP indicator. As such, the walker 320 pops the entry that identifies the node N3 512 and the offset 520 (i.e., "2"), and determines whether to activate the stored thread by walking the node N3 512 with the segment 522c at the offset 520c or discard the stored thread according to the DUP indicator associated with the popped entry.

Embodiments disclosed herein may enable optimized match performance due to the combined DFA and NFA type processing disclosed above. For example, embodiments disclosed above may reduce a number of false positives in NFA processing as the NFA processing may be based on partial matches identified via the DFA processing. Further, because embodiments disclosed herein include per-rule (i.e., per-pattern) NFAs that may be identified by the DFA processing, embodiments disclosed herein further optimize match performance.

As disclosed above, the DFA 312 is a unified DFA and each at least one NFA 314 is a per-pattern NFA. Walking payload through the unified DFA 312 by the HFA processor 110 may be considered a first parsing block that marks starting points of patterns (intermediate matches) and provides the starting point to the at least one NFA 314 that may continue the walk from the mark to determine a final match. For example, based on the partial match results determined by processing segments of payloads of an input stream through the unified DFA 312, the walker 320 may determine that a given number of rules (i.e., patterns) of the rule set 310 need to be processed further, and the HFA processor 110 may produce pattern match results that may be converted into the given number of NFA walks as each at least one NFA 314 is a per-pattern NFA.

Figure 6:
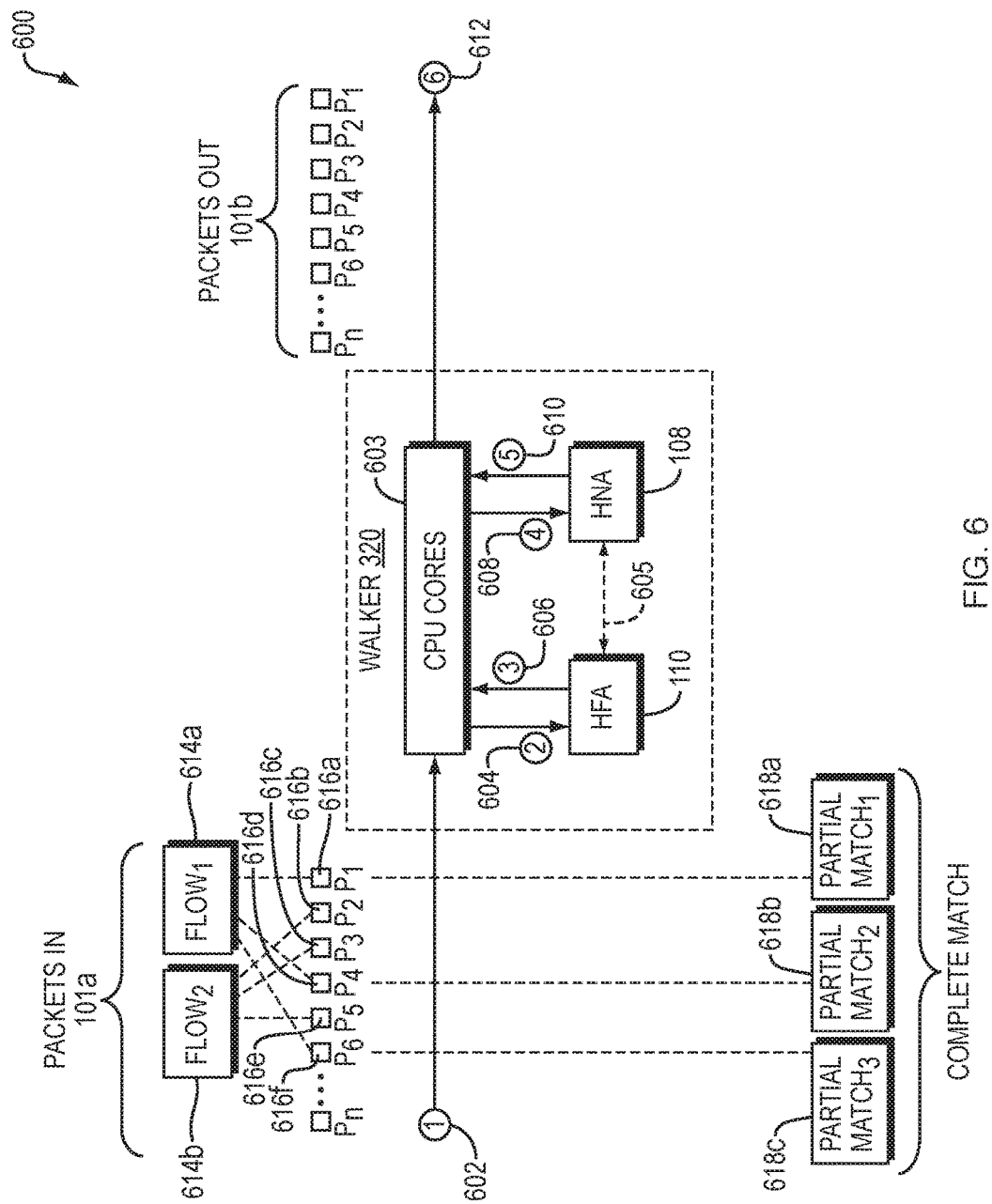
FIG. 6 is a block diagram of an example embodiment of an environment for the walker.

FIG. 6 is a block diagram 600 of an example embodiment of an environment 600 for the walker 320. An input stream of packets 101a may be received 602 and may include packets 616a-f that may be packets from different flows, such as a first flow 614a and a second flow 614b. For example, packets P1 616a, P4 616d, and P6 616f may be packets in the first flow 614a whereas packets P2 616b, P3 616c, and P5 616e may belong to the second flow 614b. The processing cores 603 may be general purpose processing cores of the security appliance 102, such as the at least one CPU core 103 disclosed above with reference to FIG. 1A and FIG. 1G, that may be configured to perform higher level protocol processing of the packets 101a and may be configured to offload the pattern matching methods to the HFA processor 110 and the at least one HNA processor 108.

The packets 101a may be forwarded 604 to the HFA processor 110 and the walker 320 may walk segments of the packets 101a through the unified DFA, such as the unified DFA 312 of FIG. 3A, to determine partial matches of the regular expression patterns 304 in the input stream. The walker 320 may be configured to forward 606 results of the partial matches that may identify offsets of segments of the packets 101a and nodes of per-pattern NFAs, such as the at least one NFA 314, to progress the partial matches by a given HPU of a given cluster of a given super-cluster of the at least one HNA processor 108 that may walk the at least one NFA 314 based on the partial match results of the DFA processing of the HFA processor 110, as the partial match results may be forwarded 608 to the at least one HNA processor 108 with corresponding packets of the packets 101a.

The given HPU of the given cluster of the given super-cluster of the at least one HNA processor 108 may enable a determination that partial matches 618c, 618b, and 618a, form a final (i.e., complete) match to a given regular expression pattern of the regular expression patterns 304 in the input stream. For example, by forwarding 606 the HFA partial match results from the HFA processor 110 to the at least one HNA processor 108, either indirectly via the processing cores 603, or directly 605 from the HFA processor 110, each packet partially matched by the HFA processor 110 may enable the given HPU of the given cluster of the given super-cluster of the at least one HNA processor 108 to advance the partial match as the walker 320 may walk segments of the packets 101a through the at least one NFA 314, with "hints" or starting information from the HFA processor 110.

For example, as disclosed above in reference to FIG. 4A, the input buffer 458 may include at least one HNA job of the at least one HNA instruction 153, for processing by the HNA processing core 408 of the selected HPU 425 that is assigned the at least one HNA instruction 153. Each at least one HNA job of the at least one HNA instruction 153 may belong to a same given payload that was processed by the HFA processor 110. Such "hints" or starting information that may be based on packet "pre-screening" by the HFA processor 110 may include NFA starting nodes with corresponding offsets of payload segments for walking with a per-pattern NFA, as disclosed above. As such, the walker 320 may determine final match results 610 for packets 101a that may be forwarded to the processing cores 603 from the at least one HNA processor 108 and the packets 101a may then be forwarded 612 as appropriate as the packets 101b in the network.

In addition to such pre-screening of packets by the HFA processor 110 that may reduce a number of false positives for NFA processing, embodiments disclosed herein may further optimize match performance by distributing nodes of each per-pattern NFA to memories in a memory hierarchy based on node locality. Since each NFA may be a per-pattern NFA, embodiments disclosed herein may advantageously distribute nodes of each per-pattern NFA to memories in a hierarchy based on an understanding that the longer the rule (i.e., pattern) the less likely it is that nodes generated from portions at the end of the rule (i.e., pattern) are to be accessed (i.e., walked or traversed). By storing earlier nodes of each of the per-pattern NFA in relatively faster (i.e., higher performance) memories, embodiments disclosed herein may further optimize match performance. It should be understood that because such node distribution may be based on a hierarchical level to memory mapping, nodes may be advantageously distributed based on the hierarchical levels mapped, enabling any suitable distribution that optimizes match performance to be utilized.

As disclosed above, the at least one NFA 314, such as the per-pattern NFA 504 of FIG. 5A, may be stored in at least one memory, such as the super-cluster graph memory 156a, HNA on-chip graph memory 156b, or the HNA off-chip graph memory 156c. According to embodiments disclosed herein, match performance of the walker 320 may be optimized based on the smart compiler 306 advantageously distributing nodes of the per-pattern NFA 504 across the at least one memory that may include multiple graph memories, such as the super-cluster graph memory 156a, HNA on-chip graph memory 156b, or the HNA off-chip graph memory 156c, that may be in a memory hierarchy. The super-cluster graph memory 156a, HNA on-chip graph memory 156b, or the HNA off-chip graph memory 156c may be static memories each pre-loaded for each per-pattern NFA graph for faster processing. Based on different access times for the multiple graph memories, application performance may reach beyond 20+Gbps search rates.

Match performance of the walker 320 may be optimized based on storing consecutive nodes, such as the nodes N0

506, N1 508, N2 510, and N3 512, of the section 509 of the per-pattern NFA 504 of FIG. 5A, in a faster performance memory mapped to a higher hierarchical level relative to another memory that may be mapped to a lower hierarchical level in the memory hierarchy that stores the consecutive nodes N4 514 and N5 515. Since the NFA 504 is a per-pattern NFA generated from a single pattern, such as the regular expression pattern 502, the NFA 504 is separate from other NFAs generated for other patterns, and, thus, embodiments disclosed herein may be based on a recognized locality of nodes of the per-pattern NFA not present for nodes of a unified NFA.

Embodiments disclosed herein may be based on an understanding that earlier nodes of a per-pattern NFA graph, such as the per-pattern NFA graph 504, such as the nodes N0 506, N1 508, N2 510 and N3 512, may have a higher likelihood of being traversed than the nodes N4 514 and N5 515 because the nodes N4 514 and N5 515 are located towards the end of the rule (i.e., regular expression pattern 502), and thus, require that more of the payload be matched in order to be walked (i.e., traversed). As such, earlier nodes of a per-pattern NFA, such as the NFA 504, or any other suitable per-pattern NFA graph, may be considered to be "high touch" nodes that may be accessed on a more frequent basis due to false positives than "low touch" nodes that are more likely only to be accessed in an event a complete match of the pattern occurs.

According to embodiments disclosed herein, the compiler 306 may distribute nodes of each per-pattern NFA to memories in a hierarchy based on the understanding of which nodes in each per-pattern NFA are considered "high touch" nodes and which are considered to be "low touch" nodes. Such an understanding may be used to "pre-cache" (i.e., statically store) nodes of each per-pattern NFA by distributing the nodes to memories in a memory hierarchy enabling an improved match performance. For example, "high touch" nodes may be distributed to faster memories based on the understanding that the "high touch" nodes will be accessed (i.e., walked or traversed) more frequently due to their locality within the per-pattern NFA.

In general, regular expression access patterns of a unified NFA, generated based on a set of regular expression patterns, may be random as such access patterns may be based on the particular payload. Thus, a history of regular expression access patterns cannot be used to predict further regular expression access patterns. For example, caching a most recently traversed node of a unified NFA may provide no performance benefit to a walker because a next node accessed within the unified NFA may not be the cached node.

Figure 7A:
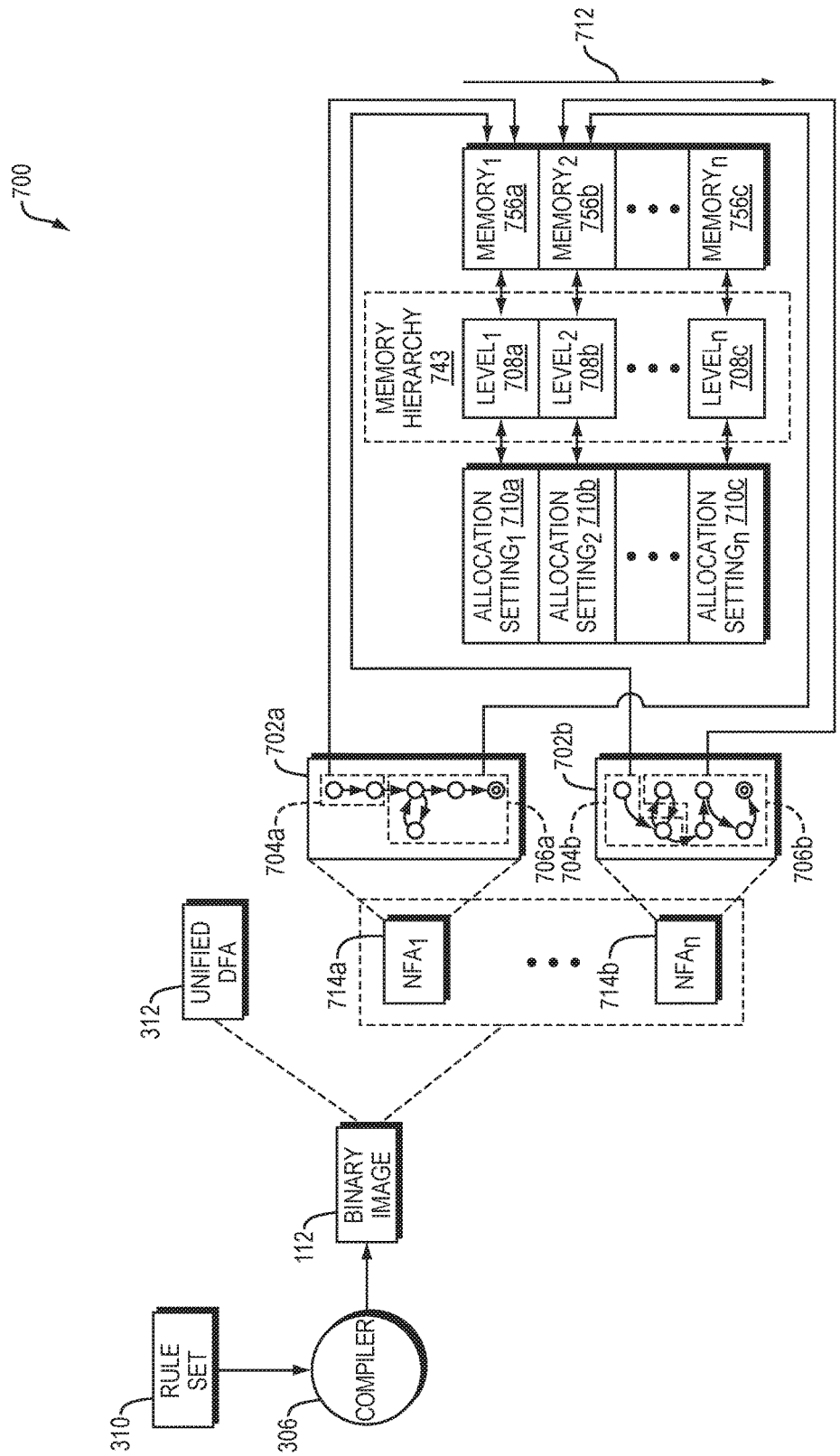
FIG. 7A is a block diagram of an example embodiment of an environment for the compiler.

FIG. 7A is a block diagram of an embodiment of an environment 700 for the compiler 306. As disclosed above, the compiler 306 may be referred to herein as a smart compiler that may be configured to compile the rule set 310 into the binary image 112 by identifying portions of the rule set 310 that may be best suited for DFA or NFA processing. Thus, the binary image 112 may include at least two sections with a first section for DFA processing and a second section for NFA processing, such as the unified DFA 312 and the at least one NFA 314, as disclosed above in reference to FIG. 3A. According to embodiments disclosed herein, the at least one HNA processor 108 may be operatively coupled to multiple memories that may include the graph memories, such as the super-cluster graph memory 156a, HNA on-chip graph memory 156b, or the HNA off-chip graph memory 156c, as disclosed above. According to embodiments disclosed herein, the compiler 306 may be configured to determine placement of nodes of the unified DFA 312 and the at least one NFA 314 in the graph memories, such as the super-cluster graph memory 156a, HNA on-chip graph memory 156b, or the HNA off-chip graph memory 156c.

According to embodiments disclosed herein, the unified DFA 312 may be statically stored in a given memory of DFA graph memories, whereas at least one NFA 314 may have nodes distributed and statically stored across the graph memories, such as the super-cluster graph memory 156a, HNA on-chip graph memory 156b, or the HNA off-chip graph memory 156c, as the compiler 306 may target distributions of particular NFA nodes for storing in particular memories for optimizing walker match performance. According to embodiments disclosed herein the graph memories, such as the super-cluster graph memory 156a, HNA on-chip graph memory 156b, or the HNA off-chip graph memory 156c, may be in a memory hierarchy 743 that may include a plurality of hierarchical levels 708a-c. The plurality of hierarchical levels 708a-c may be mapped to the multiple graph memories that may include memories 756a-c, that may be the super-cluster graph memory 156a, HNA on-chip graph memory 156b, and the HNA off-chip graph memory 156c, respectively.

The compiler 306 may map the hierarchical levels 708a-c in any suitable manner and the hierarchical levels 708a-c may be ranked in descending order 712 such that the hierarchical level 708a may be a highest hierarchical ranked level 708a and the hierarchical level 708c may be a lowest ranked hierarchical level. The graph memories 756a-c may include a random access memory (RAM) that may be a highest performance memory that may be co-located with an on-chip search memory (OSM) on the network services processor 100. The graph memories 756a-c may include the HNA off-chip graph memory 156c that may be included in the at least one system memory 151 that may be external and operatively coupled to the network services processor 100.

The RAM memory may be mapped to the highest ranked hierarchical level 708a, the OSM may be mapped to the next highest ranked level 708b, and the system memory may be mapped to the lowest ranked level 708c, based on a mapping according to performance (i.e., read and write access times) of the memories. However, it should be understood that a mapping between the plurality of hierarchical levels 708a-c and the graph memories 756a-c may be made in any suitable manner. For example, the mapping may be based on an understanding of an application associated with the rule set 310 from which the nodes being distributed to the memories 756a-c may be generated, thus, a highest performance memory may not be mapped to a highest ranked hierarchical level. Further, it should be understood that a number of hierarchical levels in the memory hierarchy 743 and a number of graph memories 756a-c shown are for illustrative purposes and may be any suitable number of hierarchical levels and memories.

As disclosed above, locality of nodes of a per-pattern NFA may be taken advantage of by the smart compiler 306 by storing NFA nodes generated from earlier portions of a given pattern in faster memories. Further, since the probability of a match of the given pattern is already higher since a partial match of the given pattern was determined by the DFA processing of the HFA processor 110, such embodiments combine to optimize match performance.

For example, as disclosed above, DFA processing may be used to reduce a number of false positives found by NFA processing. Since each NFA may be per-pattern NFA, nodes of each per-pattern NFA may be advantageously distributed across a plurality of memories based on a mapping of the plurality of memories to hierarchical levels of the memory hierarchy 743. For example, smaller NFAs generated from relatively shorter length patterns may have all nodes distributed to a first level and stored in a first memory that is mapped to the first level, whereas larger NFAs generated from relatively longer patterns may have a first portion of nodes distributed to the first level and remaining portions distributed amongst remaining levels. The first level may be a highest ranked level that is mapped to a highest performance memory.

As such, earlier nodes of the per-pattern NFAs may be stored in the highest performance memory. Since earlier nodes may have a higher likelihood of being traversed due to a false positive, embodiments disclosed herein may enable a majority of false positives to be handled via accesses to memories mapped to higher levels in the memory hierarchy 743. According to embodiments disclosed herein, match performance may be optimized by enabling a number of accesses to the memory 756a that is mapped to a highest ranked hierarchical level, such as the hierarchical level 708a in the memory hierarchy 743, to be relatively higher than a number of accesses to the memory 756c that may be mapped to the lowest ranked hierarchical level 708c.

The memory 756a may be a highest performance memory that enables, for example, 1300 million transactions per second, whereas the memory 756b may be of lesser performance that enables 150 million transactions per second, and the memory 756c may be a least performance memory that enables 12 million transactions per second. Further, according to embodiments disclosed herein, an amount of memory of such higher performance memories mapped to higher ranked hierarchical levels may be relatively smaller in size than lower performance memories, such as the memory 756c, that is mapped to a lowest ranked hierarchical level 708c, that may be a relatively large memory in comparison. For example, the memory 756c may be the HNA off-chip graph memory 156c that is included in the at least one system memory 151 that is external and provides a relatively large amount of storage capacity limited by an amount of physically attached memory.

According to embodiments disclosed herein, per-pattern NFA storage allocation settings 710a-c may be configured for the hierarchical levels 708a-c. The per-pattern NFA storage allocation settings 710a-c may denote a target number of unique nodes for distributing from each per-pattern NFA to a respective hierarchical level of the hierarchical levels 708a-c for storing in a given memory mapped to the respective hierarchical level. The compiler 306 may be configured to determine the per-pattern NFA allocation settings 710a-c in a manner that enables the memories 756a-c mapped to the hierarchical levels 708a-c to provide sufficient storage capacity in an event a per-pattern NFA is generated for each of the one or more patterns in the rule set 310.

The per-pattern NFA storage allocation settings 710a-c may denote a target number of unique nodes, of the respective set of nodes of each per-pattern NFA, for distributing to at a respective hierarchical level for storing to a given memory mapped to the respective hierarchical level. For example, based on the per-pattern NFA storage allocation setting 710a that is configured for the hierarchical level 708a, the compiler 306 may distribute a first portion 704a of the respective set of nodes 702a of the per-pattern NFA 714a and a second portion 704b of the respective set of nodes 702b of the per-pattern NFA 714b for storing in the memory 756a that is mapped to the hierarchical level 708a.

Based on the per-pattern NFA storage allocation setting 710b that is configured for the hierarchical level 708b, the compiler 306 may distribute a third portion 706a of the respective set of nodes 702a of the per-pattern NFA 714a and a fourth portion 706b of the respective set of nodes 702b of the per-pattern NFA 714b for storing in the memory 756b that is mapped to the hierarchical level 708b. Such distributions are target distributions as a number of nodes of a given respective set of nodes may not include the target number as fewer than the target number may have been generated or fewer than the target number may remain in a respective set for distribution.

In the example embodiment, the per-pattern NFA storage allocation setting 710c may be configured for the lowest ranked level 708c of the memory hierarchy 743 and may be specified in a manner that denotes an infinite number. The memory 756c that is mapped to the lowest ranked hierarchical level 708c in the example embodiment, may be the HNA off-chip graph memory 156c that is included in the at least one system memory 151 that has a relatively large amount of storage. As such, the compiler 306 may distribute nodes to the system memory including distributing any remaining undistributed nodes of each respective set of nodes generated for each of the per-pattern NFAs 714a-b for storing in the system memory 756c.

It should be understood that the hierarchical level to memory mapping may be inherently understood by the compiler and, as such, may obviate the specific hierarchical levels 708a-c. For example, the compiler 306 may configure the per-pattern NFA storage allocations settings 710a-c and map the settings directly to the memories 756a-c based on an inherent understanding of the hierarchical level mapping of each of the memories 756a-c in the memory hierarchy 743. It should also be understood that a number of per-pattern NFAs, nodes of the per-pattern NFAs, and distributions shown in FIG. 7A are for illustrative purposes and may be any suitable number of per-pattern NFAs, nodes, or distributions.

Figure 7B:
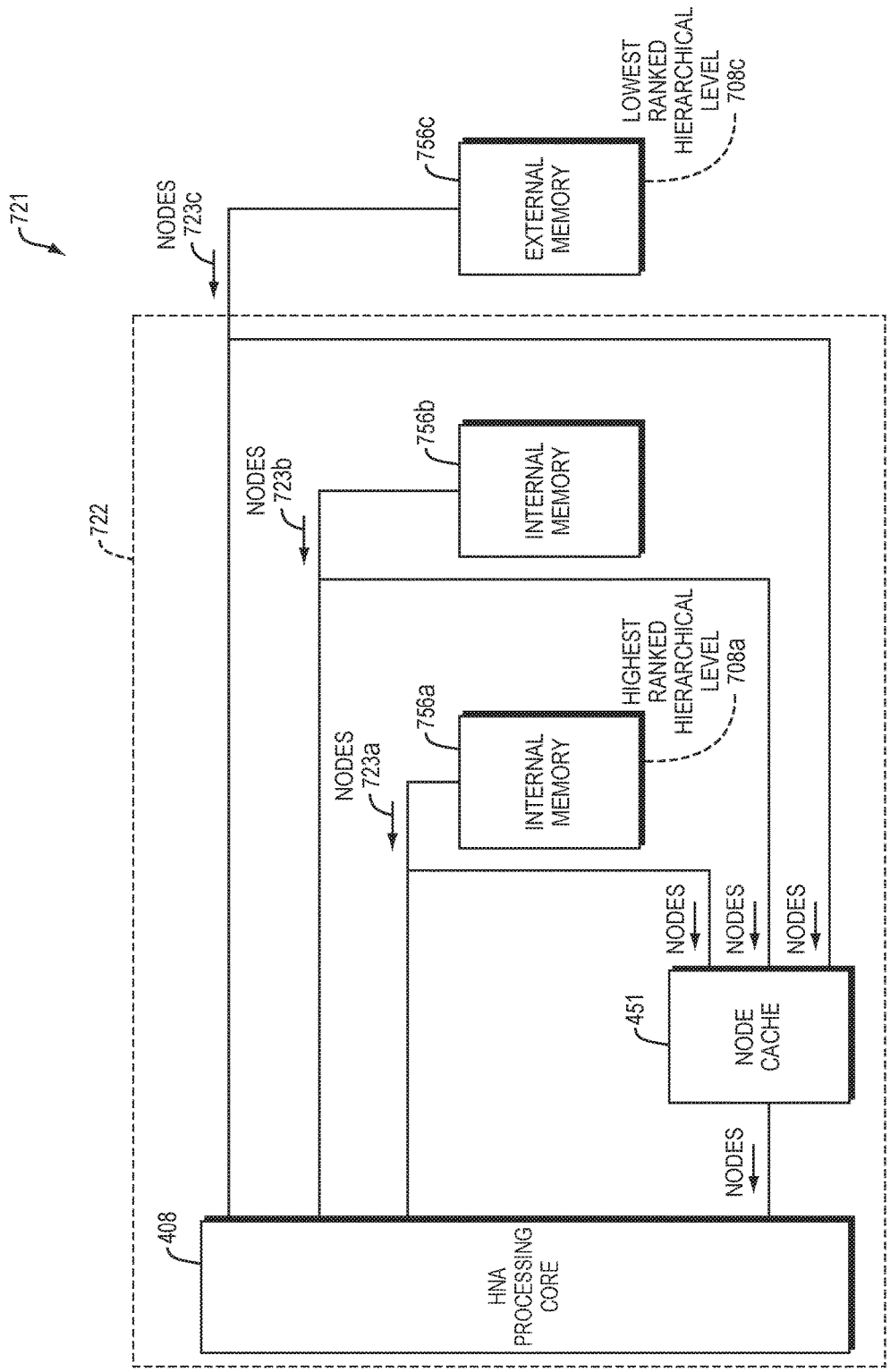
FIG. 7B is a block diagram of an example embodiment of an HNA processing core operatively coupled to a plurality of memories mapped to hierarchical levels in a memory hierarchy.

FIG. 7B is a block diagram 721 of an example embodiment of the HNA processing core 408 operatively coupled to the plurality of memories 756a-c, that may be mapped to the hierarchical levels 708a-c in the memory hierarchy 743 of FIG. 7A, and the node cache 451 of FIG. 4A. The memory 756a may be a fastest performance memory relative to the memories 756b and 756c. The memory 756a may be mapped to the highest ranked hierarchical level 708a in the memory hierarchy 743. The memory 756c may be a lowest performance memory relative to the other memories 756a and 756b that are also operatively coupled to the HNA processing core 408.

The highest ranked memory 756a may be a first memory co-located 722 on-chip with the HNA processing core 408. The memory 756b may be a next highest ranked memory that is a second memory co-located 722 on-chip with the HNA processing core 408. The highest ranked memory 756a may be a highest performance memory relative to the other memories 756b and 756c that are operatively coupled to the HNA processing core 408. The highest performance memory 756a may have the fastest read and write access times. The memory 756c may be a slowest performance memory may be a largest memory such as an external memory that is not located on a chip with the HNA processing core 408.

A respective hierarchical node transaction size 723a-c may be associated with each of the hierarchical levels 708a-c. Each respective hierarchical node transaction size may denote a maximum number of nodes to fetch from the given memory mapped to the respective hierarchical level for a read access of the given memory. For example, the hierarchical node transaction size 723a may be associated with the highest hierarchical level 708a. Since the memory 756a is at the highest hierarchical level 708a, the hierarchical node transaction size 723a may denote a maximum number of nodes to fetch from the memory 756a. Similarly, since the memory 756b is at the next highest hierarchical level 708b, the hierarchical node transaction size 723b may denote a maximum number of nodes to fetch from the memory 756b, and since the memory 756c is at the next lowest hierarchical level 708c, the hierarchical node transaction size 723c may denote a maximum number of nodes to fetch from the memory 756c.

Figure 8:
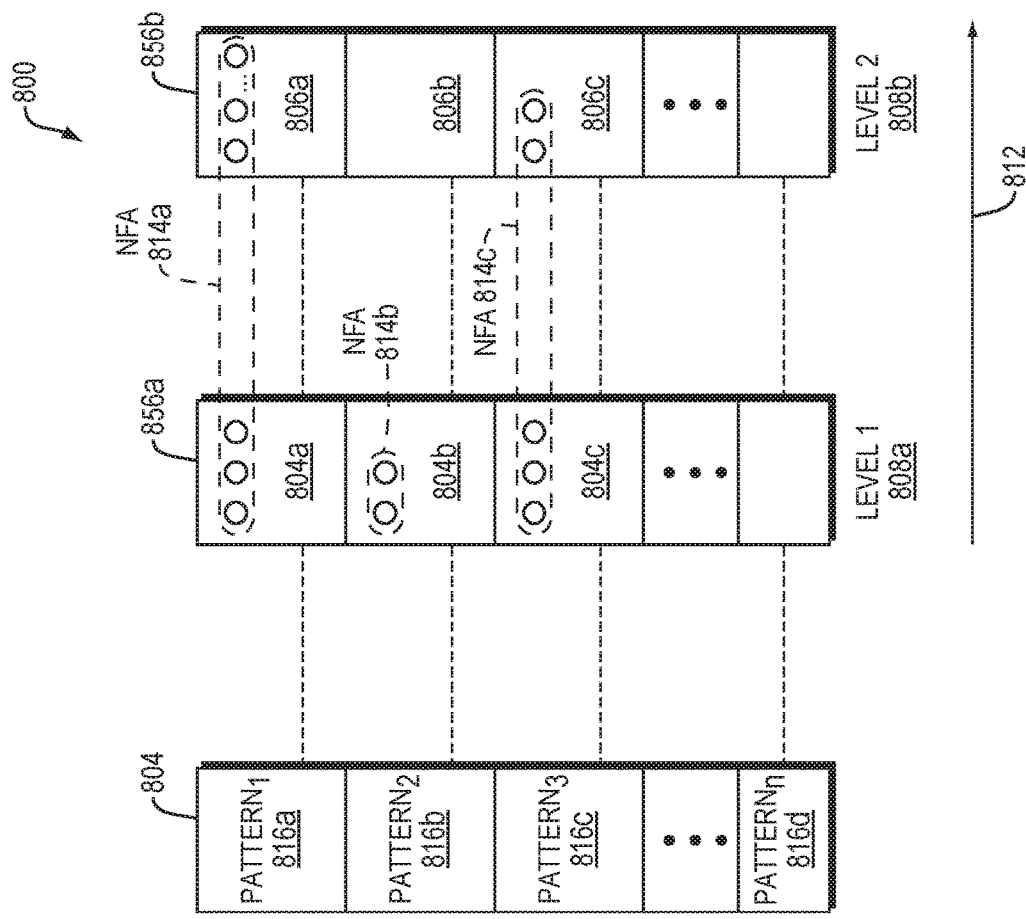
FIG. 8 is a block diagram of an example embodiment of node distributions for multiple per-pattern NFAs.

FIG. 8 is a block diagram 800 of an example embodiment of node distributions for multiple per-pattern NFAs. In the example embodiment, a first per-pattern NFA 814a is generated for a pattern 816a of one or more patterns 804, a second per-pattern NFA 814b is generated for a second pattern 816b of the one or more patterns 804, and a third NFA 814c is generated for a third pattern 816c of the one or more patterns 804.

A first portion of nodes 804a of the first per-pattern NFA 814a is distributed to a hierarchical level 808a that is mapped to a first memory 856a in a memory hierarchy 812 and a second portion of nodes 806a is distributed to a second hierarchical level 808b that is mapped to a second memory 856b. In the example embodiment, the hierarchical level 808a is a highest ranked level and the hierarchical level 808b is a lowest ranked hierarchical level. A third portion of nodes 804b of a second per-pattern NFA 814b is distributed to the hierarchical level 808a that is mapped to the first memory 856a in the memory hierarchy 812 and a fourth portion of nodes 806b is distributed to the second hierarchical level 808b that is mapped to the second memory 856b. A fifth portion of nodes 804c of a third per-pattern NFA 814c is distributed to the hierarchical level 808a that is mapped to the first memory 856a in the memory hierarchy 812 and a sixth portion of nodes 806c is distributed to the second hierarchical level 808b that is mapped to the second memory 856b.

As shown in FIG. 8, the second portion of nodes 804b of the second per-pattern NFA 814b distributed for storing in the first memory 856a mapped to the hierarchical level 808a may be less than the first portion of nodes 804a and the fifth portion of nodes 804c of the first per-pattern NFA 814a and the third per-pattern NFA 814c, respectively. Such may be the case, for example, if a number of nodes of the per-pattern NFA 814b is less than a number of unique target nodes denoted by a per-NFA storage allocation setting (not shown) for the hierarchical level 808a. Further, as the hierarchical level 808b is a the lowest ranked hierarchical level in the memory hierarchy 812, a next per-pattern NFA storage allocation setting (not shown) for the hierarchical level 808b may be very large, enabling all undistributed nodes to be distributed for storing in the first memory 856a that is mapped to the hierarchical level 808b, after distributions have been made to each hierarchical level that is higher than the hierarchical level 808b. As such, in the example embodiment, the second node portion 806a may include more nodes than the sixth portion 806c as the pattern 816a may be a longer rule than the third pattern 816c. Further, the fourth node portion 806b may be null as the second pattern 816b may be relatively short with few nodes generated for the second per-pattern NFA 814b resulting in all nodes of the second per-pattern NFA 814b being distributed to the hierarchical level 808a for storing in the memory 856a.

The compiler 306 may distribute node of each per-pattern NFA as part of generating each per-pattern NFA. As disclosed above, transition in the NFA from a first node to a second node may be specified via first node metadata that identifies the second node via a next node address. According to embodiments disclosed herein, the next node address may be configured by the compiler 306 to include a portion that indicates a given memory of the plurality of memories to which the second node has been distributed for storing.

Figure 9:
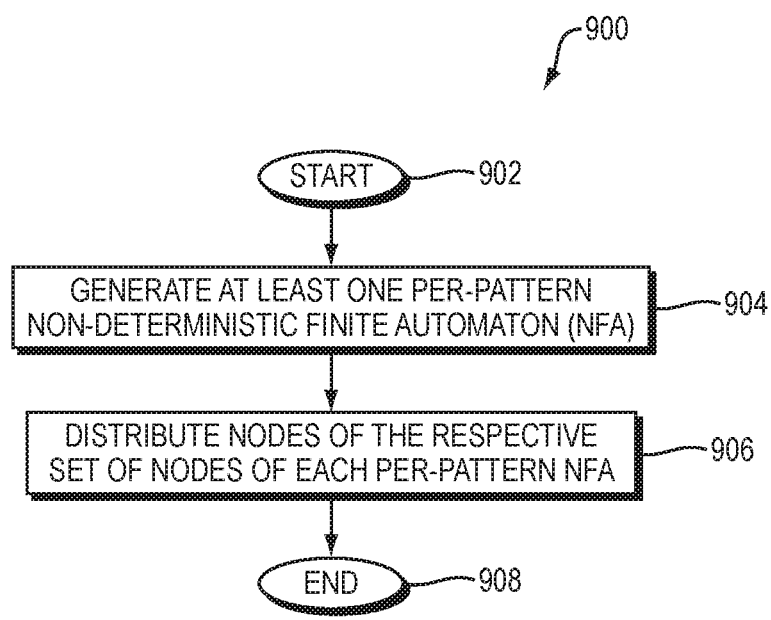
FIG. 9 is a flow diagram of an example embodiment of a method that may be performed in at least one processor operatively coupled to a plurality of memories mapped to hierarchical levels in a memory hierarchy in a security appliance operatively coupled to a network.

FIG. 9 is a flow diagram of an example embodiment of a method 900 that may be performed in at least one processor operatively coupled to a plurality of memories mapped to hierarchical levels in a memory hierarchy in a security appliance operatively coupled to a network. The method may begin (902) and generate at least one per-pattern non-deterministic finite automaton (NFA) (904). Each per-pattern NFA may be generated for a single regular expression pattern and may include a respective set of nodes. The method may distribute nodes of the respective set of nodes of each per-pattern NFA for storing in the plurality of memories based on the hierarchical levels mapped and per-pattern NFA storage allocation settings configured for the hierarchical levels (908) and the method thereafter ends (908) in the example embodiment.

Figure 10:
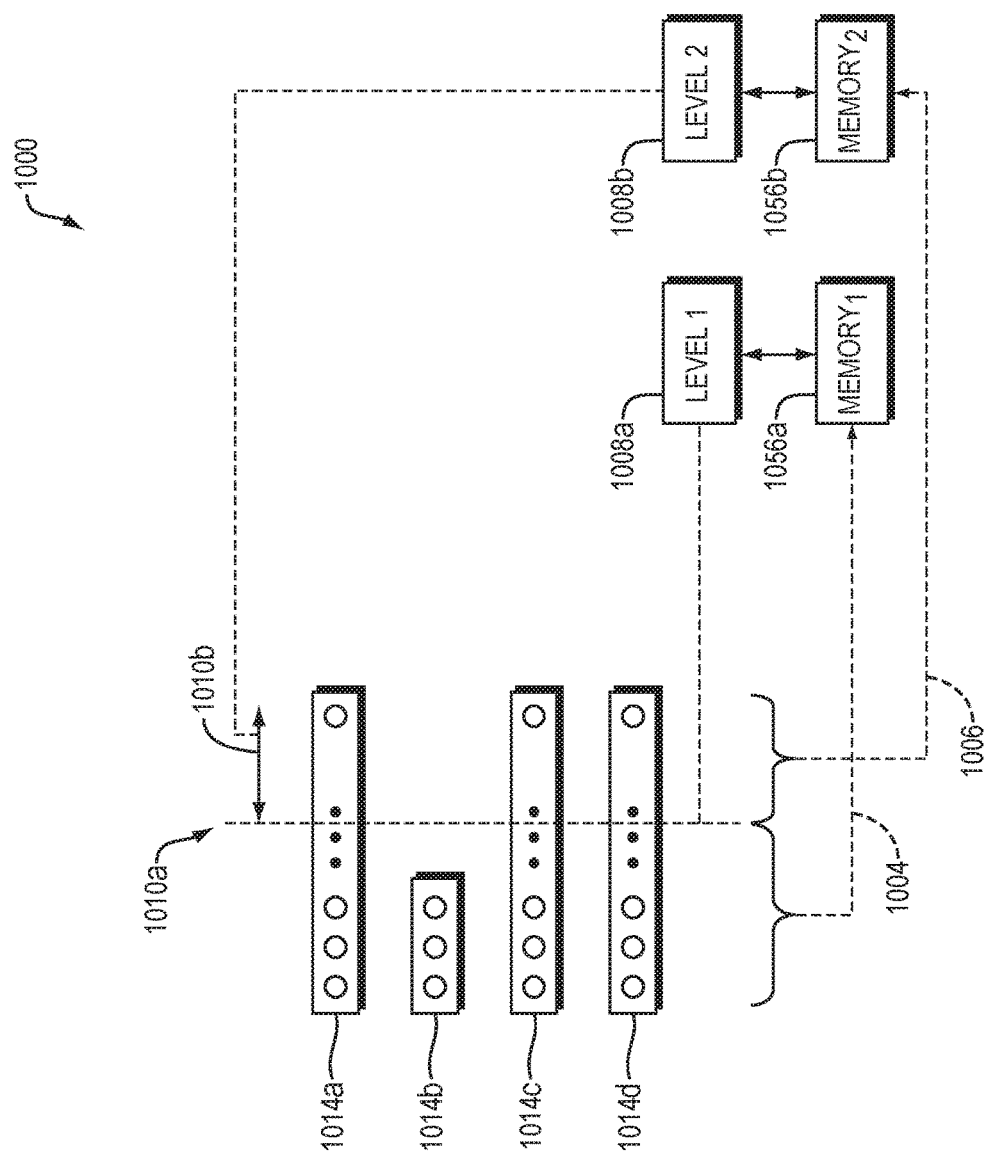
FIG. 10 is a block diagram of an example embodiment of another node distribution for nodes of multiple per-pattern NFAs.

FIG. 10 is a block diagram 1000 of an example embodiment of another node distribution for nodes of multiple per-pattern NFAs. In the example embodiment, node distributions 1004 and 1006 are shown for storing in a first memory 1056a and a second memory 1056b. The distribution 1004 of each per-pattern NFA 1014a-c may be based on per-pattern NFA storage allocation settings 1010a and 1010b that are configured for the hierarchical levels 1008a and 1008b, respectively. The hierarchical levels 1008a and 1008b are mapped to the first memory 1056a and the second memory 1056b, respectively, in the example embodiment.

Figure 11:
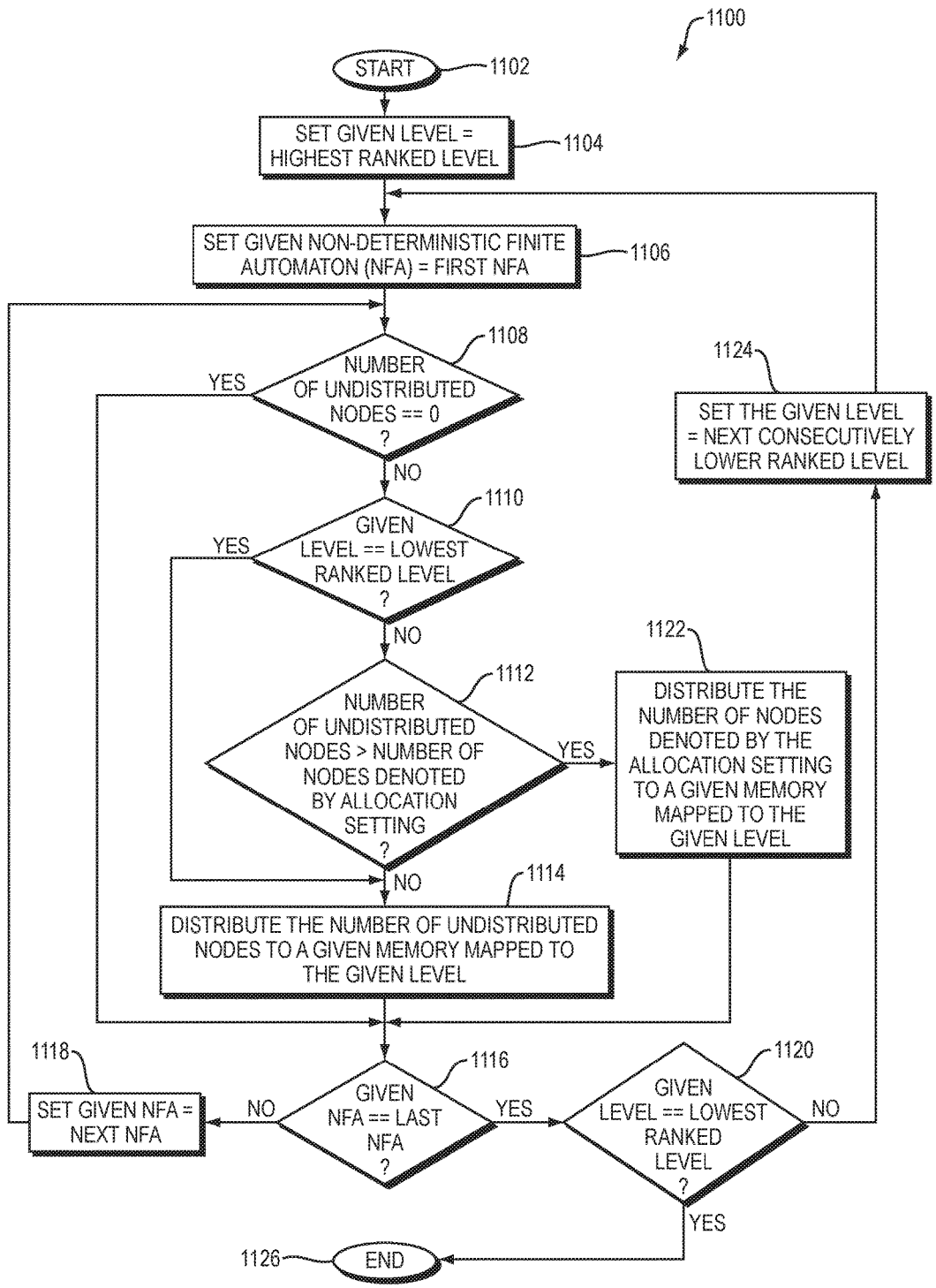
FIG. 11 is a flow diagram of an example embodiment of a method for distributing nodes of at least one per-pattern NFA.

FIG. 11 is a flow diagram 1100 of an example embodiment of a method for distributing nodes of at least one per-pattern NFA. According to embodiments disclosed herein, distributing the nodes of the respective set of nodes of each per-pattern NFA generated may include distributing the nodes of the respective set of nodes in a consecutive manner that includes a first distribution, of the nodes of the respective set of nodes, for storing in a first memory of the plurality of memories. The first memory may be mapped to a highest ranked hierarchical level of the hierarchical levels. Distributing may include at least one second distribution, of the nodes of the respective set of nodes, based on at least one undistributed node remaining in the respective set of nodes after a previous distribution. Each at least one second distribution may be for storing in a given memory of the plurality of memories. The given memory may be mapped to a given hierarchical level of the hierarchical levels, consecutively lower, per distribution, than the highest ranked hierarchical level.

The consecutive manner may include distributing nodes from a plurality of nodes of a given per-pattern NFA of the at least one per-pattern NFA that represent a given number of consecutive elements of a given regular expression pattern for which the given per-pattern NFA was generated. Further, according to embodiments disclosed herein, each at least one second distribution includes at least one next node identified via a next node address included in metadata associated with at least one previous node that was distributed in an immediately preceding second distribution.

The method may begin (1102) and set a given hierarchical level to a highest ranked hierarchical level in a memory hierarchy (1104). The method may set a given per-pattern NFA to a first per-pattern NFA of at least one NFA generated from a set of one or more regular expression patterns (1106). The method may check for a number of undistributed nodes of the given per-pattern NFA (1108). If the number of undistributed nodes of the given per-pattern NFA is null, the method may check if the given per-pattern NFA is a last NFA generated from the set of one of more regular expression patterns (1116).

If the given per-pattern NFA is the last per-pattern NFA generated, the method may check if the given hierarchical level is a lowest ranked hierarchical level (1120) and if the given hierarchical level is the lowest ranked hierarchical level the method thereafter ends (1126) in the example embodiment. However, if the check for whether the given hierarchical level is a lowest ranked hierarchical level (1120) is no, the method may set the given hierarchical level to a next consecutively lower hierarchical level (1124) and again set the given per-pattern NFA to the first per-pattern NFA of at least one NFA generated from the set of one or more regular expression patterns (1106) and proceed to check for a number of undistributed nodes of the given per-pattern NFA (1108). If the number of undistributed nodes of the given per-pattern NFA is null, the method may proceed as disclosed above.

If the check for the number of undistributed nodes of the given per-pattern NFA (1108) is non-zero, the method may check if the given hierarchical level is the lowest ranked hierarchical level (1110). If yes, the method may distribute the number undistributed nodes to a given memory that is mapped to the given hierarchical level (1114) and the method may check if the given per-pattern NFA is a last NFA generated from the set of one of more regular expression patterns (1116). If yes, the method may proceed as disclosed above. If no, the method the method may set the given per-pattern NFA to the next per-pattern NFA generated (1118) and the method may iterate to check again for the number of undistributed nodes of the given per-pattern NFA (1108) which was updated to the next per-pattern NFA generated.

If the check for whether the given hierarchical level is the lowest ranked hierarchical level (1110) is no, the method may check if the number of undistributed nodes of the given per-pattern NFA exceeds a number of nodes denoted by a per-pattern NFA storage allocation setting configured for the given hierarchical level (1112). If yes, the method may distribute the number of nodes denoted by the per-pattern NFA storage allocation setting configured for the given hierarchical level for storing in the given memory that is mapped to the given hierarchical level (1122) and check whether the given per-pattern NFA is a last NFA generated from the set of one or more regular expression patterns (1116). If yes, the method may proceed as disclosed above.

If the check for whether the given per-pattern NFA is the last per-pattern NFA generated (1116) is no, the method may set the given per-pattern NFA to the next per-pattern NFA generated (1118) and the method may iterate to check again for the number of undistributed nodes of the given per-pattern NFA (1108) which was updated to the next per-pattern NFA generated.

If however, the check for whether the number of undistributed nodes of the given per-pattern NFA exceeds a number of nodes denoted by a per-pattern NFA storage allocation setting configured for the given hierarchical level (1112) is no, the method may distribute the number of undistributed nodes to the given memory that is mapped to the given hierarchical level (1114) and proceed as disclosed above.

According to embodiments disclosed herein, the per-pattern NFA storage allocation settings may denote a target number of unique nodes via an absolute value. The absolute value may be a common value for each respective set of nodes enabling each respective set of nodes to have a same value for the target number of unique nodes for storing in the given memory that is mapped to the respective hierarchical level. For example, as shown in FIG. 10, each of the per-pattern NFAs 1014a-c have a first portion 1004 selected that denotes a same number of nodes from each of the per-pattern NFAs 1014a-c to be distributed to the first memory 1056a that is mapped to the hierarchical level 1008a for with the per-pattern storage allocation setting 1010a is configured.

Alternatively, the target number of unique nodes may be denoted via a percentage value for applying to a respective total number of nodes of each respective set of nodes enabling each respective set of nodes to have a separate value for the target number of unique nodes for storing in the given memory that is mapped to the respective hierarchical level. For example, if a number such as 25% were configured for the per-pattern NFA storage allocation setting 1010a configured for the hierarchical level 1008a, then the first portion 1004 would include 25% of the nodes from each of the per-pattern NFAs 1014a-c. Since nodes of each per-pattern NFA 1014a-c may differ, a number of nodes from each of the per-pattern NFAs 1014a-c may differ.

The per-pattern NFA storage allocation settings may include a first per-pattern NFA storage allocation setting and a second per-pattern NFA storage allocation setting. The hierarchical levels may include a highest ranked hierarchical level and a next highest ranked hierarchical level. The first per-pattern NFA storage allocation setting may be configured for the highest ranked hierarchical level. The second per-pattern NFA storage allocation setting may be configured for the next highest ranked hierarchical level. The first per-pattern NFA storage allocation setting may be less than the second per-pattern NFA storage allocation setting. For example, a number of nodes from each per-pattern NFA that are denoted for distribution to a highest performance memory may be less than a number of nodes denoted for a lowest performance memory, such as a system memory, that may have an infinite number denoted.

Embodiments disclosed herein may maximize a number of nodes in a given distribution and the number maximized may be limited by a respective per-pattern NFA storage allocation setting, of the per-pattern NFA storage allocation settings, configured for a given hierarchical level. For example, a number of nodes denoted by a per-pattern NFA storage allocation setting may be ten. As such, each per-pattern NFA that includes ten or more undistributed nodes would have ten nodes distributed. Each per-pattern NFA that includes less than ten undistributed nodes would distribute a respective number of undistributed number of nodes.

As disclosed above, a walker, such as the walker 320 of FIG. 3A, may be configured to walk segments of a payload of an input stream through nodes of a unified DFA, such as the unified DFA 312 of FIG. 3A, and at least one per-pattern NFA, such as the per pattern NFA 314 of FIG. 3A, to try to match a regular expression pattern in the input stream. The unified DFA 312 and the at least one per-pattern NFA 314 may be generated by a compiler, such as the compiler 306 of FIG. 3A, during a compilation stage. Nodes of the unified DFA 312 and the at least one per-pattern NFA 314 may be stored in a plurality of memories in a memory hierarchy, such as the plurality of memories 756a-c in the memory hierarchy 743 of FIG. 7A.

As disclosed above, in reference to FIG. 10 and FIG. 11, a respective set of nodes of each per-pattern NFA generated by the compiler 306 may be distributed and stored amongst one or more memories of the plurality of memories 756a-c based on a node distribution determined by the compiler 306 for each respective set. Each node distribution may be determined by the compiler 306 as a function of hierarchical levels, such as the hierarchical levels 708a-c of FIG. 7A, mapped to the plurality of memories 756a-c, and per-pattern NFA storage allocation settings, such as 710a-c, configured for the hierarchical levels 708a-c, as disclosed above.

As such, the walker 320 may be configured to walk nodes of the respective set of nodes of a per-pattern NFA 314 that may be distributed and stored amongst one or more memories of the plurality of memories 756a-c based on the node distribution determined by the compiler 306 as a function of the hierarchical levels 708a-c mapped to the plurality of memories 756a-c and the per-pattern NFA storage allocation settings 710a-c configured for the hierarchical levels 708a-c. As disclosed above in reference to FIG. 6, the walker 320 may be configured to walk the respective set of nodes of the per-pattern NFA 314 based on a partial match of the respective regular expression pattern in the input stream as determined by the walker 320 during a walk of the unified DFA 312.

Figure 12:
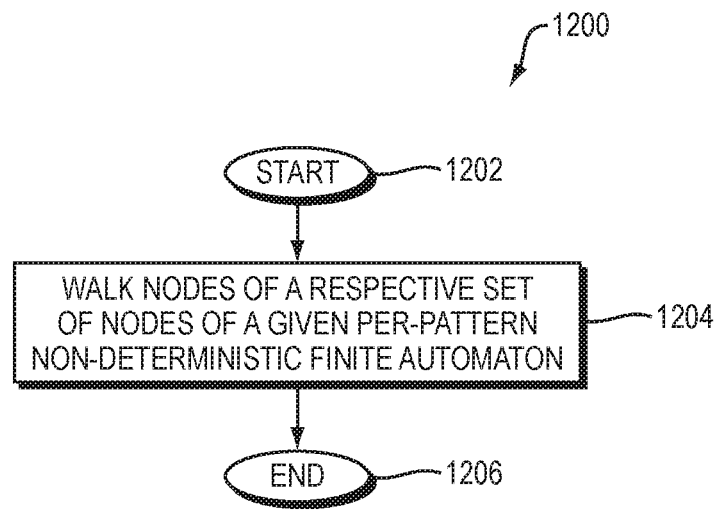
FIG. 12 is a flow diagram of another example embodiment of a method that may be performed in at least one processor operatively coupled to a plurality of memories mapped to hierarchical levels in a memory hierarchy in a security appliance operatively coupled to a network.

FIG. 12 is a flow diagram 1200 of another example embodiment of a method that may be performed in at least one processor operatively coupled to a plurality of memories mapped to hierarchical levels in a memory hierarchy in a security appliance operatively coupled to a network. The method may begin (1202) and walk nodes, of a respective set of nodes of a given per-pattern NFA of at least one per-pattern NFA generated for a respective regular expression pattern, with segments of a payload of an input stream to match the respective regular expression pattern in the input stream. The respective set of nodes may be distributed and stored amongst one or more memories of the plurality of memories based on a node distribution determined as a function of hierarchical levels mapped to the plurality of memories and per-pattern NFA storage allocation settings configured for the hierarchical levels (1204). The method thereafter ends (1206) in the example embodiment.

The walker 320 may be configured to walk from a given node to a next node of the respective set of nodes based on (i) a positive match of a given segment of the payload at the given node and (ii) a next node address associated with the given node. The next node address may be configured to identify the next node and a given memory of the plurality of memories, such as the plurality of memories 756a-c of FIG. 7A, in which the next node is stored. For example, turning to the example embodiment of FIG. 5A, the walker 320 may walk the node N4 514 based on a positive match of the segment 522c at the node N2 510, as the node N2 510 may be configured to match a given segment at a given offset in a payload to the character element 'a.' Metadata (not shown) associated the node N2 510, may identify the next node, such as the node N4 514, to traverse (i.e., walk) based on the positive match of the given segment at the given offset to the character element 'a.'

For example, the metadata associated with the node N2 510 may include a next node address that is an address of the node N4 514 or a pointer or index or any other suitable identifier that identifies the next node N4 514 to traverse based on the positive match at the node N2 510. The metadata associated with the node N2 510 may further identify a given memory of the plurality of memories in which the next node N4 514 is stored. The given memory may be identified in any suitable manner, such as by configuration of particular bits stored in conjunction with and as part of the next node address (not shown) of the next node N4 514. As such, the walker 320 may be configured to fetch the next node N4 514 from the given memory identified via the next node address associated with the given node N2 510 in order to walk the next node N4 514 with a next segment at a next offset, such as the next segment 522d at the next offset 520d of FIG. 5A.

The next node N4 514 may be cached in a node cache. Turning back to FIG. 4A, the example embodiment the HPU 425 includes a node cache 451 that may be operatively coupled to the HNA processing core 408. The node cache 451 may be sized to store at least a threshold number of nodes. As such, the HNA processing core 408 may cache one or more nodes, up to the threshold number of nodes, in the node cache 451. As disclosed above, the HNA processing core 408 may be configured to implement the walker 320 aspects with regard to NFA processing. As such, the walker 320 may retrieve the next node N4 514 from the node cache 451 or the given memory of the plurality of memories 756a-c based on whether or not a fetch (i.e., read access) of the next node N4 514 results in a cache miss. According to embodiments disclosed herein, entries of the node cache 451 may be replaced based on a round-robin or least recently used (LRU) replacement policy. The walker 320 may be configured to maintain an index of one or more entries of the node cache 451 for use in implementing the round-robin or LRU replacement policies.

If a fetch of the node N4 514 results in a cache miss, the HNA processing core 408 may fetch the node N4 514 from the given memory that has the node N4 514 statically stored and also cache the node N4 514 in the node cache 451. Based on a hierarchical node transaction size associated with a hierarchical level of the given memory, the HNA processing core 408 may cache additional nodes from the given memory. The node N4 514 and any additional nodes cached may be arranged in a consecutive manner in a respective per-pattern NFA. For example, based on the hierarchical node transaction size associated with the hierarchical level of the given memory, the HNA processing core 408 may cache the node N5 515 that is arranged in a consecutive manner with the node N4 514 in the per-pattern NFA 504.

According to embodiments disclosed herein, a respective hierarchical node transaction size (not shown) may be associated with each of the hierarchical levels 708a-c. Each respective hierarchical node transaction size may denote a maximum number of nodes to fetch from the given memory mapped to the respective hierarchical level for a read access of the given memory. For example, a hierarchical node transaction size associated with a highest ranked hierarchical level may have a maximum number of nodes that is one or two nodes. According to embodiments disclosed herein, the highest ranked hierarchical level of the hierarchical levels may be associated with a smallest hierarchical node transaction size of hierarchical node transaction sizes associated with the hierarchical levels.

The hierarchical node transaction size may be denoted in any suitable manner, such as by specifying a maximum number of nodes directly, or by specifying a number of bits that may be a multiple of a size of the maximum number of nodes denoted. According to embodiments disclosed herein, the node cache 451 may be organized as multiple lines. Each line may be sized based on a node bit size and may include additional bits for the use by the HNA processing core 408. Each line may be a minimum quantum (i.e., granularity) of a transaction from each of the plurality of memories.

According to embodiments disclosed herein, a highest ranked memory may be a memory that is co-located on-chip with the HNA processing core 408. The highest ranked memory may be a highest performance memory relative to other memories of the plurality of memories. The highest performance memory may have the fastest read and write access times. A transaction size, for example, a size of the quantum of data read from the highest performance memory may be one or two lines, the one or two lines may include one or two nodes, respectively.

In contrast, a lowest ranked hierarchical level may be mapped to a lowest performance memory of the plurality of memories. The lowest performance memory may be a slowest performance memory having relatively longer read and write access times in comparison with other memories of the plurality of memories. For example, the slowest performance memory may be a largest memory such as an external memory that is not located on a chip with the HNA processing core 408. As such, a number of read accesses to such a memory may be advantageously reduced by having a larger transaction size, such as four lines, per read access.

According to embodiments disclosed herein, the hierarchical node transaction size associated with the lowest ranked hierarchical level may be configured such that one or more lines from the node cache 451 are evicted and replaced by one or more lines fetched from the respective memory that is mapped to the lowest ranked hierarchical level. The one or more lines may be determined based on the one or more lines storing the threshold number of nodes. As such, the respective hierarchical node transaction size may enable the HNA processing core 408 to cache the threshold number of nodes from the given memory if the respective hierarchical level is a lowest ranked hierarchical level of the hierarchical levels. As such, the HNA processing core 408 may be configured to evict the threshold number of nodes cached in the node cache 451 if the respective hierarchical level is a lowest ranked hierarchical level of the hierarchical levels.

According to embodiments disclosed herein, the node cache 451 may be configured to cache a threshold number of nodes. The threshold number of nodes may be a largest number of nodes that may be read based on a largest transaction size over all transactions sizes associated with the plurality of memories. For example, the largest transaction size over all transaction sizes of the plurality of memories may be a given transaction size that is associated with a lowest ranked hierarchical level that may be mapped, for example, to an external memory that is not co-located on a chip with the HNA processing core 408.

Caching the one or more nodes in the node cache 451 may be based on a cache miss of a given node of the one or more nodes read from a given memory of the plurality of memories and a respective hierarchical node transaction size associated with a respective hierarchical level of the hierarchical levels that is mapped to the given memory. The hierarchical node transaction size associated with the respective hierarchical level may denote a maximum number of nodes to fetch from the given memory mapped to the respective hierarchical level for a read access of the given memory.

The HNA processing core 408 may be configured to employ the LRU or round-robin replacement policy to evict one or more cached nodes from the node cache 451. According to embodiments disclosed herein, if the respective hierarchical level mapped to the given memory is higher than a lowest ranked hierarchical level of the hierarchical levels, a total number of the one or more cached nodes evicted may be determined based on the hierarchical level. For example, if the hierarchical level is associated with a hierarchical node transaction size of one, the total number of cached nodes evicted by the node cache may be one, and the entry evicted may be determined based on the LRU or round-robin replacement policy. The total number of one is for illustrative purpose and it should be understood that any suitable hierarchical node transaction sizes may be used.

Figure 13A:
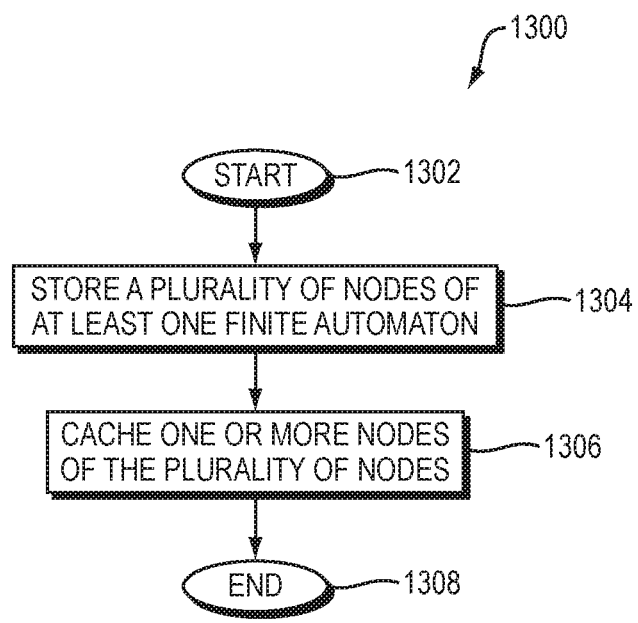
FIG. 13A is a flow diagram 1300 of an example embodiment of a method that may be performed in at least one processor operatively coupled to a plurality of memories in a memory hierarchy and a node cache in a security appliance operatively coupled to a network.

FIG. 13A is a flow diagram 1300 of an example embodiment of a method that may be performed in at least one processor operatively coupled to a plurality of memories in a memory hierarchy and a node cache in a security appliance operatively coupled to a network. The method may begin (1302) and store a plurality of nodes of at least one finite automaton in the plurality of memories (1304). The method may cache one or more nodes, of the plurality of nodes, stored in a given memory of the plurality of memories at a hierarchical level in the memory hierarchy, in the node cache based on a cache miss of a given node of the one or more nodes and a hierarchical node transaction size associated with the hierarchical level (1306). The method thereafter ends (1308) in the example embodiment.

FIG. 13B is a block diagram 1341 of an example embodiment of a payload 1342 and segments 1316 with respective offsets 1318 in the payload 1342. In an example embodiment, nodes of the per-pattern NFA graph 504 of FIG. 5A may be walked with segments of the payload 1342 of FIG. 13B. For example, the walker 320 may try to match segments 1316 of the payload 1342 at nodes of the per-pattern NFA graph 504 to try to match the payload 1342 to the regular expression pattern 502 of FIG. 5A.

A plurality of nodes of the per-pattern NFA 504 may be stored in a plurality of memories, such as the memories 756a-c of FIG. 7A. One or more nodes of the plurality of nodes, such as the nodes N0 506, N1 508, N2 510, and N3 512 of the per-pattern NFA 504 may be stored in a given memory, such as the highest performance memory 756a of FIG. 7A, that is at a hierarchical level, such as the highest ranked hierarchical level 708a, in a memory hierarchy, such as the memory hierarchy 743. As disclosed below in reference to FIG. 13C and FIG. 13D, the nodes N0 506, N1 508, N2 510, and N3 512 may be cached in a node cache, such as the node cache 451 or FIG. 4A, based on a cache miss of a given node, such as the node N0 506, and a hierarchical node transaction size 723a associated with the hierarchical level 708a.

As illustrated in FIG. 13B, the payload 1342 includes the segments 1322a-n (i.e., h, y, x, etc.), with respective offsets 1320a-n (i.e., 0, 1, 2, etc.). The walker 320 may walk the segments 1322a-n of the payload 1342 one segment at a time through the NFA graph 504 to match the regular expression pattern 502 to the input stream. A given segment of the segments 1322a-n for walking a given node may be determined based on its respective offset of the offsets 1320a-n being a current offset within the payload 1342. The walker 320 may update the current offset by incrementing or decrement the current offset, as disclosed above in reference to FIG. 5A. The walker 320 may be configured to select the upper epsilon path 530a based on traversing the split node N1 508, as the upper epsilon path 530a represents a lazy path.

FIG. 13C is a table 1338a of an example embodiment of processing cycles for walking the per-pattern NFA graph 504 of FIG. 5A with the payload of FIG. 13B by selecting the lazy path at the split node N1 508.

FIG. 13D is a table 1338b that is a continuation of the table 1338a of FIG. 13C. As shown in the tables 1338a and 1338b, the processing cycles 1340a-mm may include walking a current node 1330 with a segment at a current offset 1332 to determine a match result 1334 and walker action 1336 based on the match result 1334. In the example embodiment, the walker 320 may walk the starting node N0 506 with the segment 1322a (i.e., "h") at the current offset 1320a for the processing cycle 1340a. As disclosed above in reference to FIG. 6, the starting node N0 506 and the current offset 1320a may be specified based on match results from the DFA processing performed by the HFA processor 110.

The NFA processing by the HNA processing core 408 results in determination by the walker 320 that the match result 1334 is a positive match result as the segment 1322a matches the character "h" at the node N0 506 of the per-pattern NFA 504. As specified by the compiler 306 via metadata (not shown) associated with the starting node N0 506, the walker 320 may walk in a forward direction and fetch the next node indicated by the metadata associated with the node N0 506 and may increment the current offset from 1320a (i.e., "0") to 1320b (i.e., "1"). The next node indicated by the node N0 506 is the split node N1 508 in the example embodiment. As such, the walker 320 takes the action 1336 for the processing cycle 1340a that includes updating the current offset to "1" in the payload 1342 and transitioning to the split node N1 508. Transitioning may include fetching (also referred to herein as loading) the split node N1 508.

As the split node N1 508 presents multiple transition path options, such as the epsilon paths 530a and 530b, the action 1336 for the processing cycle 1340b may include selecting the upper epsilon path 530a and fetching the node N2 510 independent of the payload 1342 and without consuming (i.e., processing) from the payload 1342. Since no matching function is performed by the split node N1 508, the current offset/segment 1332 are unchanged, and, thus, payload is not consumed (i.e., processed) for the processing cycle 1340b.

Since the split node N1 508 presents multiple path options, the action 1336 may include storing unexplored context, such as by storing an indirect or direct identifier of the node N3 512 and the current offset 1320b (i.e., "1"). Storing the unexplored context may enable the walker 320 to remember to return to the node N3 512 to walk the node N3 512 with the segment "1" at the offset 1320b in the payload 1342 in an event a negative match result occurs along the selected partially matching path, for example, if the negative match result is determined at the node N2 510 or nodes along a path extending from the node N2 510.

In the example embodiment, the selection of the epsilon transition path 530a may result in detecting a match failure at the node N2 510 or at a subsequent node, such as N4 514, of the current thread. For example, based on selecting the upper path (i.e., the epsilon transition path 530a) the walker 320 may fetch the node N2 510 and try to match the segment 1322b (i.e., "y") at the current offset 1320b (i.e., "1") to the element "a" of the node N2 510 in the processing cycle 1340c. Since "y" does not match element "a" at the node N2 510, the action 1336 for the processing cycle 1340c may include popping an entry from the run stack 460 of FIG. 4A.

The entry popped may be a most recently pushed entry, such as a stored entry pushed in the processing cycle 1340b, indicating the node N3 512 and offset 1320b (i.e., "1") in the example embodiment. As such, if a match failure is detected, the stored thread for the epsilon transition path 530b may then be traversed, as is the case shown for processing cycles 1340d, 1340g, 1340j, 1340m, 1340p, 1340s, 1340w, 1340z, 1340cc, 1340ff, and 1340ii. Storing the untraversed transition path may include pushing an entry on a stack, such as the run stack 460 of FIG. 4A, by storing an entry including an identifier of the next node in association with an indication of the current offset.

The walker 320 may transition and walk the node N3 512 with the segment "y" located at the offset 1320b in the payload 1342 for the processing cycle 1340d. As such, the processing cycle 1340d shows the match result 1334 is positive for the processing cycle 1340d as the element associated with the node N3 512 indicates a positive match for a segment that is not a newline character. The action 1336 for the processing cycle 1340d may include updating the current offset to the offset 1320c and transitioning back to the split node N1 508 that may be a next node indicated by the node N3 512.

Since all arcs transitioning from the split node N1 508 are epsilon transitions, the walker 320 may again select a path of the multiple path options and does not consume (i.e., process) a segment from the payload 1342 as the current offset is not updated for the processing cycle 1340e. In the example embodiment, the walker 320 again selects the epsilon transition path 530a. As such, the walker 320 again stores a thread by pushing node N3 512 and the current offset, now 1320c (i.e., "2"), on the run stack 460. As shown for processing cycle 1340f, the walker 320 fetches node N2 510 and tries to match the segment 1322c (i.e., "x") at offset 1320c (i.e., "2") to the element "a" of the node N2 510.

Since "x" does not match at the node N2 510, the walker 320 may again pop an entry from the run stack 460. The entry popped may be a most recently pushed entry, such as a stored entry pushed in the processing cycle 1340e, indicating the node N3 512 and offset 1320c (i.e., "2") in the example embodiment. As such, the walker 320 may transition and again walk the node N3 512 in the processing cycle 1340f with the segment "x" located at the offset 1320c in the payload 1342. As such, the processing cycle 1340g shows the match result 1334 is positive, as "x" is not a newline character, and the action 1336 for the processing cycle 1340g may include updating the current offset to the offset 1320d (i.e., "3") and transitioning back to the split node N1 508 that may be a next node indicated by metadata associated with the node N3 512.

The walker 320 may continue to walk segments of the payload 1342 through the per-pattern NFA 504 as indicated by the subsequent processing cycles 1340i-mm shown in the tables 1338a and 1338b of FIG. 13C and FIG. 13D, respectively, until reaching the marked node N5 515. As shown for the processing cycle 1340mm of table 1338b, the walker 320 traverses the marked node N5 515 that may be associated with metadata that indicates a final (i.e., complete or entire) match for the regular expression pattern 502 in the input stream.

In the example embodiment, walking segments of the payload 1342 through the per-pattern NFA graph 504 may include identifying a mismatch at the node N3 512, selecting the lazy path at the split node N1 508 by selecting the upper epsilon path 530a, and traversing the node N2 510. Based on a mismatch at the node N2 520, the node N3 512 may again be traversed and so forth, until a match at the node N2 520 is determined. For example, traversing of the nodes N1 508, N2 510, and N3 512 occurs with both temporal and spatial locality as shown as for the processing cycles 1340b-d, 1340e-g, 1340h-j, 1340k-m, 1340n-p, and 1340q-s, until a positive match at the node N2 510 is determined for the processing cycle 1340u, and as shown for the processing cycles 1340x-z, 1340aa-cc, 1340dd-ff, and 1340gg-ii, until a positive match at the node N2 510 is determined for the processing cycle 1340kk. Thus, a majority of the processing cycles of the tables 1338a and 1338b show that the walker 320 may be traversing the nodes N1 508, N2 510, and N3 512, with both temporal and spatial locality.

According to embodiments disclosed herein, employing a node cache, such as the node cache 451 of FIG. 4A, for walking segments of an input stream through a finite automaton, enables another optimization for performance of the walk. For example, as disclosed above in reference to FIG. 7A, match performance of the walker 320 may be optimized based on storing consecutive nodes, such as the nodes N0 506, N1 508, N2 510, and N3 512, of the section 509 of the per-pattern NFA 504 of FIG. 5A, in a faster performance memory that may at a higher ranked hierarchical level relative to another memory that may store the consecutive nodes N4 514 and N5 515.

As disclosed above, earlier nodes, such as the nodes N0 506, N1 508, N2 510, and N3 512 included in the section 509 of the per-pattern NFA 504 of FIG. 5A, may be stored in a highest performance memory that may be at a highest ranked hierarchical level. For example, the nodes N0 506, N1 508, N2 510, and N3 512, included in the section 509 may be stored in the memory 756a of FIG. 7A that may be at a highest ranked hierarchical level, such as the hierarchical level 708a in the memory hierarchy 743. According to embodiments disclosed herein, the nodes N0 506, N1 508, N2 510, and N3 512, included in the section 509 may be stored in the memory756a based on the per-pattern NFA storage allocation setting 710a that may be configured for the hierarchical level 708a.

In the example embodiment, a hierarchical node transaction size associated with the highest ranked hierarchical level 708a, such as the hierarchical node transaction size 723a of FIG. 7B, may denote four nodes in the example embodiment. For example, the hierarchical node transaction size 723a may include reading one or more lines from the memory 756a, for example, data stored at one or more addresses of the memory 756a may be read based on a read access, and four nodes may be read (i.e., retrieved, loaded, or fetched) from the memory 756a. As such, the hierarchical node transaction size 723a "denotes" that four nodes are read from the memory 756a at the highest ranked hierarchical level 708a as four nodes may be read based on a single read access that causes four nodes to be read. For example, based on a number of nodes stored per-line (i.e., per-address) in a given memory and a number of lines (i.e., addresses) read from the given memory at a given hierarchical level, a number of nodes read per transaction (i.e., read access) may be determined. In the example embodiment of FIG. 7B, the memory 756b may be associated with a hierarchical node transaction size 723b and the memory 756c may be associated a hierarchical node transaction size 723c.

In the example embodiment, traversing the node N0 506 for the processing cycle 1340a would cause a cache miss, as the node N0 506 has not been cached in the node cache 451. As a result, since the hierarchical node transaction size 723a denotes four nodes in the example embodiment, four nodes, such as the nodes N0 506, N1 508, N2 510, and N3 512 are brought from the memory 756a into the node cache 451.

As a result, the walker 320 may access the nodes N1 508, N2 510, and N3 512 from the node cache 451 until the processing cycle 1340v in which the walker traverses the node N4 514 with the segment 1322g (i.e., "q") at the offset 1320g (i.e., "8") in the payload 1342 based on the positive match at the node N2 510 determined for the processing cycle 1340u. As such, the node cache 451 may be advantageously employed to enable further optimization of the walk performance by caching nodes, such as the nodes N1 508, N2 510, and N3 512 in the example embodiment, of a per-pattern NFA that have a temporal and spatial locality relationship within the per-pattern NFA. Such a temporal and spatial locality relationship of nodes within the per-pattern NFA would not be present for an NFA that is generated from multiple patterns. The optimization enabled by the node cache 451 is provided because embodiments disclosed herein may be based on generating NFAs that are per-pattern NFAs.

As such, in addition to the pre-screening of packets by the HFA processor 110 that may reduce a number of false positives for NFA processing by the HNA processing core 408, embodiments disclosed herein may further optimize match performance by caching nodes during a walk of nodes of per-pattern NFAs that have nodes distributed to memories in a memory hierarchy based on node locality within a respective per-pattern NFA. As disclosed above, embodiments disclosed herein may advantageously distribute nodes of each per-pattern NFA to memories in a memory hierarchy based on an understanding that the longer the rule (i.e., pattern) the less likely it is that nodes generated from portions at the end of the rule (i.e., pattern) are to be accessed (i.e., walked or traversed). Further, according to embodiments disclosed herein, a node cache may be advantageously sized based on a maximum transaction size granularity of a plurality of memories to further optimize match performance by reducing a number of accesses to slower performing memories. In addition, embodiments disclosed herein with regard to a hierarchical node transaction size further optimize match performance by enabling efficient use of a limited number of entries in a node cache, by enabling a total number of cache node entries to be determined based on a given transaction (i.e., read access) size associated with a hierarchical level.

Figure 14:
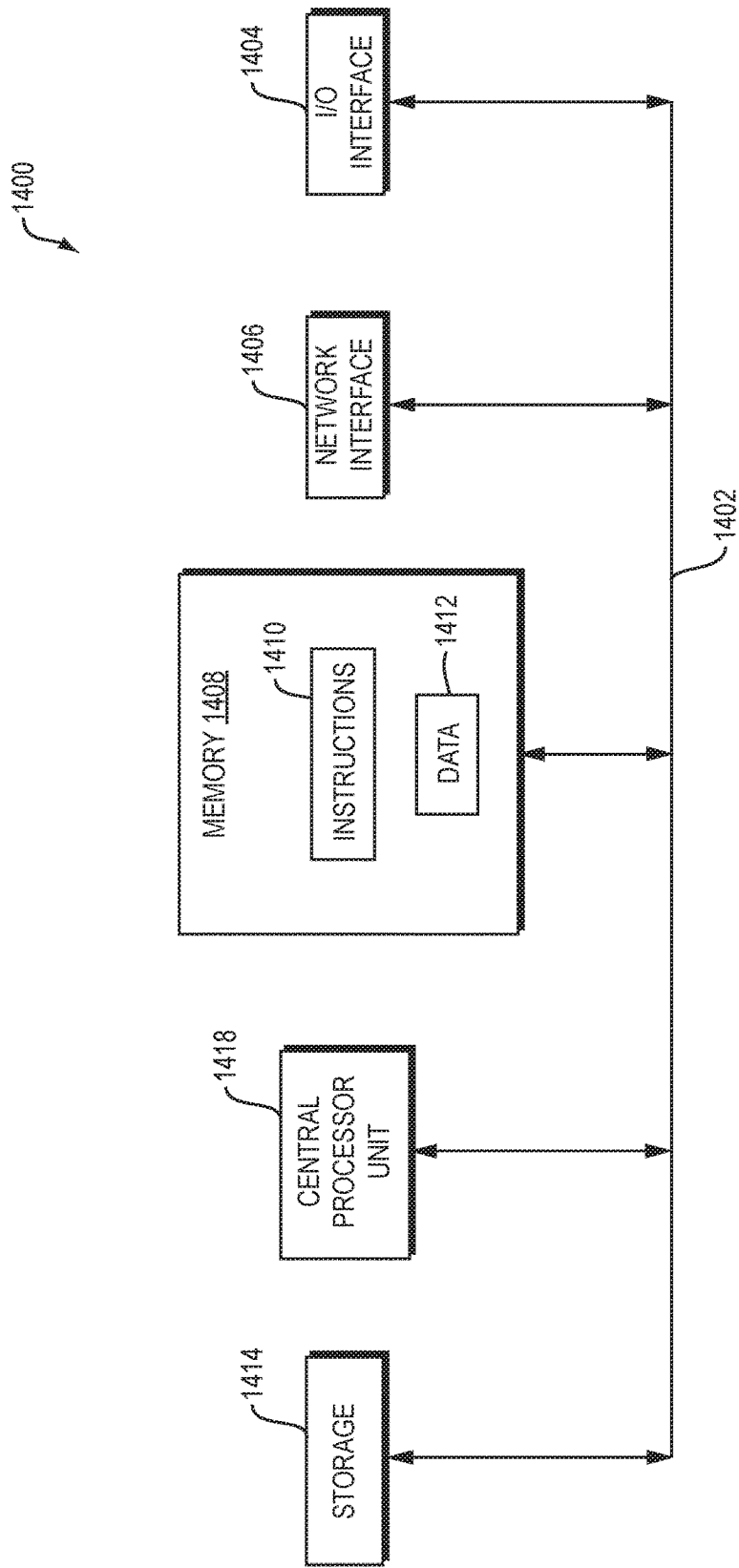
FIG. 14 is a block diagram of an example internal structure of a computer optionally within an embodiment disclosed herein.

FIG. 14 is a block diagram of an example of the internal structure of a computer 1400 in which various embodiments of disclosed herein may be implemented. The computer 1400 contains a system bus 1402, where a bus is a set of hardware lines used for data transfer among the components of a computer or processing system. The system bus 1402 is essentially a shared conduit that connects different elements of a computer system (e.g., processor, disk storage, memory, input/output ports, network ports, etc.) that enables the transfer of information between the elements. Operative with the system bus 1402 is an I/O device interface 1404 for connecting various input and output devices (e.g., keyboard, mouse, displays, printers, speakers, etc.) to the computer 1400. A network interface 1406 allows the computer 1400 to connect to various other devices attached to a network. Memory 1408 provides volatile storage for computer software instructions 1410 and data 1412 that may be used to implement embodiments disclosed herein. Disk storage 1414 provides non-volatile storage for computer software instructions 1410 and data 1412 that may be used to implement embodiments disclosed herein. A central processor unit 1418 is also operative with the system bus 1402 and provides for the execution of computer instructions.

Further example embodiments of disclosed herein may be configured using a computer program product; for example, controls may be programmed in software for implementing example embodiments disclosed herein. Further example embodiments of the disclosed herein may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

It should be understood that the term "herein" is transferable to an application or patent incorporating the teachings presented herein such that the subject matter, definitions, or data carries forward into the application or patent making the incorporation.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus comprising:
   at least one hyper non-deterministic automata (HNA) processor specialized for non-deterministic finite automata (NFA) processing, the at least one HNA processor including:
   a plurality of clusters, each cluster of the plurality of clusters including a plurality of HNA processing units (HPUs);
   an HNA on-chip instruction queue configured to store at least one HNA instruction; and
   an HNA scheduler, the HNA scheduler configured to select a given HPU of the plurality of HPUs of the plurality of clusters and assign the at least one HNA instruction to the given HPU selected in order to initiate matching at least one regular expression pattern in an input stream received from a network.

2. The apparatus of claim 1, wherein the apparatus further comprises a plurality of super-clusters, each super-cluster including a corresponding plurality of clusters of the plurality of clusters and a super-cluster graph memory exclusive to a corresponding super-cluster, the super-cluster graph memory accessible to a corresponding plurality of HPUs of the corresponding plurality of clusters of the corresponding super-cluster and configured to store a subset of nodes of at least one per-pattern NFA statically, the subset of nodes determined by a compiler of the at least one per-pattern NFA.

3. The apparatus of claim 2, wherein:
   each super-cluster further includes at least one super-cluster character class memory exclusive to a corresponding super-cluster, each at least one super-cluster character class memory configured to store regular expression pattern character class definitions statically.

4. The apparatus of claim 3, wherein the super-cluster graph memory and the at least one super-cluster character class memory are unified.

5. The apparatus of claim 3, wherein the at least one super-cluster character class memory is shared by a corresponding plurality of HPUs of the corresponding plurality of clusters of the corresponding super-cluster.

6. The apparatus of claim 1, wherein:
   the apparatus further comprises a plurality of super-clusters, each super-cluster including a corresponding plurality of clusters of the plurality of clusters; and
   each super-cluster further includes at least one super-cluster character class memory, each at least one super-cluster character class memory exclusive to a given cluster of the corresponding plurality of clusters of a corresponding super-cluster and shared by a corresponding plurality of HPUs of the given cluster, each at least one super-cluster character class memory configured to store regular expression pattern character class definitions statically.

7. The apparatus of claim 1, wherein the apparatus further comprises:
   a plurality of super-clusters, each super-cluster including a corresponding plurality of clusters of the plurality of clusters; and
   at least one Central Processing Unit (CPU) core operatively coupled to the at least one HNA processor, the at least one HNA processor configured to offload pattern matching operations from the at least one CPU core, the at least one CPU core configured to select at least one super-cluster of the plurality of super-clusters by restricting super-cluster selection based on a graph identifier associated with the at least one HNA instruction.

8. The apparatus of claim 7, wherein the graph identifier is associated with a given per-pattern NFA of a plurality of per-pattern NFAs and restricting the super-cluster selection includes a determination that at least one node of the given per-pattern NFA is stored in a super-cluster graph memory exclusive to the at least one super-cluster selected.

9. The apparatus of claim 7, wherein:
   the graph identifier is associated with a given per-pattern NFA of a plurality of per-pattern NFAs;
   the HNA scheduler is configured to select the given HPU from a restricted set of HPUs that includes each corresponding plurality of HPUs of each corresponding plurality of clusters of the at least one super-cluster selected; and
   the at least one CPU core is further configured to select the at least one super-cluster of the plurality of super-clusters based on a determination that at least one node of the given per-pattern NFA associated with the graph identifier is stored in a super-cluster graph memory exclusive to the at least one super-cluster selected.

10. The apparatus of claim 9, wherein the HNA scheduler is further configured to select the given HPU from the restricted set of HPUs based on a round robin schedule for HPUs in the restricted set of HPUs.

11. The apparatus of claim 9, wherein the HNA scheduler is further configured to select the given HPU from the restricted set of HPUs based on instantaneous loading of each HPU in the restricted set of HPUs.

12. The apparatus of claim 1, wherein the apparatus further comprises a plurality of super-clusters, each super-cluster including a corresponding plurality of clusters of the plurality of clusters, and wherein:

each super-cluster further includes a super-cluster graph memory exclusive to a corresponding super-cluster; and each super-cluster graph memory is configured to store at least one node of at least one per-pattern NFA of a plurality of per-pattern NFAs to replicate the at least one node in each super-cluster graph memory of each super-cluster of the at least one HNA processor.

13. The apparatus of claim 12, wherein:
the apparatus further comprises at least one CPU core operatively coupled to the at least one HNA processor and the at least one HNA is configured to offload pattern matching operations from the at least one CPU core;
the at least one CPU core is further configured to provide the HNA scheduler with an option to select the at least one super-cluster based on a determination that a given per-pattern NFA of the at least one per-pattern NFA associated with the at least one HNA instruction is replicated; and
the HNA scheduler is further configured to:
select the at least one super-cluster based on the option provided and (i) a first round robin schedule for the plurality of super-clusters, (ii) a first instantaneous loading of the plurality of super-clusters or (iii) a combination of (i) and (ii); and
select the given HPU from the plurality of HPUs of the plurality of clusters of the at least one super-cluster selected based on a second round robin schedule for the plurality of HPUs of the plurality of clusters of at least one super-cluster selected, a second instantaneous loading of the plurality of HPUs of the plurality of clusters of the at least one super-cluster selected, or a combination thereof.

14. The apparatus of claim 1, wherein the at least one HNA processor further includes an HNA on-chip graph memory accessible to the plurality of HPUs of the plurality of clusters, the HNA on-chip graph memory configured to store a subset of nodes of at least one per-pattern NFA statically, the subset of nodes determined by a compiler of the at least one per-pattern NFA.

15. The apparatus of claim 1, wherein the at least one HNA instruction is a first at least one HNA instruction and the apparatus further comprises:
at least one CPU core operatively coupled to the at least one HNA processor;
at least one system memory operatively coupled to the at least one CPU core and the at least one HNA processor, the at least one system memory configured to include:
an HNA off-chip instruction queue for storing a second at least one HNA instruction, the second at least one HNA instruction pending transfer to the HNA on-chip instruction queue of the HNA processor; and
an HNA off-chip graph memory configured to store a subset of nodes of at least one per-pattern NFA statically, the subset of nodes determined by a compiler of the at least one per-pattern NFA.

16. The apparatus of claim 15, further comprising:
at least one Local Memory Controller (LMC), wherein the at least one LMC is operatively coupled to the at least one HNA processor and the at least one system memory and a given LMC of the at least one LMC is configured to enable non-coherent access of the at least one system memory for access of the HNA off-chip graph memory by the at least one HNA processor.

17. The apparatus of claim 15, wherein the at least one system memory is further configured to include an HNA packet data memory configured to store multiple payloads contiguously, each of the multiple payloads having a fixed and maximum length and associated with a given HNA instruction of the first at least one HNA instruction stored in the HNA on-chip instruction queue or the second at least one HNA instruction pending transfer to the HNA on-chip instruction queue.

18. The apparatus of claim 17, further comprising at least one LMC and wherein the at least one system memory is further configured to include:
an HNA input stack partition configured to store at least one HNA input stack, each at least one HNA input stack configured to store at least one HNA input job for at least one HPU of the plurality of HPUs of the plurality of clusters;
an HNA off-chip run stack partition configured to store at least one HNA off-chip run stack to extend storage of at least one on-chip run stack, each at least one on-chip run stack configured to store at least one run-time HNA job for the at least one HPU;
an HNA off-chip save buffer partition configured to extend storage of at least one on-chip save buffer, each at least one on-chip save buffer configured to store the at least one run-time HNA job for the at least one HPU based on detecting a payload boundary; and
an HNA off-chip result buffer partition configured to store at least one final match result entry of the at least one regular expression pattern determined by the at least one HPU to match in the input stream, wherein each at least one HNA instruction stored identifies a given HNA input stack of the HNA input stack partition, a given HNA off-chip run stack of the HNA off-chip run stack partition, a given HNA off-chip save buffer of the HNA off-chip save buffer partition, and a given HNA off-chip result buffer of the HNA off-chip result buffer partition.

19. The apparatus of claim 18, further comprising at least one LMC and wherein a given LMC of the at least one LMC is configured to:
enable the at least one HNA processor to access the HNA packet data memory, HNA input stack partition, HNA off-chip instruction queue, HNA off-chip run stack partition, HNA off-chip save buffer partition, and the HNA off-chip result buffer partition via a coherent path; and
enable the at least one HNA processor to access the HNA off-chip graph memory via a non-coherent path.

20. The apparatus of claim 1, wherein each HPU of the plurality of HPUs of the plurality of clusters includes:
a node cache configured to cache one or more nodes from a super-cluster graph memory, an HNA on-chip graph memory, or an HNA off-chip graph memory;
a character class cache configured to cache one or more regular expression pattern character class definitions from a super-cluster character class memory;
a payload buffer configured to store a given payload from an HNA packet data memory, the at least one HNA instruction including an identifier for a location of the given payload in the HNA packet data memory;
a top of stack register configured to store a single HNA job;
a run stack configured to store multiple HNA jobs;
a unified memory configured to store first content of a save stack and second content of a match result buffer, the first content including one or more HNA jobs stored in the run stack and the second content including one or more final match results; and an HNA processing core operatively coupled to the node cache, character class cache, payload buffer, top of stack register, run stack, and the unified memory, the HNA processing core configured to walk at least one per-pattern NFA with payload segments stored in the payload buffer to determine a match of the at least one regular expression pattern.

21. The apparatus of claim 1, wherein the apparatus further comprises a plurality of super-clusters, each super-cluster including a corresponding plurality of clusters of the plurality of clusters, and wherein:
   each super-cluster further includes a super-cluster graph memory exclusive to a corresponding super-cluster;
   the at least one HNA processor further includes an HNA on-chip graph memory shared by the plurality of super-clusters;
   the apparatus further comprises at least one system memory configured to include an HNA off-chip graph memory shared by the plurality of super-clusters; and
   the given HPU selected is configured to walk nodes of a given per-pattern NFA of at least one per-pattern NFA with segments of a payload of the input stream based on the at least one HNA instruction assigned, the nodes walked stored in a node cache exclusive to the given HPU selected, the super-cluster graph memory, the HNA on-chip graph memory, the HNA off-chip graph memory, or a combination thereof.

22. The apparatus of claim 1, wherein the given HPU is selected from a resource pool of HPUs available to the HNA scheduler for selection to enable acceleration of the matching.

23. A hyper non-deterministic finite automata (HNA) processor specialized for non-deterministic finite automata (NFA) processing, the HNA processor comprising:
   a plurality of clusters, each cluster of the plurality of clusters including a plurality of HNA processing units (HPUs); and
   an HNA on-chip instruction queue configured to store at least one HNA instruction, the plurality of HPUs of the plurality of clusters forming a resource pool of HPUs available for assignment of the at least one HNA instruction; and
   an HNA scheduler configured to select a given HPU of the resource pool formed and assign the at least one HNA instruction to the given HPU selected in order to initiate matching at least one regular expression pattern in an input stream received from a network.

24. A method comprising:
   including a plurality of clusters in at least one hyper non-deterministic automata (HNA) processor specialized for non-deterministic finite automata (NFA) processing, each cluster of the plurality of clusters including a plurality of HNA processing units (HPUs);
   storing at least one HNA instruction in an HNA on-chip instruction queue; and
   selecting, by an HNA scheduler, a given HPU of the plurality of HPUs of the plurality of clusters and assigning the at least one HNA instruction to the given HPU selected in order to initiate matching at least one regular expression pattern in an input stream received from a network.

25. The method of claim 24, further comprising:
   including a plurality of super-clusters in the at least one HNA processor;
   including, in each super-cluster, a corresponding plurality of clusters of the plurality of clusters and a super-cluster graph memory exclusive to a corresponding super-cluster, the super-cluster graph memory accessible to a corresponding plurality of HPUs of a corresponding plurality of clusters of the corresponding super-cluster; and
   storing, in the super-cluster graph memory, a subset of nodes of at least one per-pattern NFA statically, the subset of nodes determined by a compiler of the at least one per-pattern NFA.

26. The method of claim 25, further comprising:
   including, in each super-cluster, at least one super-cluster character class memory exclusive to a corresponding super-cluster; and
   storing, statically, in each at least one super-cluster character class memory, regular expression pattern character class definitions.

27. The method of claim 26, wherein the super-cluster graph memory and the at least one super-cluster character class memory are unified.

28. The method of claim 26, further comprising sharing the at least one super-cluster character class memory by a corresponding plurality of HPUs of a corresponding plurality of clusters of the corresponding super-cluster.

29. The method of claim 24, further comprising:
   including a plurality of super-clusters in the at least one HNA processor, each super-cluster including a corresponding plurality of clusters of the plurality of clusters;
   including, in each super-cluster, at least one super-cluster character class memory, each at least one super-cluster character class memory exclusive to a given cluster of the corresponding plurality of clusters of a corresponding super-cluster and shared by a corresponding plurality of HPUs of the given cluster; and
   storing, statically, in each at least one super-cluster character class memory, regular expression pattern character class definitions.

30. The method of claim 24, further comprising:
   operatively coupling the at least one HNA processor to at least one Central Processing Unit (CPU) core, the at least one HNA processor configured to offload pattern matching operations from the at least one CPU core;
   including a plurality of super-clusters in the at least one HNA processor, each super-cluster including a corresponding plurality of clusters of the plurality of clusters; and
   selecting, by the at least one CPU core, at least one super-cluster of the plurality of super-clusters by restricting super-cluster selection based on a graph identifier associated with the at least one HNA instruction.

31. The method of claim 30, further comprising associating the graph identifier with a given per-pattern NFA of a plurality of per-pattern NFAs and wherein restricting the super-cluster selection includes determining that at least one node of the given per-pattern NFA is stored in a super-cluster graph memory exclusive to the at least one super-cluster selected.

32. The method of claim 30, further comprising:
   associating the graph identifier with a given per-pattern NFA of a plurality of per-pattern NFAs;
   selecting, by the HNA scheduler, the given HPU from a restricted set of HPUs that includes each corresponding plurality of HPUs of each corresponding plurality of clusters of the at least one super-cluster selected; and
   wherein selecting the at least one super-cluster of the plurality of super-clusters is based on a determination that at least one node of the given per-pattern NFA associated with the graph identifier is stored in a super-cluster graph memory exclusive to the at least one super-cluster selected.

33. The method of claim 32, wherein selecting the given HPU from the restricted set of HPUs is based on a round robin schedule for HPUs in the restricted set of HPUs.

34. The method of claim 32, wherein selecting the given HPU from the restricted set of HPUs is based on instantaneous loading of each HPU in the restricted set of HPUs.

35. The method of claim 24, further comprising:
including a plurality of super-clusters in the at least one HNA processor, each super-cluster including a corresponding plurality of clusters of the plurality of clusters and a super-cluster graph memory exclusive to a corresponding super-cluster; and
storing, in each super-cluster graph memory, at least one node of at least one per-pattern NFA of a plurality of per-pattern NFAs to replicate the at least one node in each super-cluster graph memory of each super-cluster of the at least one HNA processor.

36. The method of claim 35, further comprising:
operatively coupling the at least one HNA processor to at least one CPU core, the at least one HNA processor configured to offload pattern matching operations from the at least one CPU core;
providing, by the at least one CPU core, the HNA scheduler with an option to select the at least one super-cluster based on a determination that a given per-pattern NFA of the at least one per-pattern NFA associated with the at least one HNA instruction is replicated;
selecting, by the HNA scheduler, the at least one super-cluster based on the option provided and (i) a first round robin schedule for the plurality of super-clusters, (ii) a first instantaneous loading of the plurality of super-clusters or (iii) a combination of (i) and (ii); and
selecting, by the HNA scheduler, the given HPU from the plurality of HPUs of the plurality of clusters based on a second round robin schedule for the plurality of HPUs of the plurality of clusters, instantaneous loading of the plurality of HPUs of the plurality of clusters, or a combination thereof.

37. The method of claim 24, further comprising:
including, in the at least one HNA processor, an HNA on-chip graph memory accessible to the plurality of HPUs of the plurality of clusters; and
storing, in the HNA on-chip graph memory, a subset of nodes of at least one per-pattern NFA statically, the subset of nodes determined by a compiler of the at least one per-pattern NFA.

38. The method of claim 24, wherein the at least one HNA instruction is a first at least one HNA instruction and the method further comprises:
operatively coupling at least one system memory the at least one HNA processor;
including, in the at least one system memory, an HNA off-chip instruction queue and an HNA off-chip graph memory;
storing, in the HNA off-chip instruction queue, a second at least one HNA instruction, the second at least one HNA instruction pending transfer to the HNA on-chip instruction queue of the HNA processor; and
storing, in the HNA off-chip graph memory, a subset of nodes of at least one per-pattern NFA statically, the subset of nodes determined by a compiler of the at least one per-pattern NFA.

39. The method of claim 38, further comprising:
operatively coupling at least one Local Memory Controller (LMC) to the at least one HNA processor and the at least one system memory; and
configuring a given LMC of the at least one LMC to enable non-coherent access of the at least one system memory for access of the HNA off-chip graph memory by the at least one HNA processor.

40. The method of claim 38, further comprising:
including, in the at least one system memory, an HNA packet data memory; and
storing, in the HNA packet data memory, multiple payloads, contiguously, each of the multiple payloads having a fixed maximum length and associated with a given HNA instruction of the first at least one HNA instruction stored in the HNA on-chip instruction queue or the second at least one HNA instruction pending transfer to the HNA on-chip instruction queue.

41. The method of claim 38, further comprising:
operatively coupling at least one LMC to the at least one HNA processor and the at least one system memory;
including, in the at least one system memory, an HNA input stack partition and storing, in the at least one HNA input stack, at least one HNA input job for at least one HPU of the plurality of HPUs of the plurality of clusters;
including, in the at least one system memory, an HNA off-chip run stack partition and storing at least one HNA off-chip run stack to extend storage of at least one on-chip run stack, each at least one on-chip run stack storing at least one run-time HNA job for the at least one HPU;
including, in the at least one system memory, an HNA off-chip save buffer partition extending storage of at least one on-chip save buffer, each at least one on-chip save buffer storing the at least one run-time HNA job for the at least one HPU based on detecting a payload boundary; and
including, in the at least one system memory, an HNA off-chip result buffer partition storing at least one final match result entry of the at least one regular expression pattern determined by the at least one HPU to match in the input stream, wherein each at least one HNA instruction stored identifies a given HNA input stack of the HNA input stack partition, a given HNA off-chip run stack of the HNA off-chip run stack partition, a given HNA off-chip save buffer of the HNA off-chip save buffer partition, and a given HNA off-chip result buffer of the HNA off-chip result buffer partition.

42. The method of claim 41, further comprising:
operatively coupling at least one LMC to the at least one HNA processor;
enabling, by a given LMC of the at least one LMC, the at least one HNA processor to access the HNA packet data memory, HNA input stack partition, HNA off-chip instruction queue partition, HNA off-chip run stack partition, HNA off-chip save buffer partition, and the HNA off-chip result buffer partition via a coherent path; and
enabling, by the given LMC, the at least one HNA processor to access the HNA off-chip graph memory via a non-coherent path.

43. The method of claim 24, further comprising:
including, in each HPU of the plurality of HPUs of the plurality of clusters, a node cache, a character class cache, a payload buffer, a top of stack register, a run stack, a unified memory, and an HNA processing core operatively coupled to the node cache;

caching one or more nodes from a super-cluster graph memory, an HNA on-chip graph memory, or an HNA off-chip graph memory in the node cache;

caching one or more regular expression pattern character class definitions from a super-cluster character class memory in the character class cache;

storing a given payload from an HNA packet data memory in the payload buffer, the at least one HNA instruction including an identifier for a location of the given payload in the HNA packet data memory;

storing a single HNA job in the top of stack register;

storing multiple HNA jobs in the run stack;

storing first content of a save stack and second content of a match result buffer in the unified memory, the first content including one or more HNA jobs stored in the run stack and the second content including one or more final match results; and operatively coupling the HNA processing core to the node cache, character class cache, payload buffer, top of stack register, run stack, and the unified memory, and walking, by the HNA processing core, at least one per-pattern NFA with payload segments stored in the payload buffer to determine a match of the at least one regular expression pattern.

44. The method of claim 24, wherein:

including a plurality of super-clusters in the at least one HNA processor, each super-cluster including a corresponding plurality of clusters of the plurality of clusters and a super-cluster graph memory exclusive to a corresponding super-cluster;

including, in the at least one HNA processor, an HNA on-chip graph memory;

sharing the HNA on-chip graph memory and an HNA off-chip graph memory by the plurality of super-clusters;

storing nodes of a given per-pattern NFA of at least one per-pattern NFA in the HNA on-chip graph memory, the HNA off-chip graph memory, or a combination thereof; and walking, by the given HPU selected, the nodes with segments of a payload of the input stream based on the at least one HNA instruction assigned and storing the nodes walked in a node cache exclusive to the given HPU selected, the super-cluster graph memory, the HNA on-chip graph memory, the HNA off-chip graph memory, or a combination thereof.

45. The method of claim 24, wherein the plurality of HPUs of the plurality of clusters form a resource pool of HPUs available to the HNA scheduler for selection to enable acceleration of the matching.

* * * * *